US005185705A

United States Patent [19]

Farrington

[11] Patent Number: 5,185,705

[45] Date of Patent: Feb. 9, 1993

[54] CIRCUIT BREAKER HAVING SERIAL DATA COMMUNICATIONS

[75] Inventor: Ronald L. Farrington, Cedar Rapids, Iowa

[73] Assignee: Square D Company, Palatine, Ill.

[21] Appl. No.: 833,637

[22] Filed: Feb. 10, 1992

Related U.S. Application Data

[60] Continuation of Ser. No. 587,361, Sep. 24, 1990, abandoned, which is a division of Ser. No. 175,992, Mar. 31, 1988, Pat. No. 4,996,646.

[51] Int. Cl.[5] .............................................. G06F 15/56

[52] U.S. Cl. .................................... 364/483; 361/115; 364/481; 364/492

[58] Field of Search ............... 364/480, 481, 483, 492, 364/551.01; 361/94, 96, 97, 87, 93, 105, 115

[56] References Cited

U.S. PATENT DOCUMENTS

| | | | |
|---|---|---|---|
| 4,377,836 | 3/1983 | Elms et al. | 361/96 |
| 4,377,837 | 3/1983 | Matsko et al. | 361/105 |
| 4,535,409 | 8/1985 | Jindrick et al. | 364/483 |
| 4,589,052 | 5/1986 | Dougherty | 361/96 |
| 4,631,625 | 12/1986 | Alexander et al. | 364/483 |
| 4,680,706 | 7/1987 | Bray | 364/483 |
| 4,752,853 | 6/1988 | Matsko et al. | 364/481 |
| 4,814,712 | 3/1989 | Burton et al. | 361/115 |
| 4,964,058 | 10/1990 | Brown, Jr. | 364/483 |
| 4,977,513 | 12/1990 | La Palme | 364/483 |

*Primary Examiner*—Kevin J. Teska

*Attorney, Agent, or Firm*—Larry I. Golden; Kareem M. Irfan

[57] ABSTRACT

A circuit breaker system uses a microprocessor for calculating at least one function of a measured current flow. The microprocessor provides other functions such as serial data stream communications, the ability of many circuit breaker systems to communicate with a central computer, storage of trip information concerning the last trip, storage of historical trip information concerning a number of past trips, EEPROM memory for storing trip information, the microprocessor may inhibit tripping on a high current fault to permit storage of trip information into a memory, power is derived from current transformers drawing energy from current flow to a load and the electronics are protected from high voltage caused by heavy current flow to the load, optical isolators are used for the circuit breaker to communicate with external equipment, a multi-turn resistor adjusts an external test voltage for testing the circuit breaker system, in the event that there is no load or a load drawing insufficient current to provide power for the electronics the circuit breaker may be externally powered to provide readout of electrically erasable programmable read only memory, the microprocessor reads setting switches and a multiplier plug. Also the microprocessor is capable of digitizing selected quantities frequently and of digitizing other quantities less frequently. A second microprocessor permits one microprocessor to sample voltage and current rapidly for metering purposes, and the second microprocessor operates other functions.

38 Claims, 52 Drawing Sheets

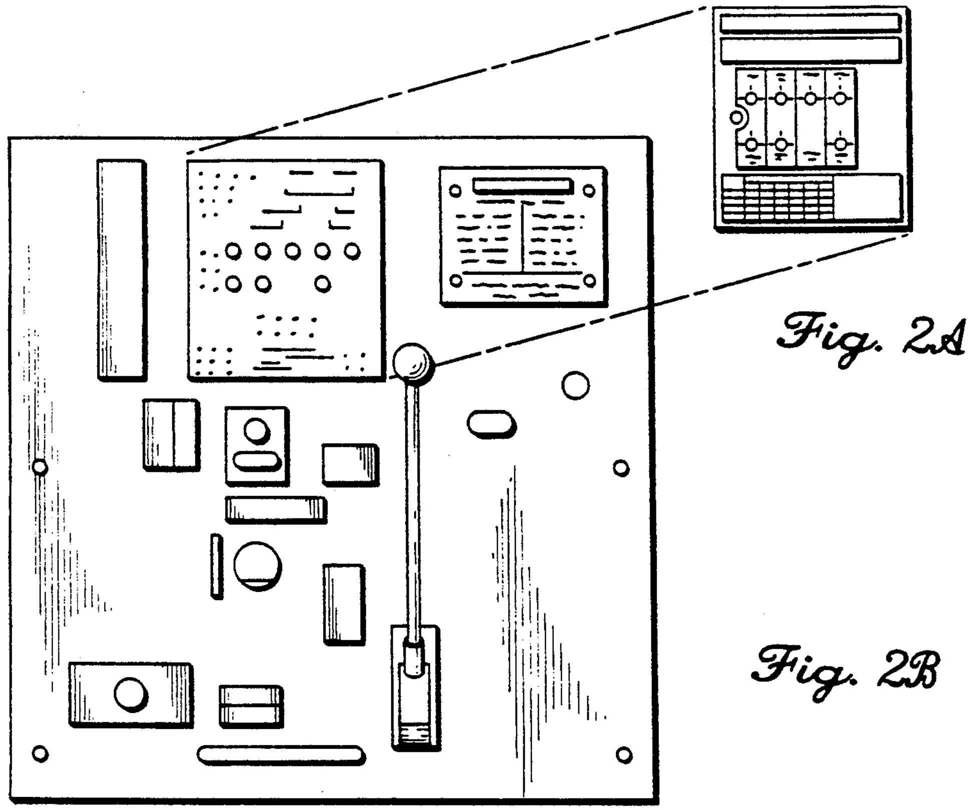
Fig. 2A
Fig. 2B
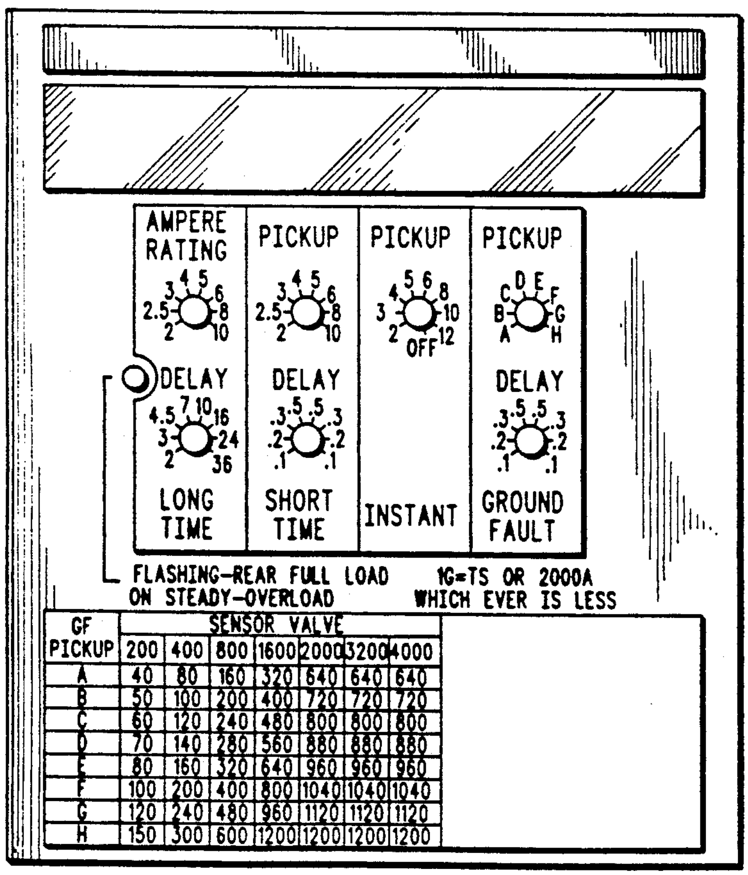
| GF PICKUP | SENSOR VALVE | | | | | | |
|---|---|---|---|---|---|---|---|
| | 200 | 400 | 800 | 1600 | 2000 | 3200 | 4000 |
| A | 40 | 80 | 160 | 320 | 640 | 640 | 640 |
| B | 50 | 100 | 200 | 400 | 720 | 720 | 720 |
| C | 60 | 120 | 240 | 480 | 800 | 800 | 800 |
| D | 70 | 140 | 280 | 560 | 880 | 880 | 880 |
| E | 80 | 160 | 320 | 640 | 960 | 960 | 960 |
| F | 100 | 200 | 400 | 800 | 1040 | 1040 | 1040 |
| G | 120 | 240 | 480 | 960 | 1120 | 1120 | 1120 |
| H | 150 | 300 | 600 | 1200 | 1200 | 1200 | 1200 |
Fig. 3

LEGEND
= TWISTED PAIR WIRES
= ELECTRONIC SIGNALS
= OPTICAL SIGNALS
E EMITTER (ELECTRICAL TO OPTICAL CONVERTER)
D DETECTOR (OPTICAL TO ELECTRICAL CONVERTER)

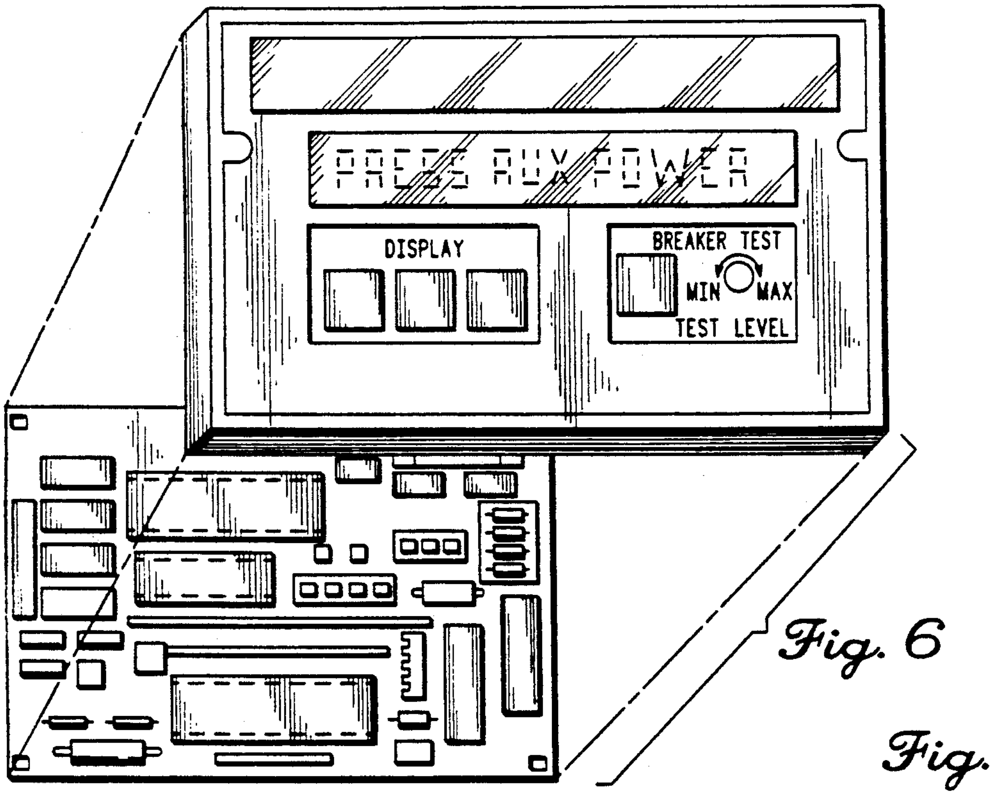
Fig. 6
Fig. 7A
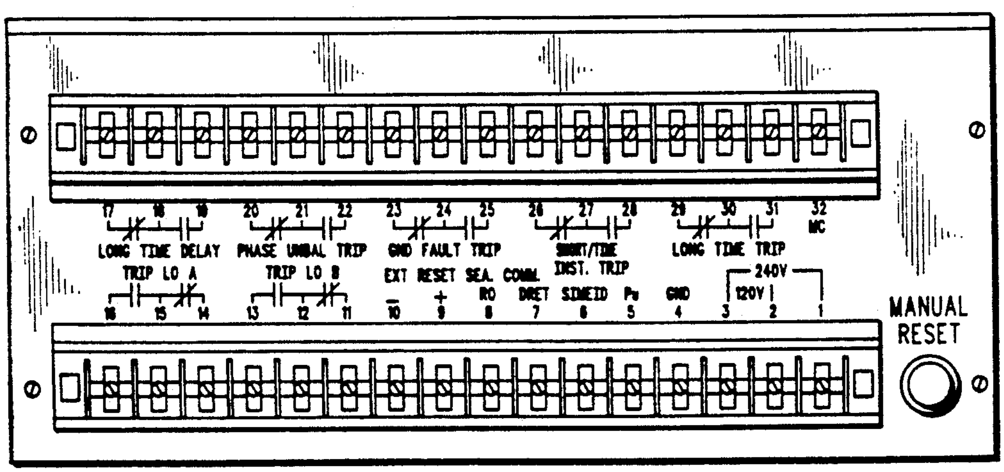
Fig. 7B
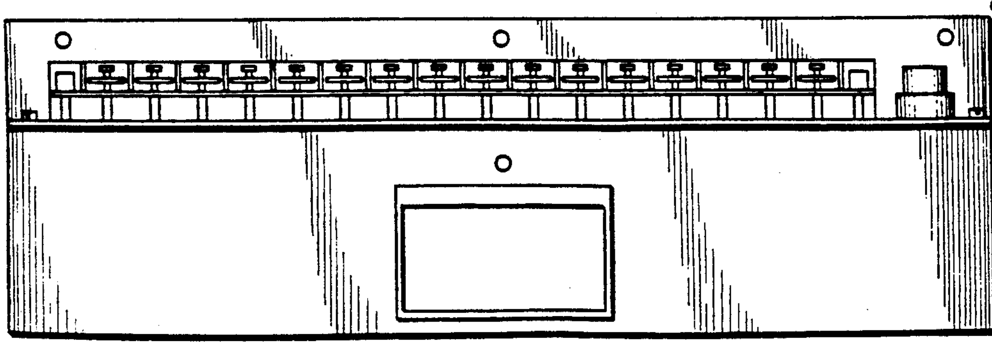

Fig. 15-4B
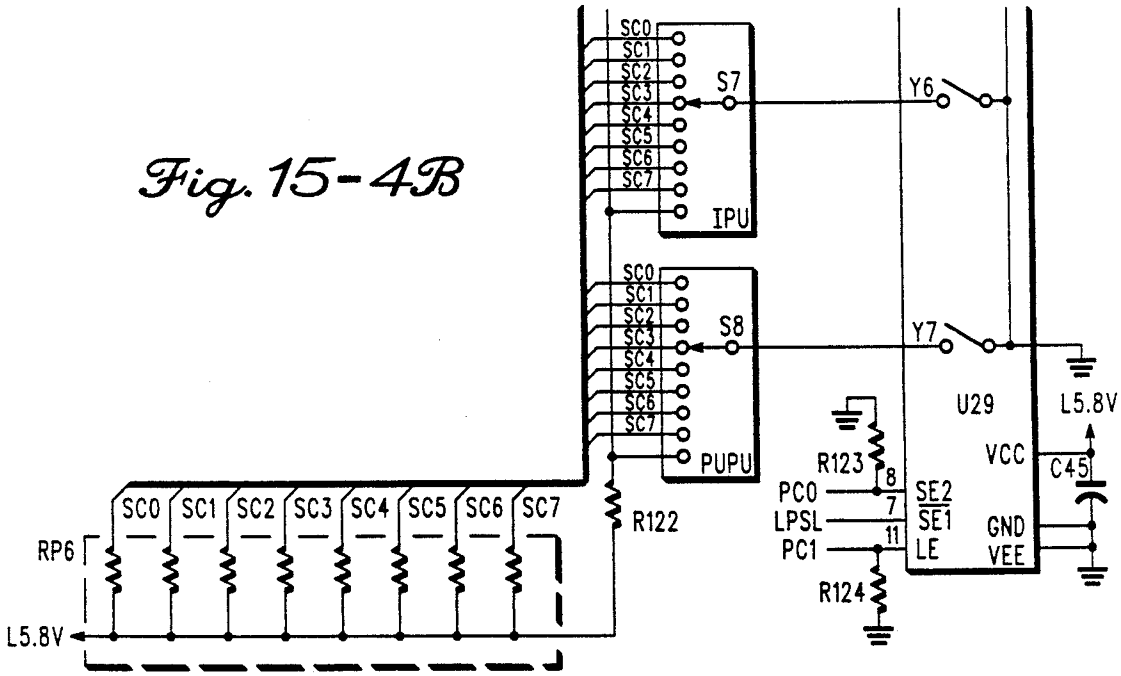
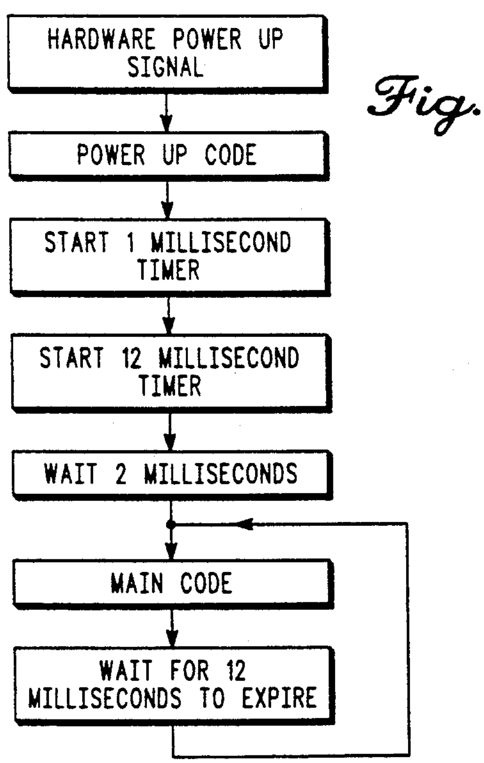
Fig. 17
Fig. 15-1B
NOTE:
2. THE PWB CAN BE CONFIGURED FOR VARIOUS SENSOR SIZES AS FOLLOWS:
| SENSOR(AMP) | JMP2 | JMP3 | JMP4 |
|---|---|---|---|
| 200 | YES | YES | YES |
| 400 | NO | YES | YES |
| 800 | YES | NO | YES |
| 1600 | NO | NO | YES |
| 2000 | YES | YES | NO |
| 3200 | NO | YES | NO |
| 4000 | YES | NO | NO |

RESET

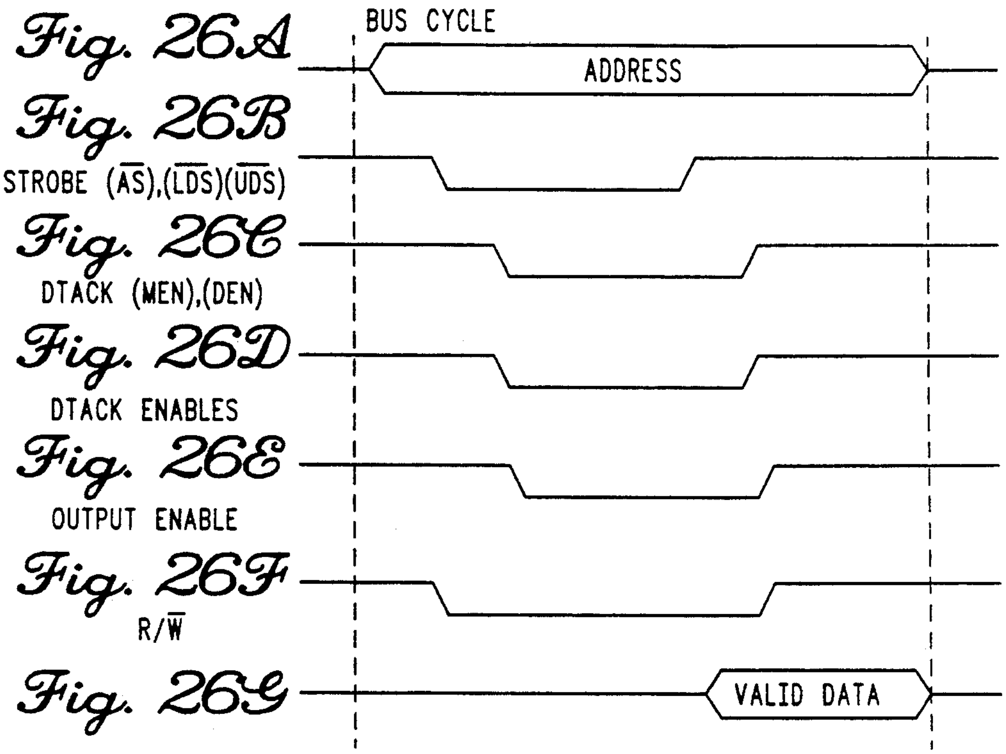

Fig. 26

LOCAL MANAGEMENT UNIT (LMU)
EXECUTIVE PROCESSOR-MC68000
MEMORY MAP

| FROM: | TO: | FUNCTION: |
|---|---|---|
| 000000H | 00FFFFH | EPROM 32K x 16 (EXPANDABLE) |
| 010000H | 0FFFFFH | NOT USED |
| 100000H | 100FFFH | RAM 2K x 16 |
| 101000H | 1FFFFFH | NOT USED |
| 200000H | 2007FFH | DUAL PORT RAM 1K x 16 |
| 300001H | 300FFFH | EEPROM 2K x 8 (OLD ADDRESS, BYTE ONLY) |
| 301000H | 3FFFFFH | NOT USED |
| 400000H | 7FFFFFH | NOT USED |
| 800001H | | BASE ADDRESS MC68901 MFP |
| 900001H | | BASE ADDRESS MC68681 DUART |
| A00000H | BFFFFFH | NOT USED |
| C00001H | | BASE ADDRESS R65C22 VIA |
| D00000H | | SOFTDOG CLEAR RESET |
| E00001H | | SMARTWATCH |
| F00000H | FFFFFFH | RESERVED FOR INTR RESPONSE |

Fig. 27A

MEMORY MAP MC68901 MULTI-FUNCTION PERIPHERAL (MFP)

| ADDRESS | RS5 | RS4 | RS3 | RS2 | RS1 | ABBR. | REG. NAME |
|---|---|---|---|---|---|---|---|
| 800001 | 0 | 0 | 0 | 0 | 0 | GPIP | GENERAL PURPOSE I/O REGISTER |
| 800003 | 0 | 0 | 0 | 0 | 1 | AER | ACTIVE EDGE REGISTER |
| 800005 | 0 | 0 | 0 | 1 | 0 | DDR | DATA DIRECTION REGISTER |
| 800007 | 0 | 0 | 0 | 1 | 1 | IERA | INTERRUPT ENABLE REGISTER A |
| 800009 | 0 | 0 | 1 | 0 | 0 | IERB | INTERRUPT ENABLE REGISTER B |
| 80000B | 0 | 0 | 1 | 0 | 1 | IPRA | INTERRUPT PENDING REGISTER A |
| 80000D | 0 | 0 | 1 | 1 | 0 | IPRB | INTERRUPT PENDING REGISTER B |
| 80000F | 0 | 0 | 1 | 1 | 1 | ISRA | INTERRUPT IN-SERVICE REGISTER A |
| 800011 | 0 | 1 | 0 | 0 | 0 | ISRB | INTERRUPT IN-SERVICE REGISTER B |
| 800013 | 0 | 1 | 0 | 0 | 1 | IMRA | INTERRUPT MASK REGISTER A |
| 800015 | 0 | 1 | 0 | 1 | 0 | IMRB | INTERRUPT MASK REGISTER B |
| 800017 | 0 | 1 | 0 | 1 | 1 | VR | VECTOR REGISTER |
| 800019 | 0 | 1 | 1 | 0 | 0 | TACR | TIMER A CONTROL REGISTER |
| 80001B | 0 | 1 | 1 | 0 | 1 | TBCR | TIMER B CONTROL REGISTER |
| 80001D | 0 | 1 | 1 | 1 | 0 | TCDCR | TIMERS C&D CONTROL REGISTER |
| 80001F | 0 | 1 | 1 | 1 | 1 | TADR | TIMER A DATA REGISTER |
| 800021 | 1 | 0 | 0 | 0 | 0 | TBDR | TIMER B DATA REGISTER |
| 800023 | 1 | 0 | 0 | 0 | 1 | TCDR | TIMER C DATA REGISTER |
| 800025 | 1 | 0 | 0 | 1 | 0 | TDDR | TIMER D DATA REGISTER |
| 800027 | 1 | 0 | 0 | 1 | 1 | SCR | SYNCHRONOUS CHARACTER REGISTER |
| 800029 | 1 | 0 | 1 | 0 | 0 | UCR | USART CONTROL REGISTER |
| 80002B | 1 | 0 | 1 | 0 | 1 | RSR | RECEIVER STATUS REGISTER |
| 80002D | 1 | 0 | 1 | 1 | 0 | TSR | TRANSMITTER STATUS REGISTER |
| 80002F | 1 | 0 | 1 | 1 | 1 | UDR | USART DATA REGISTER |

MEMORY MAP MC68681 DUART

| ADDRESS | RS1 | RS2 | RS3 | RS4 | READ FUNCTION (REG.) | WRITE FUNCTION (REG.) |
|---|---|---|---|---|---|---|
| 900001 | 0 | 0 | 0 | 0 | MODE REGISTER A (MR1A,MR2A) | MODE REGISTER A (MR1A,MR2A) |
| 900003 | 0 | 0 | 0 | 1 | STATUS REGISTER A (SRA) | CLOCK SELECT REGISTER A (CSRA) |
| 900005 | 0 | 0 | 1 | 0 | DO NOT ACCESS* | COMMAND REGISTER A (CRA) |
| 900007 | 0 | 0 | 1 | 1 | RECEIVER BUFFER A (RBA) | TRANSMITTER BUFFER A (TBA) |
| 900009 | 0 | 1 | 0 | 0 | INPUT PORT CHANGE REGISTER (IPCR) | AUXILIARY CONTROL REGISTER (ACR) |
| 90000B | 0 | 1 | 0 | 1 | INTERRUPT STATUS REGISTER (ISR) | INTERRUPT MASK REGISTER (IMR) |
| 90000D | 0 | 1 | 1 | 0 | COUNTER MODE: CURRENT MSB OF COUNTER (CUR) | COUNTER/TIMER UPPER REGISTER (CTUR) |
| 90000F | 0 | 1 | 1 | 1 | COUNTER MODE: CURRENT LSB OF COUNTER (CLR) | COUNTER/TIMER LOWER REGISTER (CTLR) |
| 900011 | 1 | 0 | 0 | 0 | MODE REGISTER B (MR1B, MR2B) | MODE REGISTER B (MR1B, MR2B) |
| 900013 | 1 | 0 | 0 | 1 | STATUS REGISTER B | CLOCK-SELECT REGISTER |
| 900015 | 1 | 0 | 1 | 0 | DO NOT ACCESS* | COMMAND REGISTER B (CRB) |
| 900017 | 1 | 0 | 1 | 1 | RECEIVER BUFFER B (RBB) | TRANSMITTER BUFFER B (TBB) |
| 900019 | 1 | 1 | 0 | 0 | INTERRUPT VECTOR REGISTER (IVR) | INTERRUPT VECTOR REGISTER (IVR) |
| 90001B | 1 | 1 | 0 | 1 | INPUT PORT (UNLATCHED) | OUTPUT PORT CONFIG. REGISTER (OPCR) |
| 90001D | 1 | 1 | 1 | 0 | START COUNTER COMMAND ** | OPR (OUTPUT PORT REG.) BIT SET COMMAND ** |
| 90001F | 1 | 1 | 1 | 1 | STOP COUNTER COMMAND ** | OPR (OUTPUT PORT REG.) BIT RESET COMMAND ** |

MEMORY MAP R65C22 VIA

| ADDRESS | RS3 | RS2 | RS1 | RS0 | REGISTER DESIGNATION | DESCRIPTION WRITE | DESCRIPTION READ |
|---|---|---|---|---|---|---|---|
| C00001 | 0 | 0 | 0 | 0 | ORB/IRB | OUTPUT REG. B | INPUT REG. B |
| C00003 | 0 | 0 | 0 | 1 | ORB/IRB | OUTPUT REG. A | INPUT REG. A |
| C00005 | 0 | 0 | 1 | 0 | DDRB | DATA DIRECTION REG. B | |
| C00007 | 0 | 0 | 1 | 1 | DDRA | DATA DIRECTION REG. A | |
| C00009 | 0 | 1 | 0 | 0 | T1C-L | T1 LOW-ORDER LATCH | T1 LOW-ORDER COUNTER |
| C0000B | 0 | 1 | 0 | 1 | T1C-H | T1 HIGH-ORDER COUNTER | |
| C0000D | 0 | 1 | 1 | 0 | T1L-L | T1 LOW-ORDER LATCHES | |
| C0000F | 0 | 1 | 1 | 1 | T1L-H | T1 HIGH-ORDER LATCHES | |
| C00011 | 1 | 0 | 0 | 0 | T2C-L | T2 LOW-ORDER LATCH | T2 LOW-ORDER COUNTER |
| C00013 | 1 | 0 | 0 | 1 | T2C-H | T2 HIGH-ORDER COUNTER | |
| C00015 | 1 | 0 | 1 | 0 | SR | SHIFT REGISTER | |
| C00017 | 1 | 0 | 1 | 1 | ACR | AUXILIARY CONTROL REG. | |
| C00019 | 1 | 1 | 0 | 0 | PCR | PERIPHERAL CONTROL REG. | |
| C0001B | 1 | 1 | 0 | 1 | IFR | INTERRUPT FLAG REG. | |
| C0001D | 1 | 1 | 1 | 0 | IER | INTERRUPT ENABLE REG. | |
| C0001F | 1 | 1 | 1 | 1 | ORA/IRA | SAME AS REG. 1 W/O HANDSHAKE | |

*Fig. 27D*

CIRCUIT BREAKER HAVING SERIAL DATA COMMUNICATIONS

This application is a continuation of application Ser. No. 07/587,361, filed Sep. 24, 1990, now abandoned.

CROSS REFERENCE TO RELATED APPLICATION

This application is a divisional of copending application Ser. No. 07/175,992, filed Mar. 31, 1988, now U.S. Pat. No. 4,996,646 and entitled CIRCUIT BREAKER HAVING SERIAL DATA COMMUNICATIONS.

FIELD OF THE INVENTION

The invention relates to circuit breakers operated by a microprocessor, and more particularly to a network having a plurality of circuit breakers communicating with a computer.

BACKGROUND OF THE INVENTION

A circuit breaker is used to disconnect an electrical circuit from a supply of electric energy in the event that too much electric current flows in the electrical circuit. In applications such as the electrical distribution system of a factory it is necessary to utilize a complex system of main electrical feeder lines providing electrical energy for a large number of branch circuits. Each of the main electrical feeder lines must be protected by a circuit breaker. Also each of the branch circuits must be protected by a circuit breaker. Additionally, it is convenient to provide tie lines between feeder circuits so that a feeder line which loses power may be alternatively supplied by a different feeder line which remains capable of supplying electrical power. And it is convenient to provide the tie connection with a protective circuit breaker in order to protect the associated circuits from over current and short circuit conditions.

A microcomputer may be incorporated in a circuit breaker design in order to give the circuit breaker intelligence so that switching operations may be simplified. However, a problem not solved by present designs of microcomputer containing circuit breakers is that no provision has been made for a communications network having circuit breakers communicating with a central control point.

SUMMARY OF THE INVENTION

The invention is a network of microprocessor operated circuit breakers capable of communications with a central computer and with digital meters. Each circuit breaker uses a microprocessor to control its operation. The network provides a means for convenient control of switching actions of the circuit breakers. Additionally, the network supplies information concerning each main feeder circuit, and each branch circuit for which information is desired, to the central computer. The information supplied about each circuit may include, current and voltage in each phase of a multiple phase distribution system, electric power, vars, phase angle, trip settings of the circuit breaker, current reached during trip events, the number of trip events, and historical records of trip events, etc. Any information which can be sensed through current sensors or voltage sensors and then calculated from the quantities sensed may be supplied to the central computer. The invention uses both circuit breakers and metering units to sense the required information and to transmit the information to the central computer.

Additional objects of the invention are as set out hereinbelow.

Object No. 1

To provide a switchgear system with computer intelligence capable of monitoring power circuits and taking actions based upon decisions made by the computer.

Object No. 2

To provide a circuit breaker and metering unit having serial data communications in addition to microprocessor operated restraint-in and restraint-out signals.

Object No. 3

To provide a circuit breaker system having a plurality of circuit breakers, a plurality of metering units, and a ring communications system for communications with a central computer.

Object No. 4

To provide a circuit breaker transmitting a serial data stream to a receiving unit and having pauses between BYTES.

Object No. 5

To provide a circuit breaker system having a metering unit capable of receiving serial data from a circuit breaker and capable of transmitting information on a transmission system.

Object No. 6

To provide a circuit breaker having a serial communications data stream to a receiving unit and including wait states to enhance data reception, and having more critical data transmitted most often and less critical data transmitted less often, and having trip data transmitted upon occurrence of a trip.

Object No. 7

To provide a circuit breaker transmitting a serial data stream to a Remote Indicator Unit, and the Remote Indicator Unit having solid state latch memory to preserve information during a power outage.

Object No. 8

To provide a circuit breaker drawing power from current transformers and having a microprocessor placed in a low power state during loss of power.

Object No. 9

To provide a power down and reset control circuit for a circuit breaker.

Object No. 10

To provide a trip unit with power failure resistant memory for retention of former trip data.

Object No. 11

To provide a power supply using current transformers for powering a circuit breaker, and having means for shorting the power supply to ground in order to prevent overvoltage during high current transients.

Object No. 12

To provide a circuit breaker capable of external testing and having optical isolation.

Object No. 13

To provide a circuit breaker trip unit selective between motor protection curves and circuit breaker curves, and a circuit breaker offering phase unbalance protection.

Object No. 14

To provide a circuit breaker having a trip unit, and an external unit for applying power to the trip unit to get data out of the trip unit.

Object No. 15

To provide a Circuit breaker having external test using multi-turn resistor fine adjustment of test parameters.

Object No. 16

To provide a circuit breaker indicator package having a switchable battery power supply and an oscillator that runs only when needed, for a trip unit or the like.

Object No. 17

To provide a circuit breaker using microprocessor and having operator accessible switch controls for trip characteristics and multiplier plug.

Object No. 18

To provide a circuit breaker having a metering unit with a display panel operating from a menu.

Object No. 19

To provide a digital metering unit having two microprocessors, where a first processor may sample current and voltage parameters, and a second processor may handle other functions including communications.

Object No. 20

To provide a circuit breaker having a microprocessor operated Metering Unit which has a software reset in the event that the microprocessor quits running.

Object No. 21

To provide a circuit breaker having a remote indicator unit using latching relays to retain status after trip.

Object No. 22

To provide a circuit breaker having direct trip by a heavy current event, and microprocessor inhibition of the trip to permit storage of data into memory.

Object No. 23

To provide a microprocessor controlled circuit breaker capable of digitizing a plurality of input quantities, and capable of digitizing only selected ones of the quantities on a cyclical basis.

Object No. 24

To provide a Power Metering Unit using a microprocessor and sampling both voltage and current during the same time interval using an analog latch.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIGS. 2A and 2B show a close up of a computer operated circuit breaker.

FIG. 3 is a close up drawing of the control panel of a computer operated circuit breaker Trip Unit.

FIG. 6 is a drawing of a Display Unit.

FIGS. 7*a* and 7*b* comprise a drawing of a Remote Indicator Unit.

FIG. 15-1 is a schematic of a Trip Unit, sheet 1 of 4.

FIG. 15-2 is a schematic of a Trip Unit, sheet 2 of 4.

FIG. 15-3 is a schematic of a Trip Unit, sheet 3 of 4.

FIG. 15-4 is a schematic of a Trip Unit, sheet 4 of 4.

FIG. 17 is a flow diagram for software of a trip unit.

FIG. 25-1 is a schematic of a Local Management Unit, sheet 1 of 13.

FIG. 25-2 is a schematic of a Local Management Unit, sheet 2 of 13.

FIGS. 25-3A and 25-3B comprise a schematic of a Local Management Unit, sheet 3 of 13.

FIG. 25-4 is a schematic of a Local Management Unit, sheet 4 of 13.

FIG. 25-5 is a schematic of a Local Management Unit, sheet 5 of 12.

FIG. 25-6 is a schematic of a Local Management Unit, sheet 6 of 12.

FIG. 25-7 is a schematic of a Local Management Unit, sheet 7 of 12.

FIG. 25-8 is a schematic of a Local Management Unit, sheet 8 of 12.

FIG. 25-9 is a schematic of a Local Management Unit, sheet 9 of 12.

FIG. 25-10 is a schematic of a Local Management Unit, sheet 10 of 12.

FIGS. 25-11A through 25-11D comprise a schematic of a Local Management Unit, sheet 11 of 12.

FIG. 25-12 is a schematic of a Local Management Unit, sheet 2 of 12.

FIGS. 25-13A and 25-13B comprise a schematic of a local Management Unit;

FIGS. 26A-26G comprise a bus timing diagram for a Local Management Unit.

FIGS. 27A-27D comprise a memory map for a Local Management Unit and a System Interface Unit.

DETAILED DESCRIPTION

Overview

Figure 1:
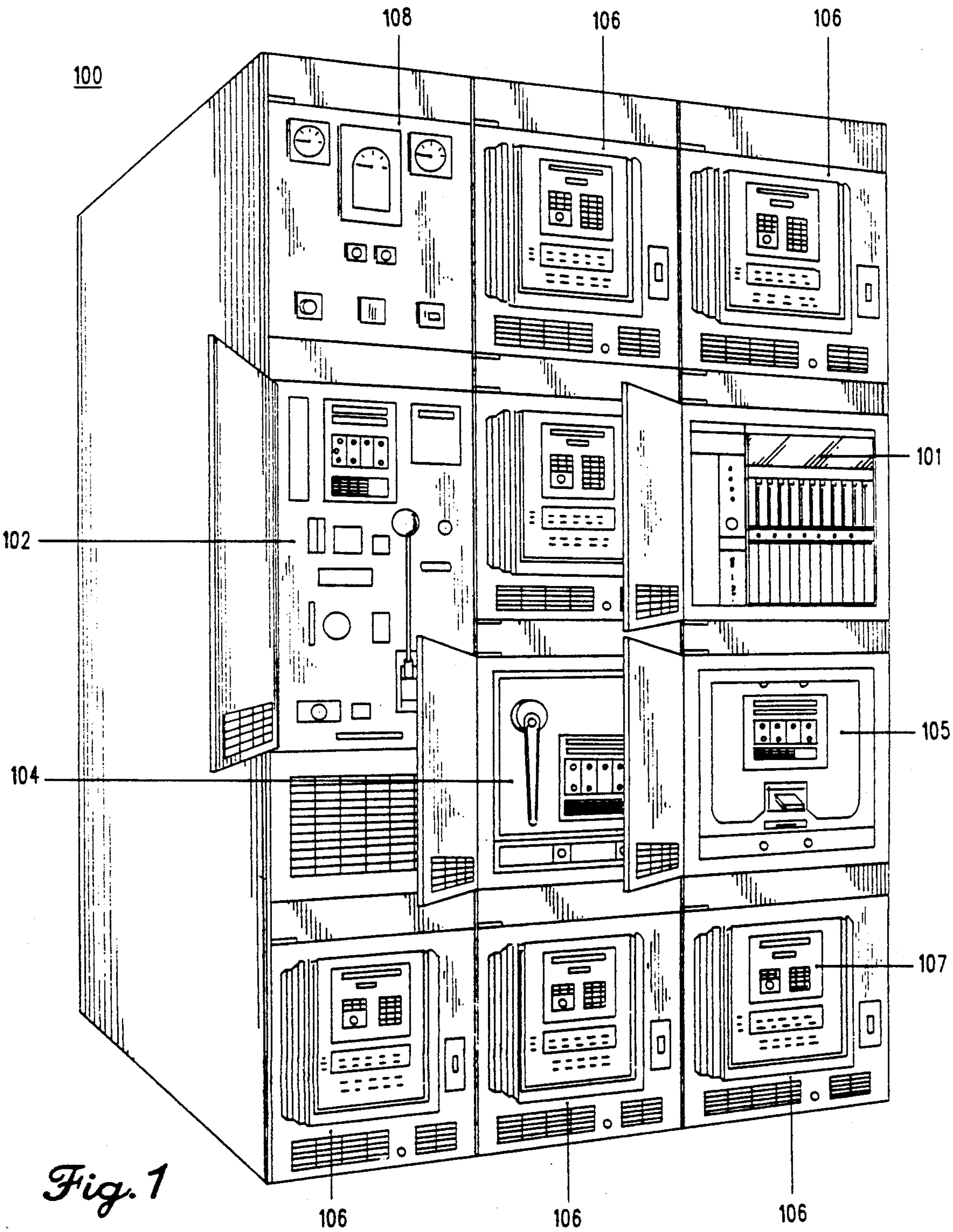
FIG. 1 is a drawing of a circuit breaker system mounted in an equipment rack, and including computer intelligence.

FIG. 1 shows a circuit breaker equipment rack 100 having a system of microprocessor controlled circuit breakers mounted therein. A variety of circuit breaker types may be controlled by programmable controller 101, including an iron frame circuit breaker 102, a molded case circuit breaker 104, and a toggle operated molded case circuit breaker 105. A Local Management Unit 106 is mounted on the door of the compartments having a circuit breaker. Each Local Management Unit has a control panel 107. Each circuit breaker transmits data on a serial communications link to its Local Management Unit. The Local Management Units have two way serial communications with the programmable controller 101. Meter panel 108 may display measured quantities such as voltage, current, power, phase angle, or kilowatt hours.

Figures 1, 25:
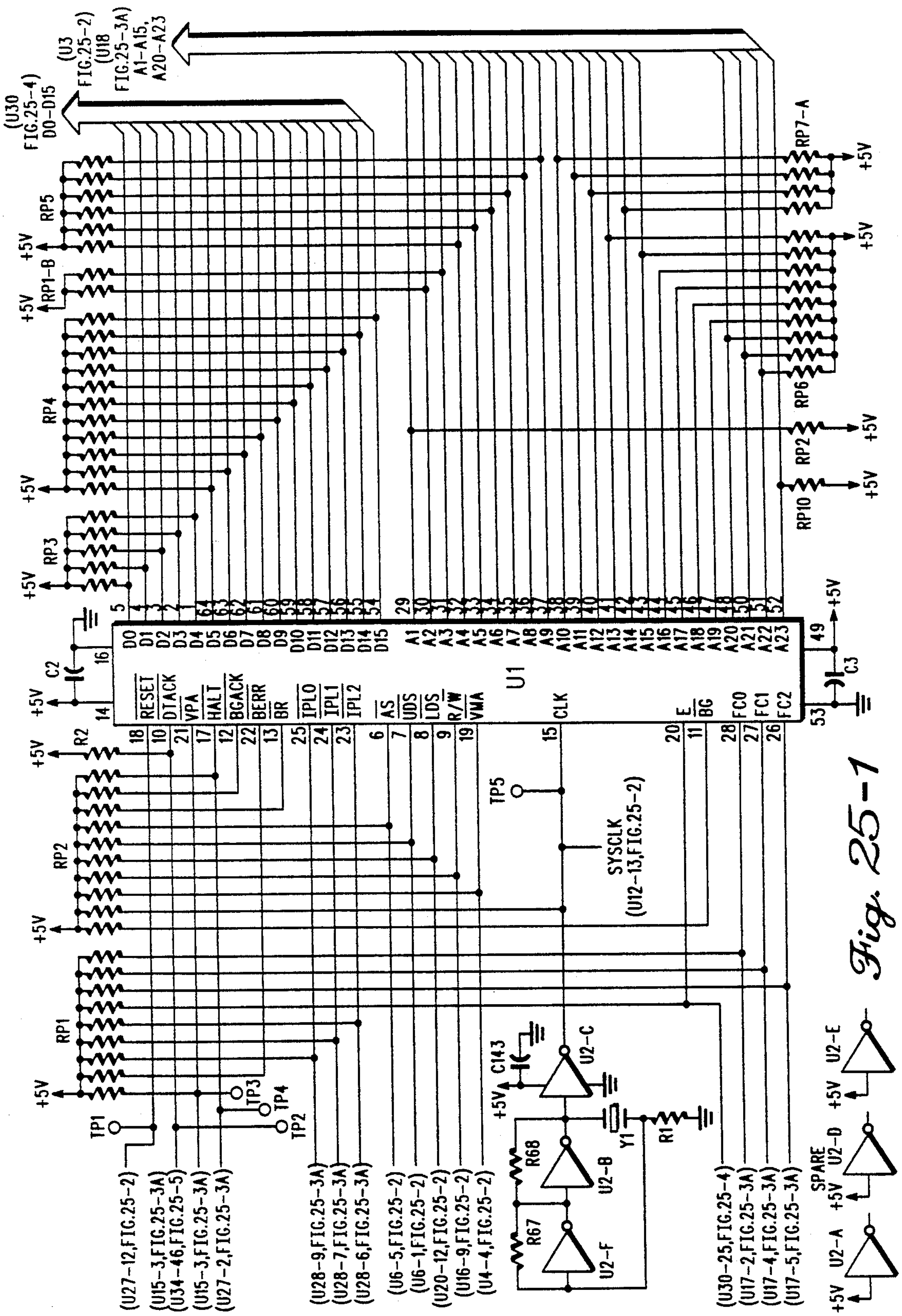
Figures 2, 25:
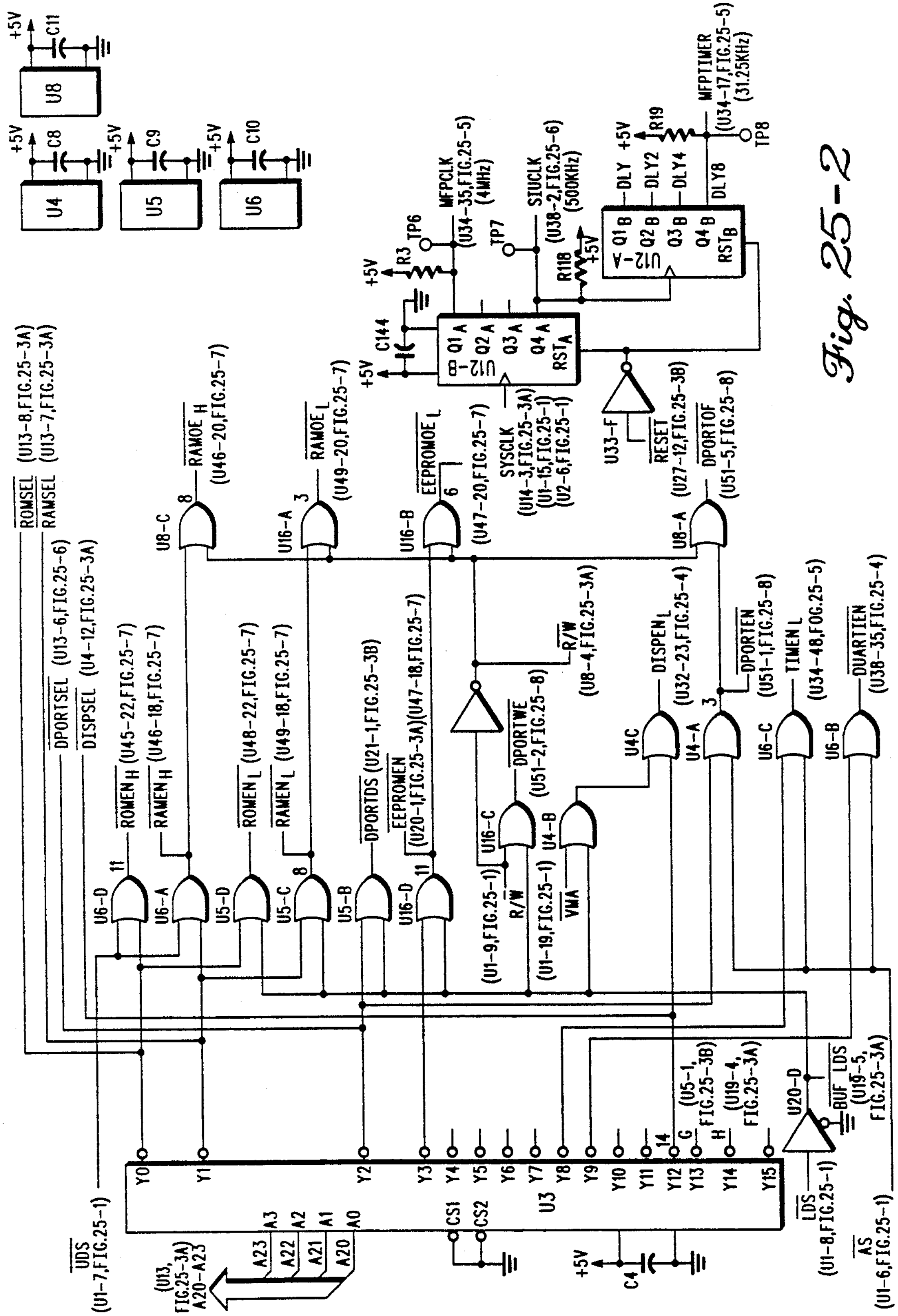
Figures 3A, 25:
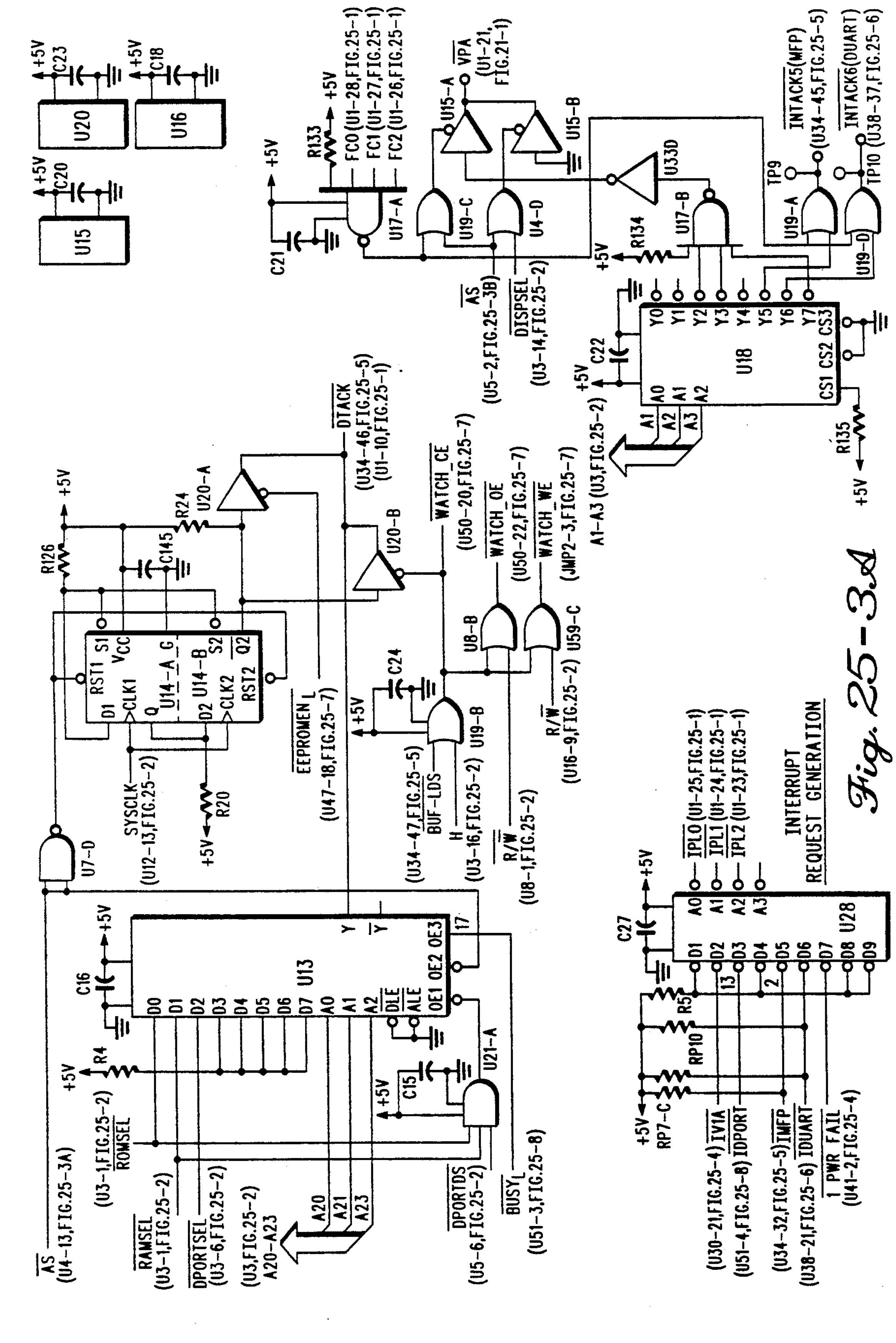
Figures 3B, 25:
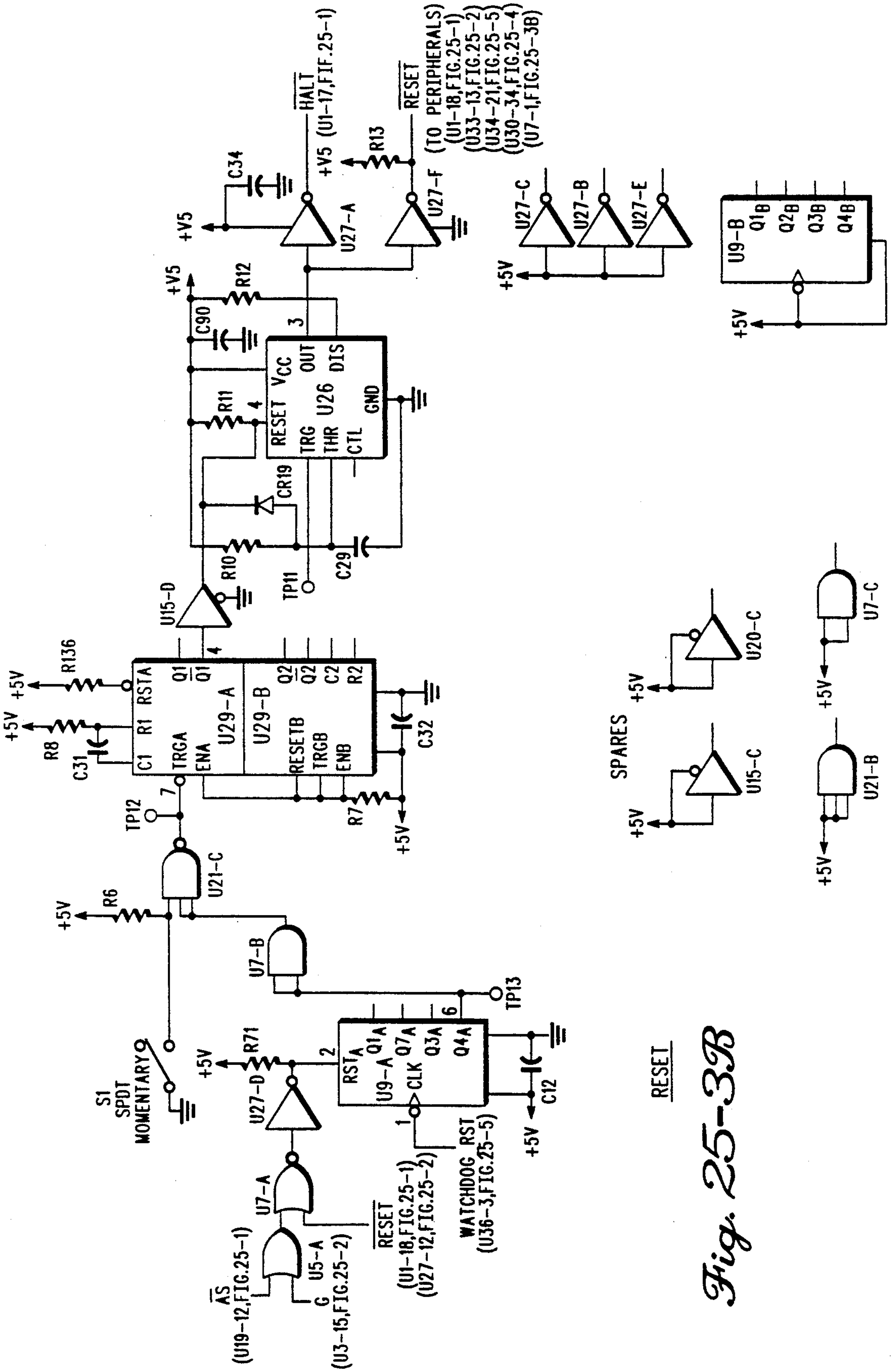
Figures 4, 25:
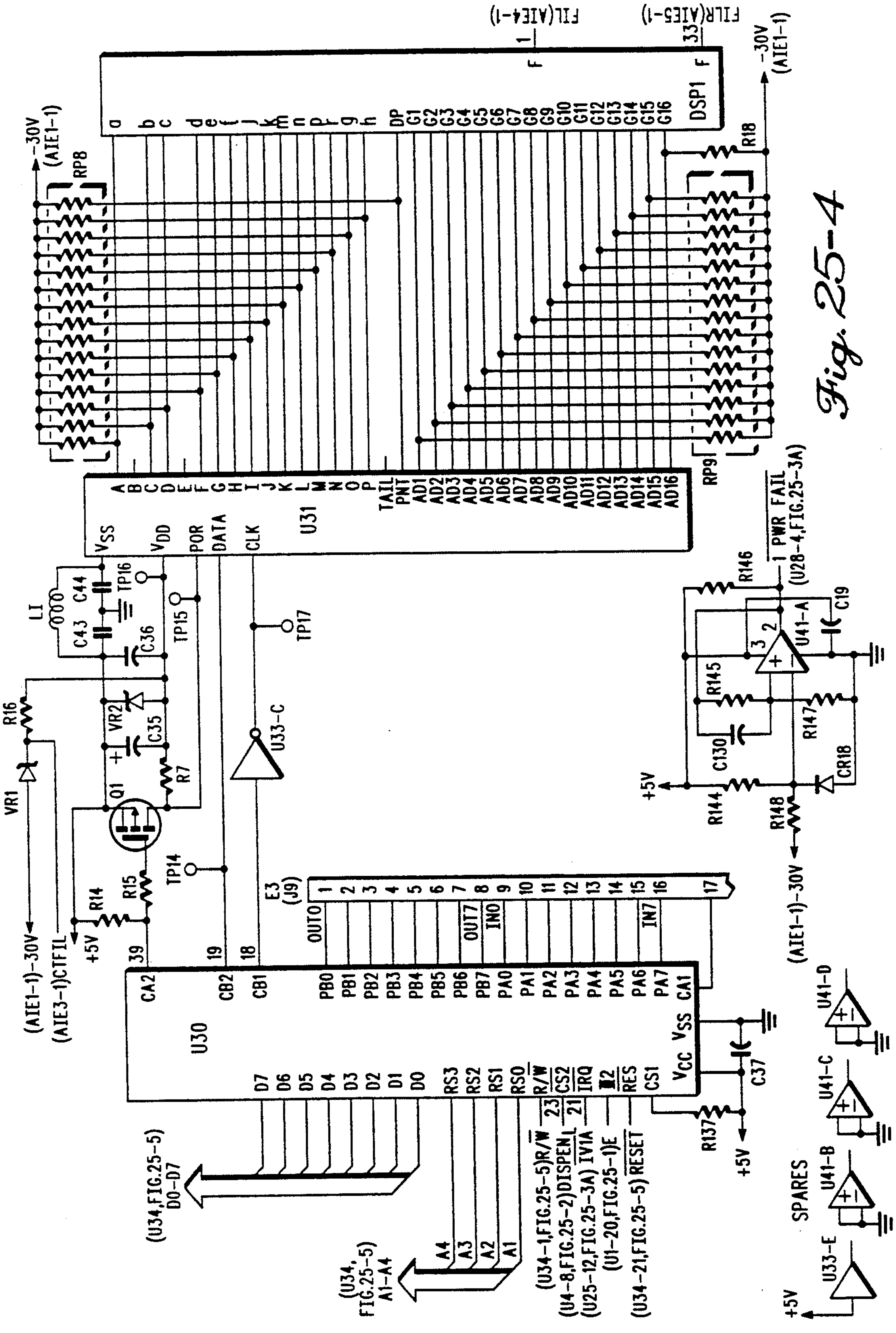

FIG. 2 is a detailed view of the front of a microprocessor controlled circuit breaker. The circuit board for the Trip Unit (TU) is visible through the panel opening. Various switches visible through the panel opening are used to control settings of the Trip Unit, such as the long time ampere rating and delay time, the short time ampere pickup rating and delay time, the instantaneous ampere pickup rating, and the ground fault ampere pickup rating and delay time. The actual amperes at which functions occur is determined, additionally, by the choice of current transformers and by the choice of a rating plug for the unit. A control panel is shown for the Trip Unit in a projection from its place of mounting. Connection jacks for connecting external equipment to the Trip Unit circuit board are shown. The external equipment may be a Local Management Unit (LMU), a Display Unit (DU), or a Remote Indicator Unit (RIU).

FIG. 3 is a detailed view of the Trip Unit control panel. The status of the Trip Unit may be read from the Trip Unit control panel display device.

A table gives the values of current in amperes selected by the various positions of the front panel switches for different sensor current transformers.

Figure 4:
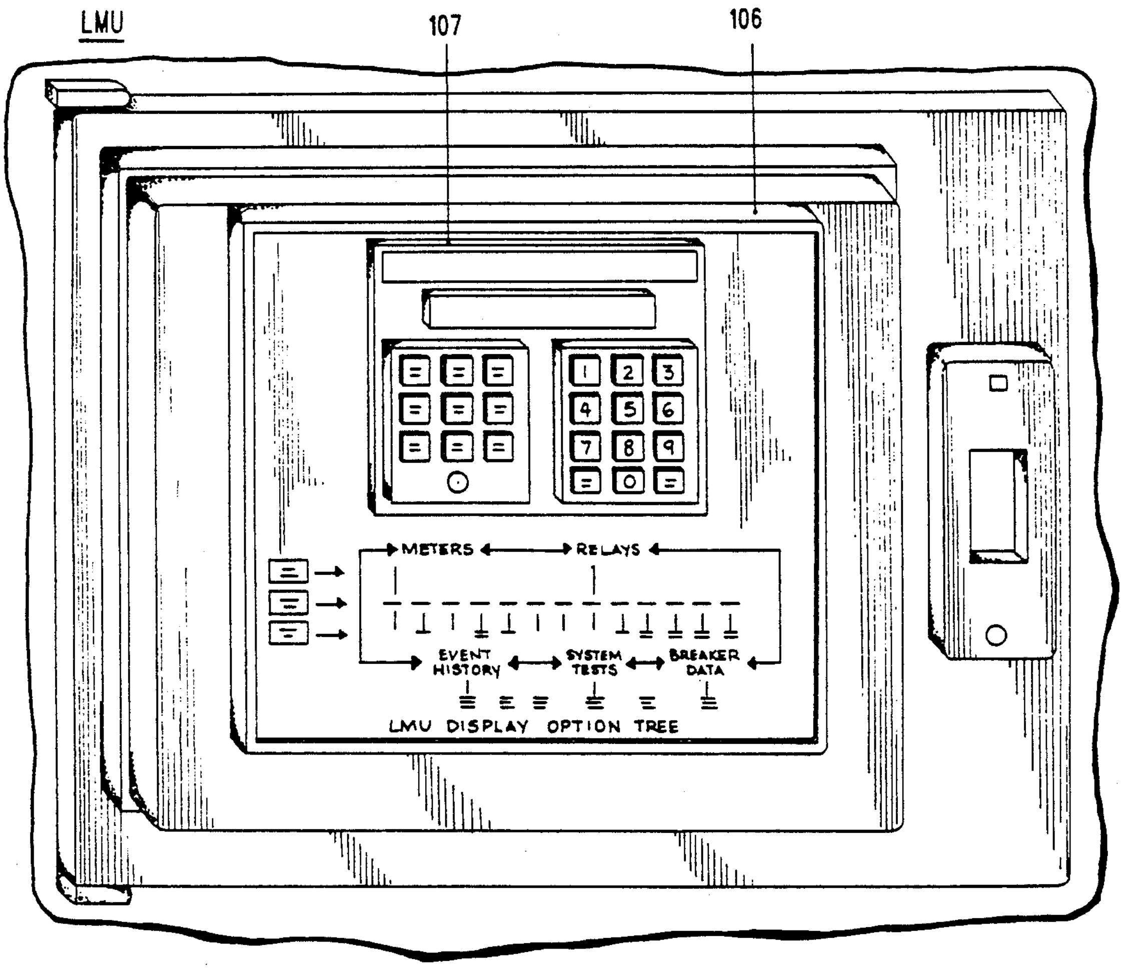
FIG. 4 is a close up drawing of a Local Management Unit, LMU.
Figure 5A:
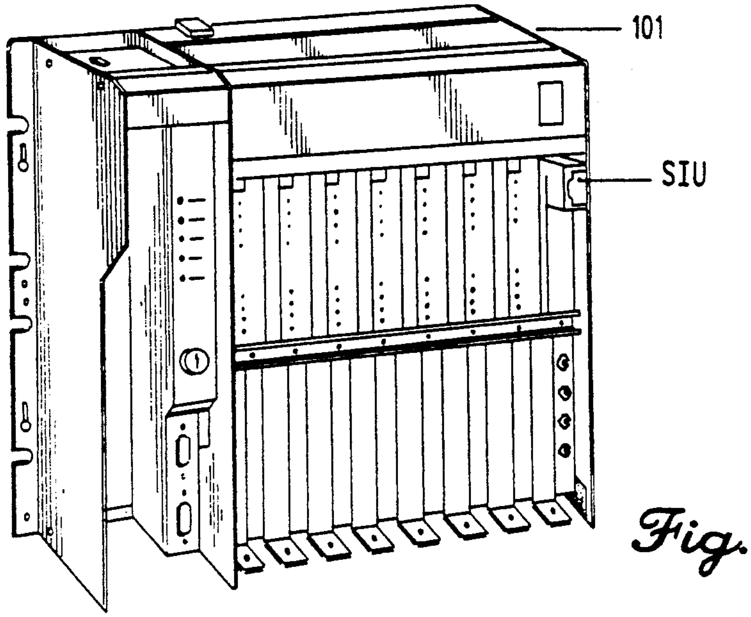
FIG. 5*a* is a drawing of a programmable controller.
Figure 5B:
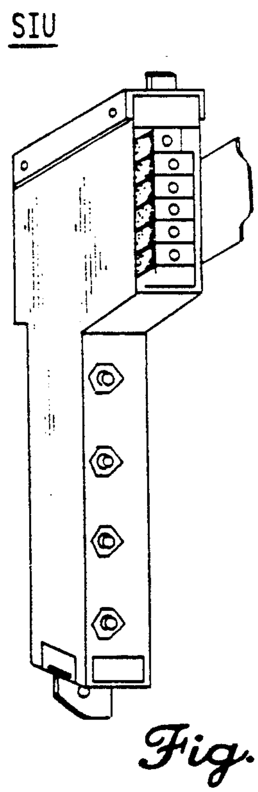
FIG. 5*b* is a drawing of a system interface unit for a programmable controller.
Figure 5C:
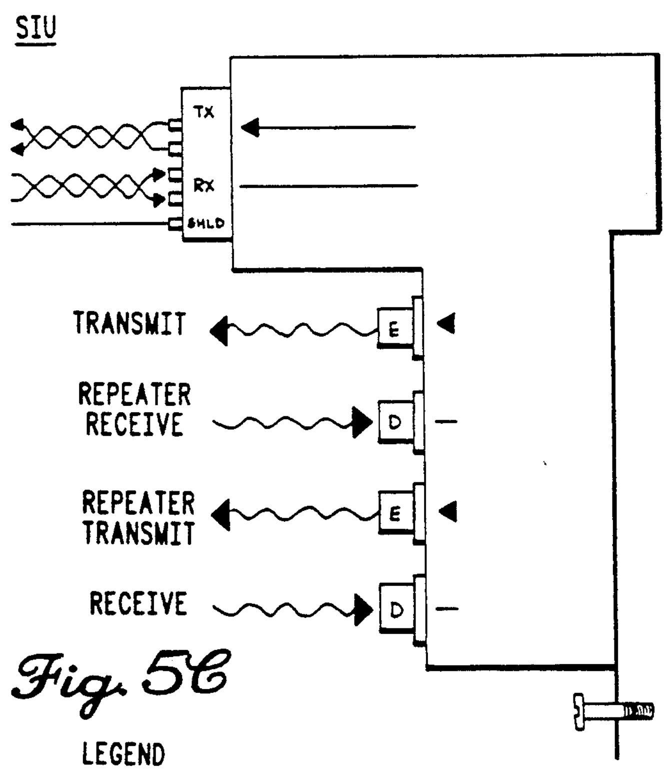
FIG. 5*c* is a schematic for a system interface unit.

FIG. 4 shows a control panel 107 for a Local Management Unit (LMU) 106, mounted on the door of the enclosure for the circuit breaker. The LMU receives data via a serial communication link from the Trip Unit. The Local Management Unit is a microprocessor controlled apparatus for performing several functions, including measurement of electrical current and electrical power at sufficient accuracy for metering purposes, displaying Trip Unit data, displaying LMU data, and for communicating through a ring optical fiber link to a programmable controller, through a System Interface Unit (SIU) along with up to, for example, 64 other Local Management Units, in order to provide an intelligent electrical energy management system.

Figures 5, 25:
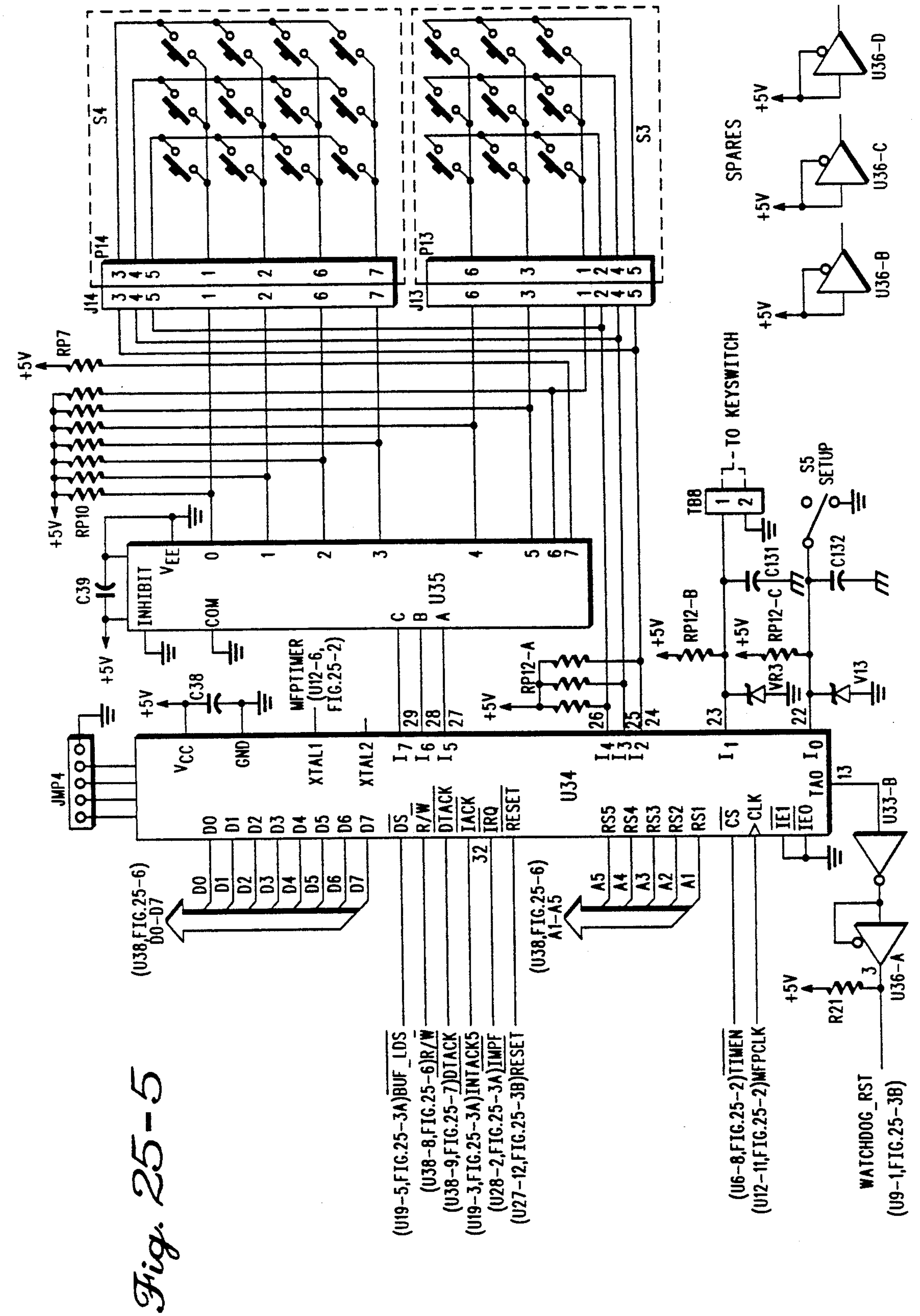

FIG. 5 shows a programmable controller 101. One of the modules in the programmable controller may be a Systems Interface Unit (SIU). The SIU is the transmitter and receiver for the ring type optical fiber communication system, and the SIU may communicate with up to 64 Local Management Units.

Figures 6, 25:
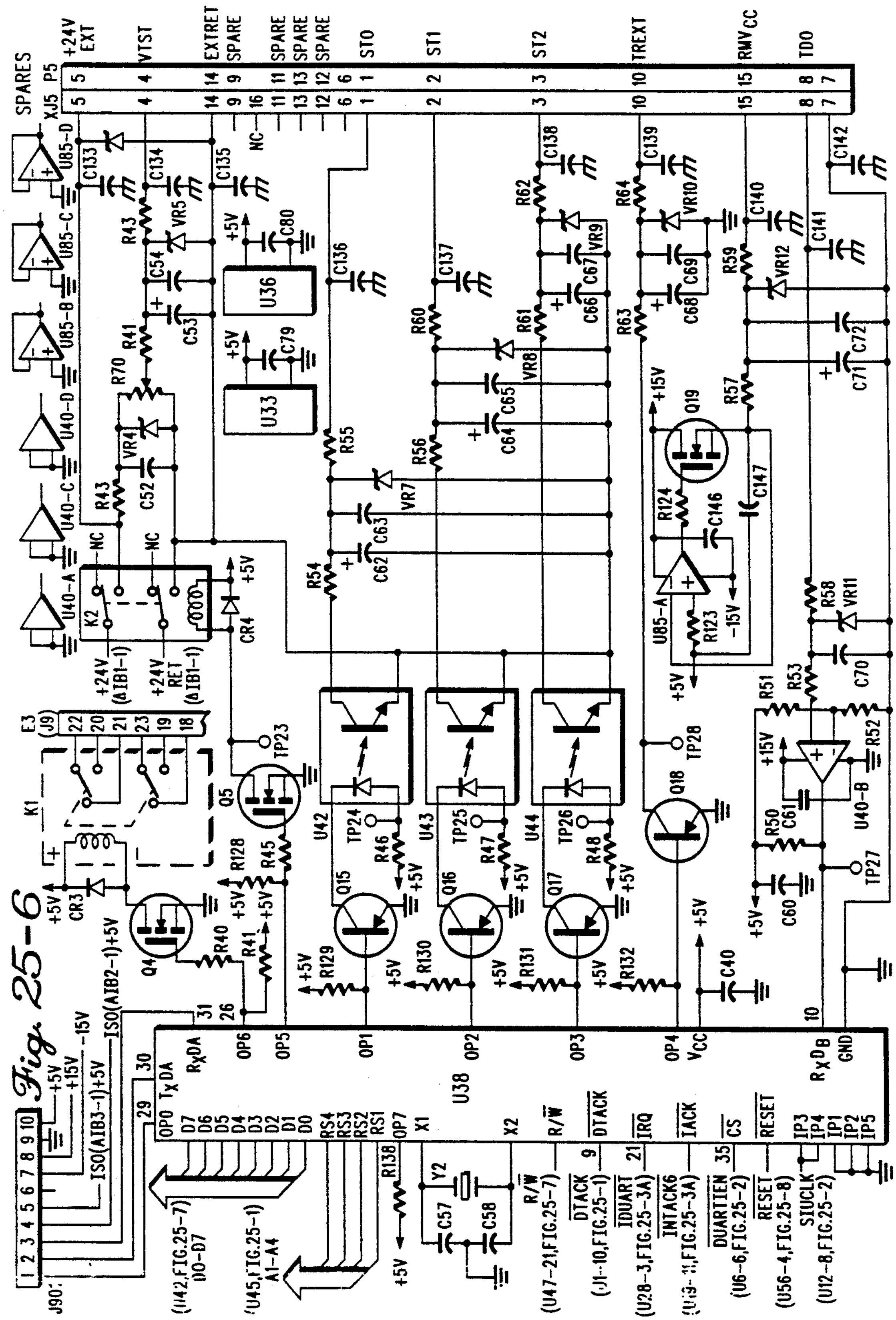

FIG. 6 shows a Display Unit (DU). The Display Unit provides a remote display of functions of the Trip Unit. The Display Unit is an optional feature used when the sophistication of a Local Management Unit is not needed. A Display Unit may mount, for example, on the door of the circuit breaker enclosure, as is shown for the Local Management Unit in FIG. 1. The Display Unit receives data via the serial communications link from the TU.

FIGS. 7*a* and 7*b* illustrate front and bottom views of a Remote Indicator Unit. A Remote Indicator Unit provides contact closures to indicate selected states of the Trip Unit. The Remote Indicator Unit is an optional feature which can be used independently with a Trip Unit or in conjunction with either a Local Management Unit or a Display Unit. The contact closures of the relay may be used for remote signaling of the status of the Trip Unit. The Remote Indicator Unit receives data via the serial communications link from the TU.

Figure 8:
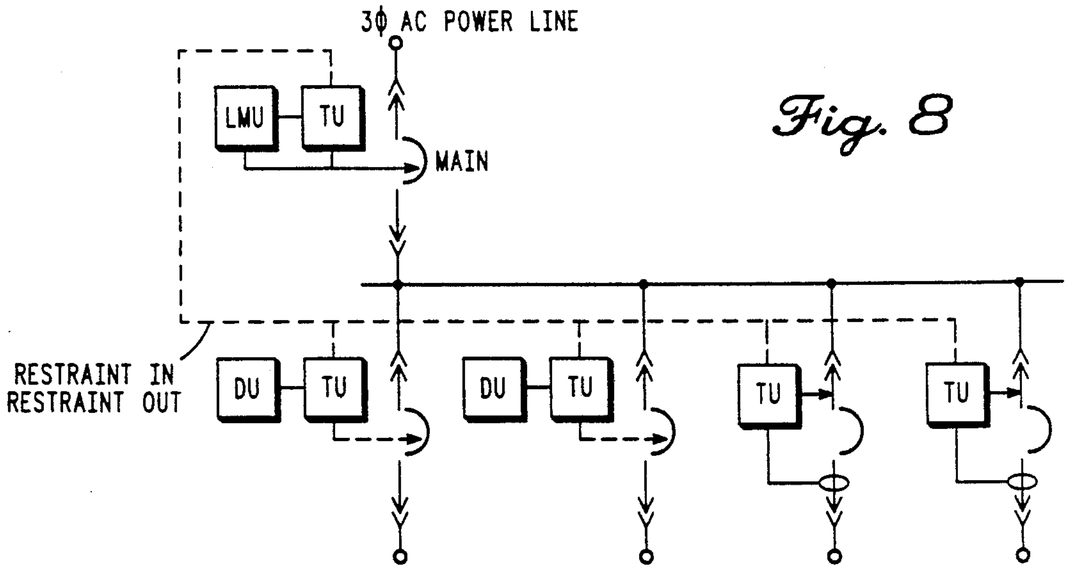
FIG. 8 is a schematic of a simple power distribution system.

FIG. 8 is a schematic diagram of a typical three-phase AC power distribution system. A main circuit breaker utilizes a Trip Unit and a Local Management Unit. A feeder bus supplied by the main circuit breaker feeds branch circuits, each of which is protected by a Trip Unit. As shown, some of the Trip Units have a Display Unit connected and the remaining TU do not. The arrangement shown in FIG. 8 does not permit communications on a serial communications link between the various Trip Units. However, the Trip Units communicate directly by a "restraint-in and restraint-out" system.

Restraint-In, Restraint-Out

The restraint-in and restraint-out system is indicated by the dashed line. Each Trip Unit contains its own microprocessor, and the restraint-in and restraint-out system operates by logic level signals provided by the microprocessor. The purpose of the restraint-in restraint-out connection is for a branch circuit breaker to communicate to a main circuit breaker that a fault is occurring in its branch, and commands the main circuit breaker to utilize a higher current and longer time delay "look up table" in its trip routine. The higher current and longer time delay "look up table" of the main breaker permits the branch breaker to trip first, thereby isolating a power loss to that branch, and avoiding the loss of power to the other branches by a premature trip of the main circuit breaker.

The restraint-in and restraint-out system is a level communications system in addition to communications between circuit breakers through the Trip Unit Serial Communications Link to the LMU, and communication of various LMU Units to a System Interface Unit, SIU. A Trip Unit may be arranged to communicate with another Trip Unit so that the process of occurrence of a trip at the first Trip Unit changes the settings for the occurrence of a trip at a second Trip Unit. For example, if a first Trip Unit monitors a bus supply system and other Trip Units monitor loads deriving their source of electrical energy from the aforementioned bus, then it is desirable to have the downstream Trip Unit trip out first in the event of a fault on its load. The Restraint In, Restraint Out signals connected between a downstream circuit breaker and an upstream circuit breaker cause the downstream circuit breaker to signal the upstream circuit breaker that a fault is occurring in the load of the downstream circuit breaker. Receipt of this signal by the upstream circuit breaker causes the upstream circuit breaker to utilize different settings for developing a trip. The different settings cause the upstream circuit breaker to delay its trip until the downstream circuit breaker has had a chance to isolate the fault. The Restraint In, Restraint Out signaling arrangement prevents the occurrence of a fault on one branch circuit from causing an upstream circuit breaker to trip thereby removing power from other branch circuits in which no fault is occurring.

Some of the branch circuits shown in FIG. 8 are protected by a Trip Unit only. A Trip Unit without a Display Unit, a Local Management Unit, or a Remote Indicator Unit does not have communications capability. However, the status of the Trip Unit may be read from the Trip Unit control panel as shown in FIG. 3.

Figure 9:
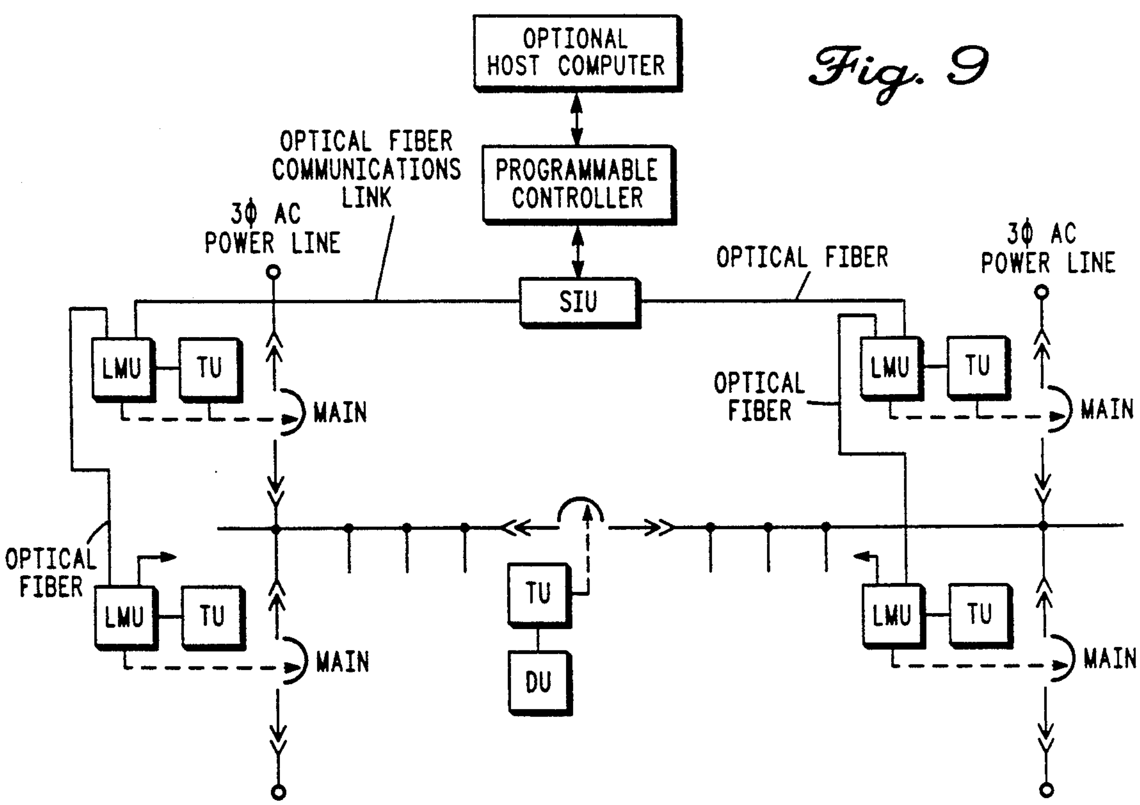
FIG. 9 is a schematic of a more extensive power distribution system.

FIG. 9 shows a more complex electrical energy distribution system. Two main three-phase AC power lines are capable of feeding a number of branch circuits. Each AC power line is protected by a m in circuit breaker. Each main circuit breaker is controlled by a Trip Unit and a Local Management Unit. Restraint-in and restraint-out communications between the branch circuit breakers and the main circuit breaker are available, but is not shown in FIG. 9 for the sake of clarity.

A power "link" is protected by a Trip Unit and a Display Unit. Alternatively, a Local Management Unit could be used with the link Trip Unit.

Branch circuits which are judged to be "critical" are protected by both a Trip Unit and a Local Management Unit. All Local Management Units are connected in an optical fiber ring communication system to a system interface unit (SIU). The SIU is a board plugged into a programmable controller. The SIU is mounted within the programmable controller as a receiver and transmitter for the optical fiber ring communications link.

Various branch circuits may be protected by additional Trip Units in combination with a Local Management Unit, or by Trip Units in combination with a Display Unit, or by Trip Units with a Remote Indicator Unit, or by Trip Units standing alone.

Also shown in FIG. 9 is a connection between the programmable controller and an optional host computer. The communications connection between the programmable controller and the host computer may be by a standardized Manufacturing Automation Protocol, MAP link, or alternatively by any convenient data connection.

SYSTEM CONNECTIONS

Single Trip Unit and Local Management Unit

Figure 10:
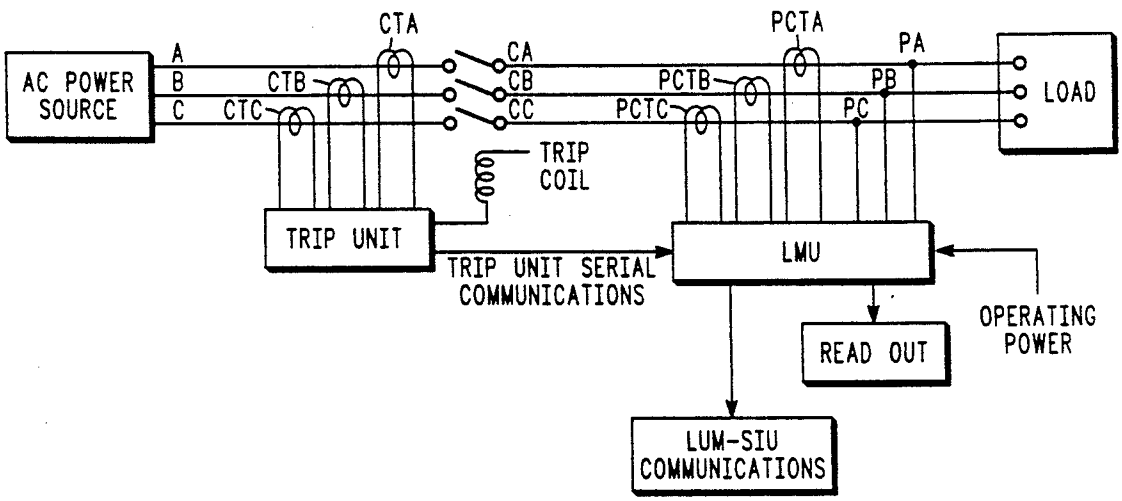
FIG. 10 is a partial schematic of a power distribution system.

FIG. 10 shows the connection of a Trip Unit (TU) and a Local Management Unit (LMU). An AC power source supplies three phase electrical energy to conductors A, B, C. Conductors A, B, C supply energy to the load. Current transformers CTA, CTB, and CTC provide signals to the Trip Unit proportional to current flow in their respective conductors. Contacts CA, CB, and CC interrupt current flow in their respective conductors when the trip coil is energized by the Trip Unit. The trip coil is energized by the Trip Unit whenever current flow in conductors A, B, C exceeds predetermined values. For example, if a short circuit develops in the load, the Trip Unit will energize the trip coil and open contacts CA, CB, CC. Also, if a ground fault occurs in the load the Trip Unit will open contacts CA, CB, CC in order to isolate the fault.

The Local Management Unit, LMU, has input signals from precision current transformers PCTA, PCTB, PCTC, from their respective phases A, B, C. Also, potential connections PA, PB, PC connect to the LMU. The LMU measures current flow, power, reactive power, and phase factor in conductors A, B, C. The LMU measures these quantities to an accuracy necessary for metering purposes as, for example, 1% A read out of the various quantities measured and computed by the LMU may be observed by an operator at the read out block.

The Trip Unit communicates with the Local Management Unit through the Trip Unit Serial Communications Link, an electrical communications link. The Trip Unit transmits, on a predetermined protocol, information including the following: fault conditions including phase and balance pickup or trip, ground fault pickup or trip, short time pickup or trip, long time pickup or trip, 90% of long time pickup, instantaneous pickup or trip, if a trip is occurring, a ground fault pickup condition, a short time pickup condition, a long time pickup condition, an instantaneous pickup condition, whether a self-test trip occurred, current levels in phase A, phase B, and phase C, ground fault current, the option of trip unit or motor protection unit for which the trip unit is set, sensor and plug identifiers, positions of selector switches for long-time delay, long-time pickup, short time delay, short time pickup, ground fault delay, ground fault pickup, instantaneous pickup, phase and balance percent switch, long-time trip memory, the cause of the last trip, the current at the last trip, and other pertinent circuit breaker data. A 31 BYTE stream is cyclically transmitted. The individual bits of each BYTE are discussed hereinbelow.

Operating power for the Trip Unit is supplied by current derived from the current transformer CTA, CTB, CTC. Power for operation of the Local Management Unit, LMU, is supplied by an external power source.

The information communicated from the Trip Unit to the Local Management Unit may be observed by an operator at the readout of the Local Management Unit.

Alternatively, the serial communications port may communicate on a linear bus, and alternatively, may use RS232, RS422 or other standard communications method.

The Local Management Unit has a serial communications port for communicating on a ring optical link, along with up to 64 other Local Management Units, to a programmable controller or other computer.

LMU Optical Ring Communications System

Figure 11:
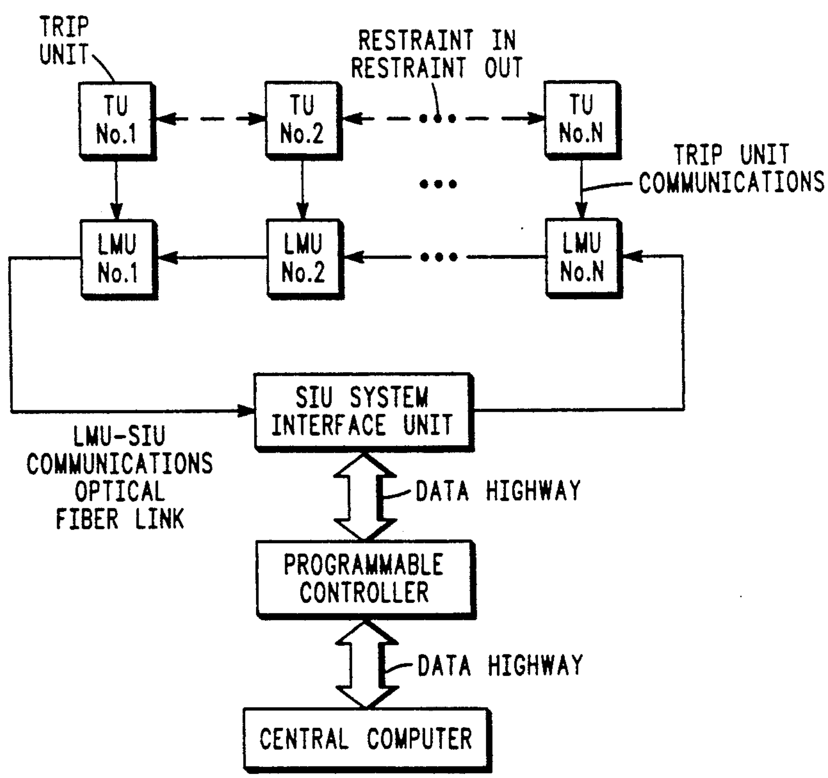
FIG. 11 is a diagram of a power management system having Local Management Units connected in an optical fiber communications system.

FIG. 11 shows a drawing of individual Trip Units, TU, and Local Management Units, LMU, connected in an optical communications ring. Each individual Trip Unit measures current flow to its individual load. Each Trip Unit has its own Local Management Unit for measuring power flow. The Trip Unit communicates to its Local Management Unit on the Trip Unit electrical serial communications link.

The various Local Management Units communicate with a System Interface Unit utilizing an optical ring serial communications system, or alternatively on a linear bus, or may use RS232, RS422 or other standard communications method. Up to 64 Local Management Units can communicate with a single SIU.

Each LMU communicates with the System Interface Unit according to a polling protocol. The SIU/LMU communications protocol is described hereinbelow.

The information communicated by an LMU to the System Interface Unit may include all of the information transmitted from the Trip Unit to the LMU, and also may include all of the information developed by the LMU in its measurement function.

SIU-System Interface Unit

The System Interface Unit may be a module mounted within a programmable controller. For example, the Sy/Max brand of programmable controller sold by the Square D Company may satisfactorily serve as the programmable controller. The SIU module may fit into a slot in a register rack of the programmable controller. The programmable controller normally receives information along a data highway connecting the SIU and the programmable controller. Also, the programmable controller may control the SIU and direct it to poll a particular Local Management Unit, LMU.

Central Computer

Output from the programmable controller may be transmitted along a data highway to a central computer. The central computer may utilize inputs from the SIU along with inputs from various other sensors in order to control processes in a manufacturing plant.

System Connection Diagram

Figure 12:
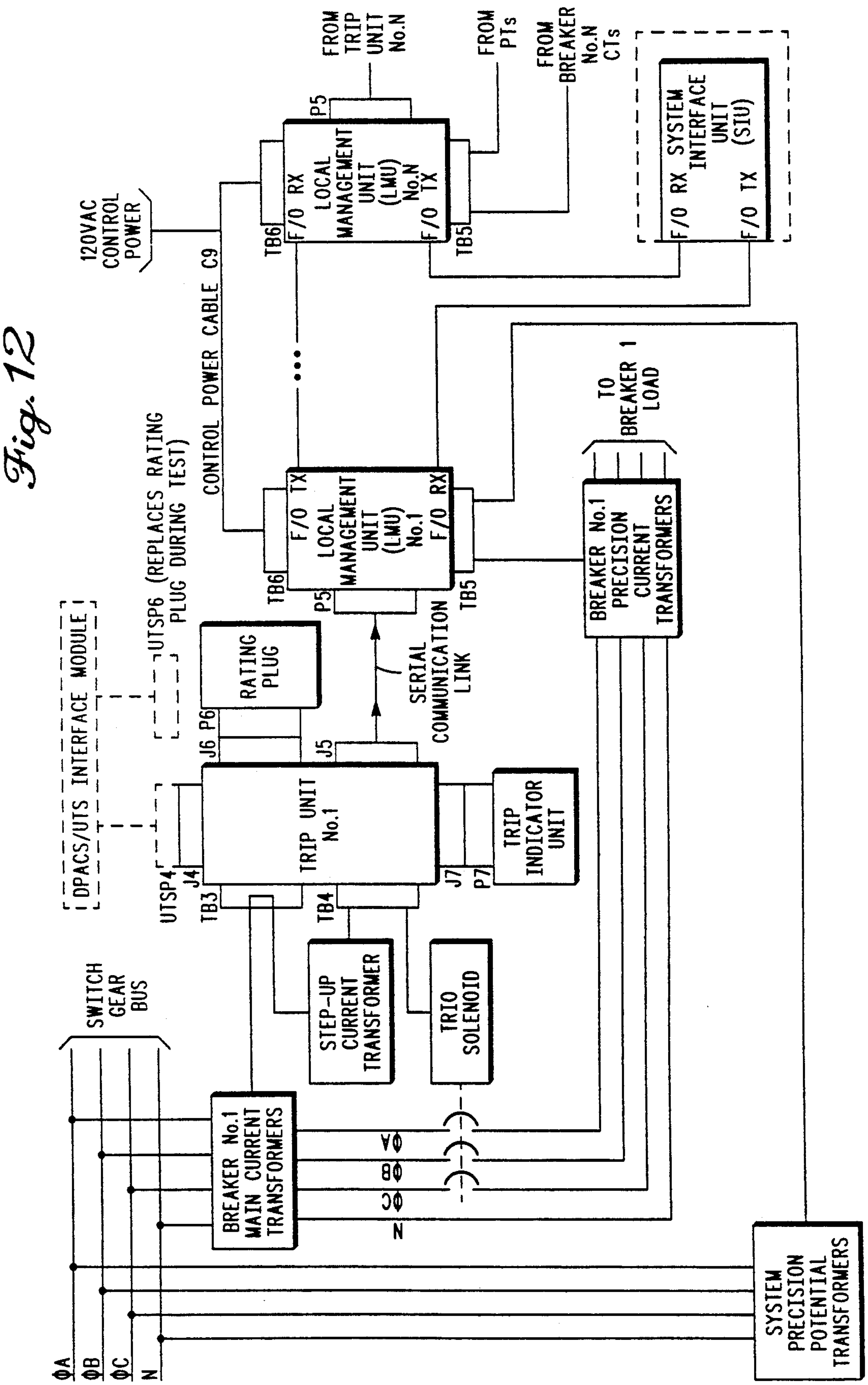
FIG. 12 is a connection diagram for a Trip Unit and a Local Management Unit and having communications between the Trip Unit and a the Local Management Unit, and between a plurality of Local Management Units.

FIG. 12 is a System Connection Diagram. An alternating current bus is shown in the upper left corner of FIG. 12, and includes conductors for phase A, phase B, phase C and the neutral line. Main current transformers for circuit breaker #1 are shown schematically, and are connected to Trip Unit #1 at connection TB3. Conductors passing through circuit breaker #1 main current transformer, conductors A, B, C, N, connect to contacts operated by the trip solenoid. Energization of the trip solenoid by Trip Unit #1 opens the contacts.

Conductors A, B, C, N connect from the downstream side of the contact to breaker #1 precision current transformer, and continue on to the breaker #1 load. The breaker #1 precision current transformers connect at connection TB5 to Local Management Unit LMU #1. A serial communication link from Trip Unit #1 is connected to Local Management Unit LMU #1 at jack J5 of Trip Unit #1 and plug P5 of Local Management Unit LMU #1. Trip Unit #1 has a rating plug connected at jack J6. A Testing and Calibration Unit may be connected to Trip Unit #I at jack J4. Step up current transformers connect into Trip Unit #1 at connection TB4, and accept current at connection TB3 from breaker #1 main current transformers.

Local Management Unit LMU #1 is connected to control power at connection TB #6. Local Management Unit LMU unit #1 is in a fiber optical ring type "daisy chain" serial data communication ring. Other LMU units in the communications ring are indicated, and unit #N is shown. There may be up to 64 LMU units connected in the optical ring "daisy chain". A System Interface Unit, SIU, is shown connected in the optical ring. The SIU connects to a programmable controller. Data transmitted to the System Interface Unit from each of the Trip Units and the Local Management Units may be transferred to the programmable controller. Also, the programmable controller may command the SIU to poll a particular LMU.

Alternative Embodiment for Trip Unit

Figure 13:
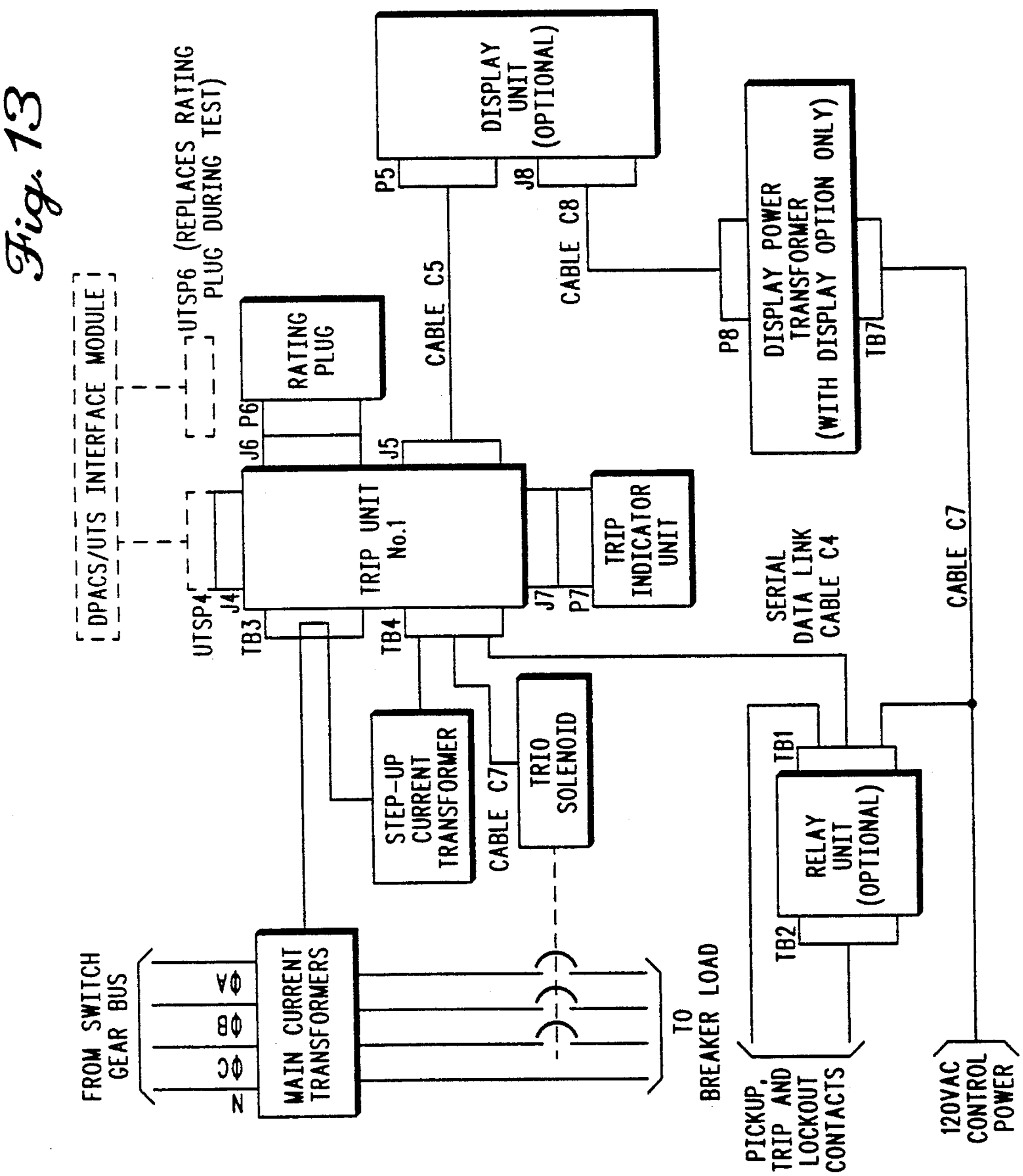
FIG. 13 is a connection diagram for a Trip Unit having communications to a Display Unit.

FIG. 13 shows an alternative embodiment of a Trip Unit. The alternative embodiment does not utilize a Local Management Unit, LMU. The alternative embodiment is a stand-alone circuit breaker utilizing a Trip Unit and a display unit. Rather than connecting an LMU to the TU at jack J5, a Display Unit is connected to the TU at jack J5. Also, a Remote Indicator Unit (RIU) is shown connected to the TU at connection TB4. The RIU is capable of operating a contact in order to signal a long time pick-up or dry trip condition of the Trip Unit.

The Display Unit accepts the serial communications data stream output by the TU, just as the LMU accepts the serial data stream, and may display the data at a location remote from the Trip Unit. Internal operation of the Display Unit and the RIU will be described hereinbelow.

Trip Unit I/O Connections

Figure 14:
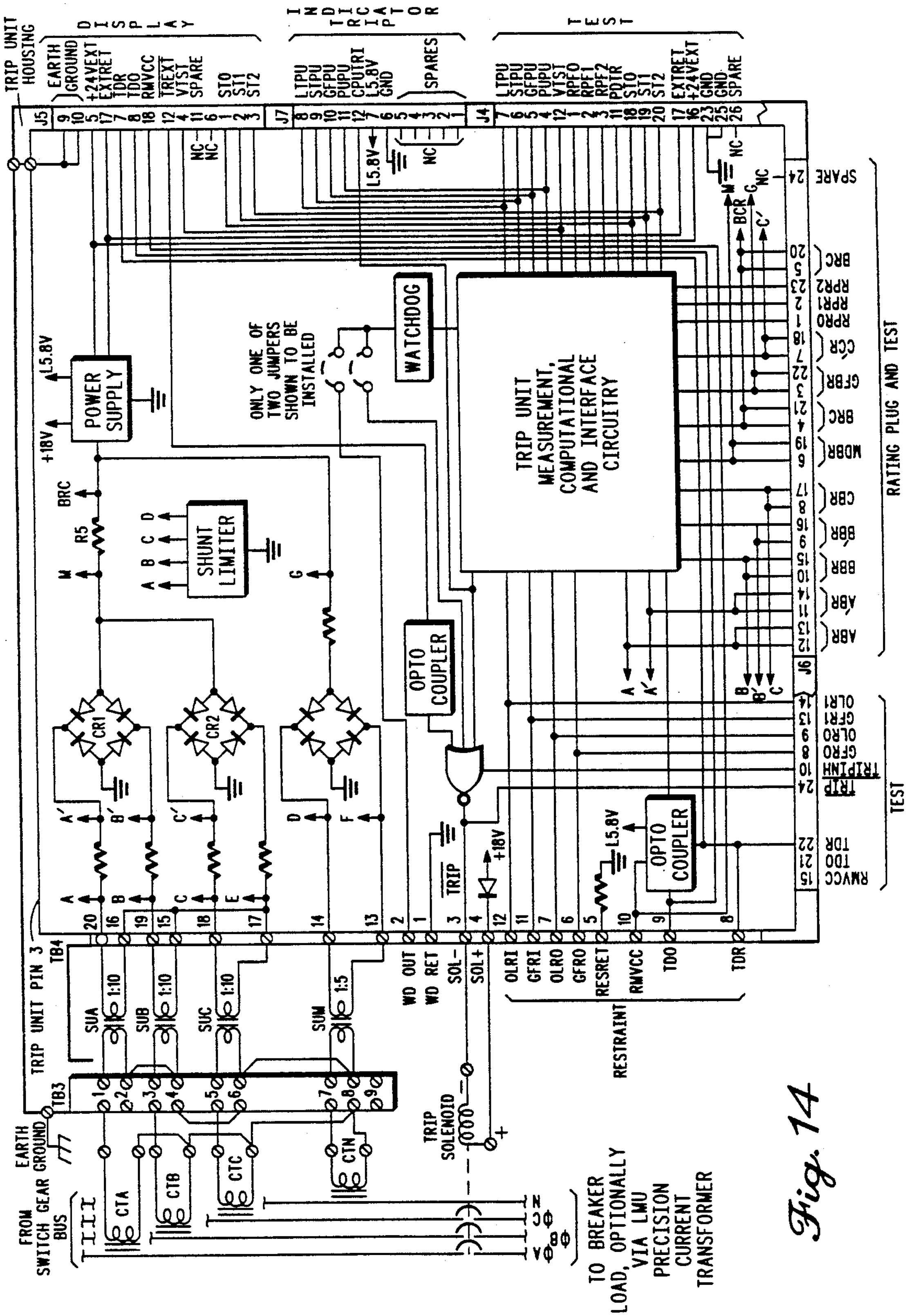
FIG. 14 is a partial schematic of a connection of a Trip Unit to a power distribution system.

FIG. 14 shows connections between a Trip Unit and a 3 phase AC line. Conductors A, B, C, and Neutral, are shown at the left of FIG. 14 in the connection between a switch gear bus and a load. Current flow in conductors A, B, C may be interrupted by opening of the contacts. The trip solenoid, when energized, opens the contacts.

Main current transformer CTA, CTB, CTC, and CTN are shown. Current transformer CTN develops a voltage proportional to the current flow in the neutral line. The main current transformers are connected to current transformers SUA, SUB, SUC, and SUM. Transformers SUA, SUB, and SUC have turns ratio of, for example, 1 to 10. The SUM current transformer has a turns ratio of, for example, 1 to 5, in order to provide a larger output voltage for a smaller current flow in the neutral line.

TRIP UNIT HARDWARE

Throughout the hardware of the Trip Unit, a logical "high" refers to approximately 5.8 volts on a signal line. A logical "low" refers to a signal line at approximately ground potential.

Trip Unit Current Transformers

As shown in FIG. 14, power for the electronics of the Trip Unit (TU) is derived from current flow in the power conductors of the circuit breaker Current flow in phase A induces a proportional current in current transformer (hereinafter abbreviated CT) secondary CTA. Current flow in phase B induces a proportional current in CT secondary CTB, current flow in phase C induces a proportional current in CT secondary CTC, and current flow in the neutral induces a proportional current in CT secondary CTN.

The currents in the CT secondaries CTA, CTB and CTC also pass through the primaries of step-up transformers SUA, SUB and SUC, respectively, which each have a turns ratio of 1 to 10. The turns ratio of 1 to 10 means that a current is induced in each of their respective secondaries which is one-tenth of the current in their primaries These current sources have respective voltage compliances approximately ten times greater than those of CT secondaries CTA, CTB and CTC, respectively, and for this reason they are called step-up instead of step-down transformers, in spite of the fact that they produce a reduced current flow.

A ground fault is detected by a lack of balance between the phase current transformers and the neutral current transformer CTN. CTN returns all loads connected between any of the three phases (A, B or C) and the neutral power conductor. Any phase current not balanced by the other phase currents or by the neutral conductor current flow provides a net current flow through the ground fault summer, transformer SUM, primary. That is, if the sum of the currents flowing in CT secondaries CTA, CTB, CTC, and CTN is not zero, indicating a ground fault, the remainder flows through the primary of transformer SUM. The summer transformer SUM has a turns ratio of 1 to 5, which results in a reduction in current flow from primary to secondary of a factor of five, as well as a voltage compliance increase of approximately 5.

Step-up transformers SUA, SUB and SUC drive two full-wave bridge rectifiers, CR1 and CR2. One side of the secondary of SUA is connected via a current sense resistor, R1, to one AC terminal of bridge CR1 and the same side of SUB (in the sense of current flow in the main power conductors) is connected via R2 to the other AC terminal of SUB. The same side of the secondary of SUC is connected via R3 to one AC terminal of CR2. And the return sides of SUA, SUB and SUC are connected together, and this junction is then connected via R5 to the other AC terminal of CR2. Both of these bridges have their negative terminals connected to the Trip Unit's circuit ground. The positive terminal of bridge CR1 is connected to the positive terminal of bridge CR2 and this junction is connected via sense resistor R5 to the power supply. Current to supply the electronics of the Trip Unit flows through resistor R5 to point BRC.

Trip Unit Schematic Diagrams

Figures 1A, 15:
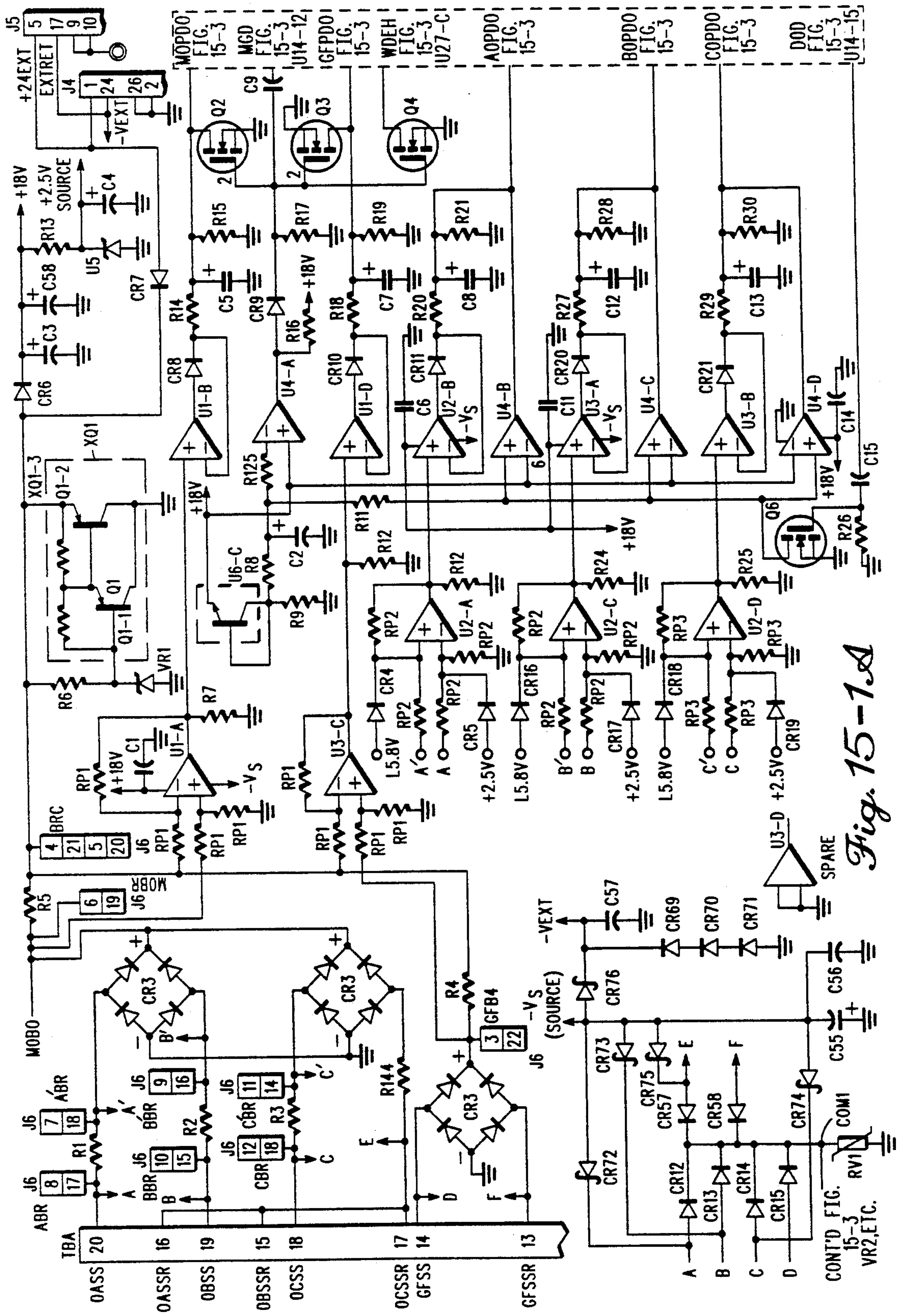
Figures 2A, 15:
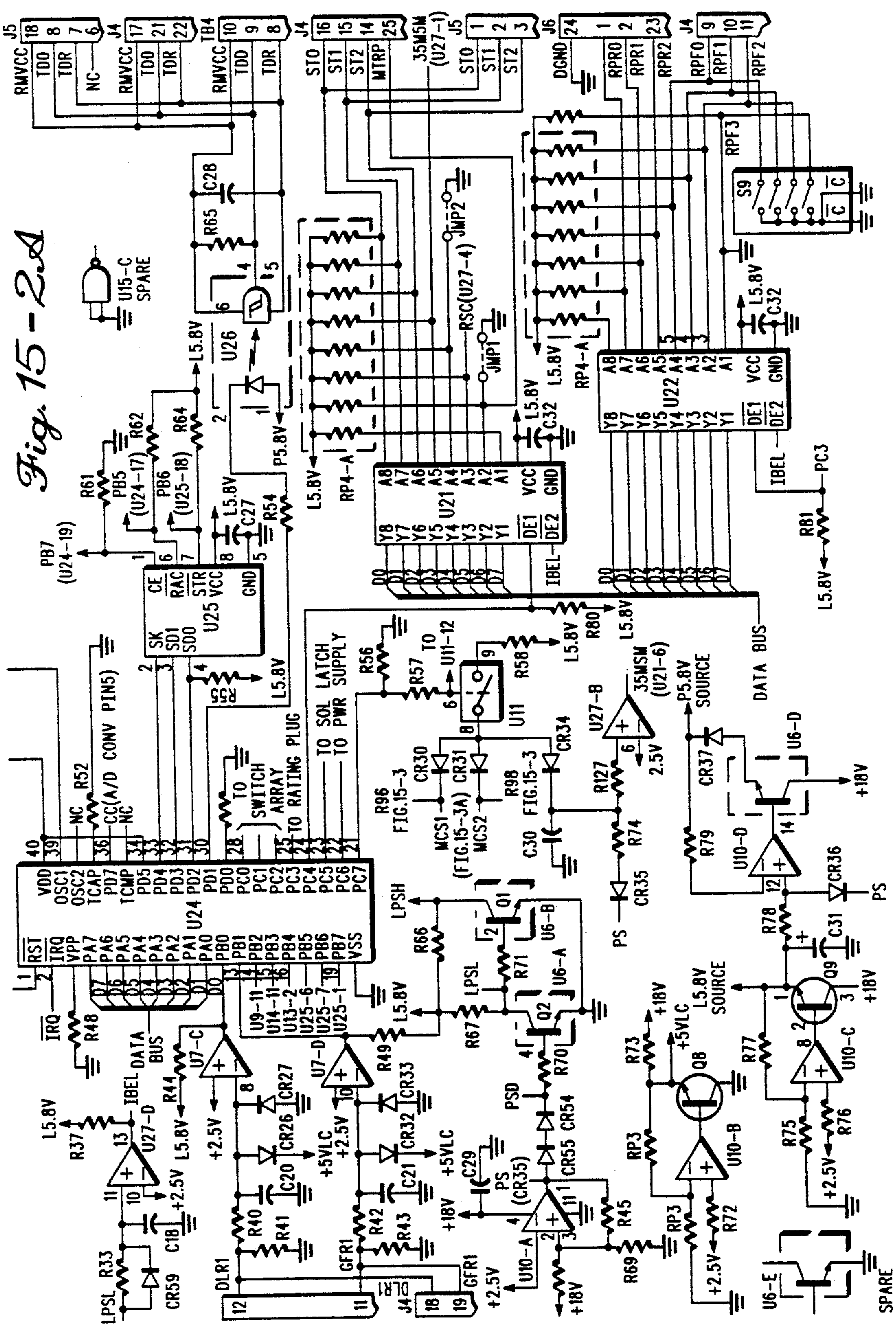

The Trip Unit schematic diagrams are on four sheets designated FIG. 15-1 through FIG. 15-4. The diagrams indicate continuations to sheet 1, sheet 2 . . . etc. A continuation to sheet 2 can be read as to FIG. 15-2, etc.

Trip Unit Voltage Regulation

As shown in FIG. 15-1, power is supplied to the Trip Unit by the current transformers, and input to the regulator circuits occurs at point BRC.

The dynamic range of current flows in conductors A, B, and C make it difficult to design a power supply having a constant output voltage under all conditions of current flow in conductors A, B, and C. The voltage at point BRC depends very strongly on current flow in conductors A, B, C. And the electronic circuits require a well regulated power supply. Particularly, a power supply that supplies sufficient voltage for operation of the electronics when current flow in the conductors A, B, and C is a small fraction of P may have difficulty in limiting the output voltage when current flows are considerably in excess of P. P is the plug rating and has defined values between approximately 200 amperes to approximately 4000 amperes. For example, the power supply may be designed to provide a proper output voltage for current flow in conductors A, B, C of 0.1 P. The power supply may then produce excessive voltages if current flow should be as great as 16 P or even 32 P.

The invention uses two regulator circuits in order to achieve a regulated power supply output voltage, as shown in FIG. 15-1.

The first regulator is a shunt regulator deriving current from point BRC through an equivalent Zener diode to ground. The equivalent Zener diode is made from integrated circuit XQ1. Circuit XQ1 holds point BRC slightly above 18 volts. Capacitor C3 is a filter capacitor. Capacitor C3 may be a 350 microfarad capacitor, and is charged through diode CR6. The 18 volt supply is obtained across capacitor C3, and the 18 volt supply provides current for the electronics of the Trip Unit.

The first regulator also provides a precision 2.5 Volt source across Zener diode U5. Capacitor C4 provides further regulation of the precision 2.5 Volt source.

A difficulty found in the first regulator is that current excursions in the conductors A, B, C far in excess of the P rating of the circuit breaker may cause excessive voltages at the 18 volt point, and may burn out electronics supplied by the power supply. Also, excessive voltages at points A, A′, B, B′, C, C′, D, E, F and G may drive operational amplifiers U1-A, U3-C, U2-A, U2-C, U2-D into saturation, particularly when the voltages to ground exceed the operational amplifier common mode rejection threshold. The operational amplifiers generate analog voltages in response to current flow in conductors A, B, C.

The second regulator is shown in FIG. 15-1 and FIG. 15-3. The second regulator is a shunt limiter, and is a circuit for driving the voltage at point BRC to zero for predetermined time periods. The second regulator incorporates a relaxation oscillator to cyclically short circuit point BRC to ground. In FIG. 15-1, Points A, B, C, D, E, and F are connected through diodes CR12 . . . CR15, CR57, CR58 to a common point COM1. Metal Oxide Varistor MOV, RV1 provides some transient protection for point COM1.

As shown in FIG. 15-3, Zener diode VR2, which may be a 30 volt Zener diode, charges capacitor C59 through diode CR62. Resistor R23 provides a discharge path for capacitor C59, and diode CR62 prevents discharge of capacitor C59 back through points A, B, C, D, E, or F.

Resistor R131 and resistor R132 provide a voltage divider, and their junction point provides a signal to op-amp U30-A at its negative input terminal. A signal to the positive input terminal of op-amp U30-A is taken from the positive terminal of capacitor C59.

In operation, the voltage at the negative input terminal of op-amp U30-A is one-half the voltage at point COM1, with R131 and R132 being set equal, where R131 and R132 may be 10k ohm resistors. When the voltage at point COM1 exceeds the 30 volt characteristic of the Zener diode VR2, then the voltage at the positive input terminal of operational amplifier U30-A will exceed the voltage at the negative input terminal, thereby turning op-amp U30-A "off" and allowing output terminal 1 of U30-A to go to the voltage of point COM1. Transistor Q13 provides current amplification and drives base current into Darlington pair XQ5.

Darlington pair XQ5 thereby turns "on" and goes into conduction saturation. Conduction of transistors Darlington pair XQ5 short circuits point COM1 to ground through small resistor R136, and R136 may be 0.1 ohm. Shorting point COM1 to ground pulls the voltage at points A, B, C, D, E, and F to near ground, thereby limiting the output voltage of the shunt regulator XQ1 at point BRC to much less than 18 volts.

However, it is desirable to maintain current flow to the electronics of the apparatus by discharge of capacitor C22, C46, shown in FIG. 15-2. However, the load supplied to microprocessor U24 may vary between 100 milliamperes to as much as 900 milliamperes when the electronics activate the trip coil to trip the breaker to an "Off" state. This current load far exceeds the energy storage capacity of capacitors C22, C46. Accordingly, the shunt limiter permits periodic charging of capacitors C22, C46 while still limiting the output voltage of the shunt regulator.

In order to permit the periodic charging of capacitors C22, C46, the current limiter acts as a relaxation oscillator. Capacitor C59 and resistor R23 determine the off-time of the relaxation oscillations.

The initial voltage transient which drove point COM1 to high voltage charged capacitor C59. Capacitor C59 will discharge through resistor R23 when Darlington pair XQ5 shorts points A, B, C, D, E, F to ground. However, diode CR62 blocks a more rapid discharge of capacitor C59 backwards through the current transformers. For example, R23 may be a 5k ohm resistor and capacitor C59 may be a 0.05 microfarad capacitor, thereby having a time constant of approximately 0.25 milliseconds. When capacitor C59 discharges to the point that the positive input terminal of op-amp U30-A becomes of lesser potential than the negative input terminal of op-amp U30-A, then op-amp U30-A turns "on", stopping base drive into transistor Q13. However, capacitor C51 was charged to approximately the voltage reached by point COM1 during the transient of op-amp U30-A. Capacitor C51 slowly discharges through resistor R135, thereby allowing Darlington pair XQ5 to slowly go out of conduction, thereby allowing point COM1 to rise as the voltages of points A, B, C, D, E, and F are pulled up by the current transformers As the voltages at points A, B, C, D, E, and F rise, current flow is reestablished to charge capacitors C22, C46, FIG. 15-2.

The slow discharge of capacitor C51 through resistor R135 limits the rise time of the current flow into capacitors C22, C46. Capacitor C51 may be 0.01 microfarad and resistor R135 may be 100k ohm, thereby giving a discharge time of capacitor C51 of approximately 1.0 milliseconds.

After the voltage at point COM1 has risen sufficiently to develop 30 volts across the Zener diode, then capacitor C59 reaches a voltage sufficient to drive the positive input terminal of op-amp U30-A in excess of the potential at the negative input terminal, thereby starting the relaxation oscillation cycle over again.

Trip Unit Catastrophic Event Trip

A "catastrophic event" trip of the circuit breaker is shown in FIG. 15-3 and is provided by the voltage developed across resistor R136. A voltage is developed across resistor R136, and this voltage provides an output to drive the trip solenoid driver transistor Q12 through discriminator amplifier U30-B. Transistor Q12 is shown in FIG. 15-3. The voltage developed across resistor R136 thus provides a very high current, rapid trip of the circuit breaker.

An output signal from the microprocessor U24 port PC7 pin 21 is connected to inhibit the catastrophic event trip. The inhibit signal from the microprocessor provides an opportunity for the microprocessor, in the event of a heavy current surge which is not of "catastrophic" magnitude, to initiate an orderly trip of the circuit breaker. The orderly trip also permits the microprocessor to output information to the non-volatile memory in order to record parameters of the trip.

The voltage developed across R136 changes capacitor C53 at point PT1. The voltage at point PT1 is amplified by op-amp U30-B, and the output of op-amp U30-B drives transistor Q12 into conduction, thereby tripping the circuit breaker "off". When U11 pin 6 is "high", then transistor Q14 is conductive, thereby shorting out point PT1 through the internal resistance of transistor Q14. In the event that a catastrophic event develops enough current flow through resistor R136 to drive up the voltage at point PT1 even though transistor Q14 is shorted, then op-amp U30-B will develop enough output to drive transistor Q12 into conduction and thereby trip the circuit breaker "off".

The +18 V source from FIG. 15-1 connects to the junction of resistors R139, R142, and may, if the 18 volt source goes too high during a catastrophic event, drive through diode CR65 and drive transistor Q12 into conduction, thereby tripping the circuit breaker "off".

TRIP UNIT POWER-UP CONTROL

The 18 volt power source is shown in FIG. 15-1. Operating power is obtained at point BRC through resistor R5. Zener diode VR1 and shunt regulator QX1 provide an 18 volt source at the positive terminal of filter capacitor C3. Zener diode U5 and resistor R13 provide a precision 2.5 volt source. External power may be applied to the Trip Unit through jack J5 at pin 5, or at jack J4 pin 1. A plus 24 volt potential applied to either jack J4 or J5 provides a current flow through diode CR7 to the point BRC in order to power the Trip Unit, and the internal impedance of the external power source permits shunt regulator XQ1 to regulate point BRC to 18 volts.

Under ordinary operating conditions, as current flow to the load begins to build up after a load is switched on, the output voltage of the shunt regulator at the 18 volt source will begin to increase from a zero potential toward the 18 volt value.

After the shunt regulator comes into regulation, the 18 volt source will stabilize at 18 volts. Before the 18 volt source reaches 18 volts, the precision 2.5 volt source will stabilize at 2.5 volts when the potential at point BRC reaches approximately 3.0 volts.

As load current through conductors A, B, C is turned off and on, the voltage supplied to the electronics of the Trip Unit may vary. The microprocessor of the Trip Unit U-24 has a short time power supply provided by capacitors, C22, C46, and also the microprocessor must be properly reset.

Referring to FIG. 15-2, op-amp U10-A, transistor U6-A and transistor U6-B provide logic signals indicative of the status of the 18 volt power source.

The status of the voltage at point BRC, that is the 18 volt source, is monitored by op-amp U10-A as shown in FIG. 15-2. The 18 volt supply is connected by voltage divider R68, R69, to positive input pin 3 of op-amp U10-A. The precision +2.5 volt source is connected to the input of op-amp U10-A at negative input pin 2. Op-amp U10-A is powered by the 18 volt source at pin 4 of op-amp U10-A. R68 and R69 provide a voltage divider which applies a fraction of the 18 volt source to input pin 3 of op-amp U10-A. When the 18 volt source reaches approximately 12.5 volts, then pin 3 of op-amp U10-A goes higher than 2.5 volts, and therefore higher than negative input pin 2 of op-amp U10-A, thereby turning op-amp U10-A "off". When op-amp U10-A turns off, output pin 1 of op-amp U10-A switches to approximately the voltage supplied by the 18 volt source, and at "switch on" time pin 1 of op-amp U10-A goes to approximately 12.5 volts. The 12.5 volts at pin 1 appears as signal PS, and after 2 diode drops, appears as signal PSD. Signals PS and PSD are used to control various chips in the Trip Unit. After the 18 volt source reaches 18 volts, signal PS reaches approximately 18 volts, and signal PSD reaches approximately 17 volts.

As shown in FIG. 15-2, the L5.8 volt voltage source is provided by transistor Q9. The left side of resistor R76 connects to the precision 2.5 volt source. The 18 volt source connects to collector pin 3 of transistor Q9. A voltage doubler circuit comprises op-amp U10-C, resistor R76, resistor R75, and resistor R77. As the power supply comes "on", and precision voltage source 2.5 volts reaches 2.5 volts, then op-amp U10-C is turned on and develops approximately 5 volts at its output pin 8. Op-amp U10-C turns on transistor Q9, and as long as the 18 volt source is above approximately 6 volts, emitter pin 1 of transistor Q9 is at 5.8 volts. Emitter pin 1 of transistor Q9 is the source of the voltage indicated as L5.8 volt source. The L5.8 volt source is filtered by capacitor C31.

The P5.8 volt source is provided by op-amp U10-D, transistor U6-D and associated circuitry. The L5.8 volt source controls op-amp U10-D to produce approximately 5.8 volts at its output pin 14. The 18 volt source, through transistor U6-D, generates the P5.8 volt source, where the transistor U6-D amplifies the output of op-amp U10-D.

The P5.8 volt source "switch on" time is controlled by signal PS. The P5.8 volt source switches "on" as the 18 volt source reaches approximately 12.5 volts, thereby driving signal PS high. Diode CR36 provides a clamp of the input of op-amp U10-D, where the clamp is controlled by a status circuit comprising op-amp U10-A. Before the power supply 18 volt source voltage rises above 12.5 volts, op-amp U10-A is turned "off" and signal PS is at ground, thereby clamping the positive input of op-amp U10-D at pin 12 to ground. After the 18 volt source rises above 12.5 volts, op-amp U10-A becomes non-conductive, thereby driving signal PS to the voltage being supplied by the 18 volt source at that point in time, that is 12.5 volts at the time of transition, and thereby permitting input pin 12 of op-amp U10-D to rise to the 18 volt source level. Input pin 12 of op-amp U10-D rises to the L5.8 volt value, and thereby switches "on" the P5.8 volt source.

The P5.8 volt source is capable of providing operating current at a voltage of 5.8 volts. The P5.8 volt source provides current to a number of circuits in the Trip Unit, including the microprocessor U-24. The L5.8 volt source supplies power at 5.8 volts to many of the integrated circuits in the Trip Unit.

In summary, as the power supply turns on, the 18 volt source slowly rises, the 2.5 volt precision source, at the positive terminal of capacitor C-4, becomes constant at 2.5 volts after point BRC reaches approximately 3 volts. Finally, as the 18 volt source value rises above 12.5 volts, op-amp U10-A switches to an "off" state, thereby permitting, through signal PS, op-amp U10-D to switch state and begin supplying the P5.8 volt source to microprocessor U-24 and other circuits in the Trip Unit.

POWER SUPPLY LOGIC SIGNALS

Two logic signals, LPSL and LPSH, indicative of power supply status, are generated by transistors U6-A and U6-B.

Logic signal LPSL goes "low" when the 18 volt source rises above 12.5 volts. As the voltage at the 18 volt source rises from zero towards 12.5 volts, output pin 1 of op-amp U10-A is held at ground, thereby grounding input pin 4 of transistor U6-A, thereby holding transistor U6-A "off". Signal LPSL, taken at the collector of transistor Q2, is held at 5.8 volts by the L5.8 voltage source. Logic signal LPSL goes "low" when op-amp U10-A turns "on" as a result of the 18 volt source rising above 12.5 volts. That is, transistor U6-A is turned "on" by its input pin 4 going "high". Thus, the signal LPSL switches "low" when the 18 volt source goes above 12.5 volts.

Logic signal LPSH goes "high" after the power supply 18 volt source goes above 12.5 volts. Signal LPSH is "low" while the 18 volt source voltage is between zero and 12.5 volts, by pin 2 of transistor U6-B being held "high" by voltage source L5.8 volts. When transistor U6-A becomes conducting and grounds signal LPSL, then transistor Q1 is turned "off", driving its collector high, and therefore driving signal LPSH high by action of the L5.8 volt source.

Figure 16:
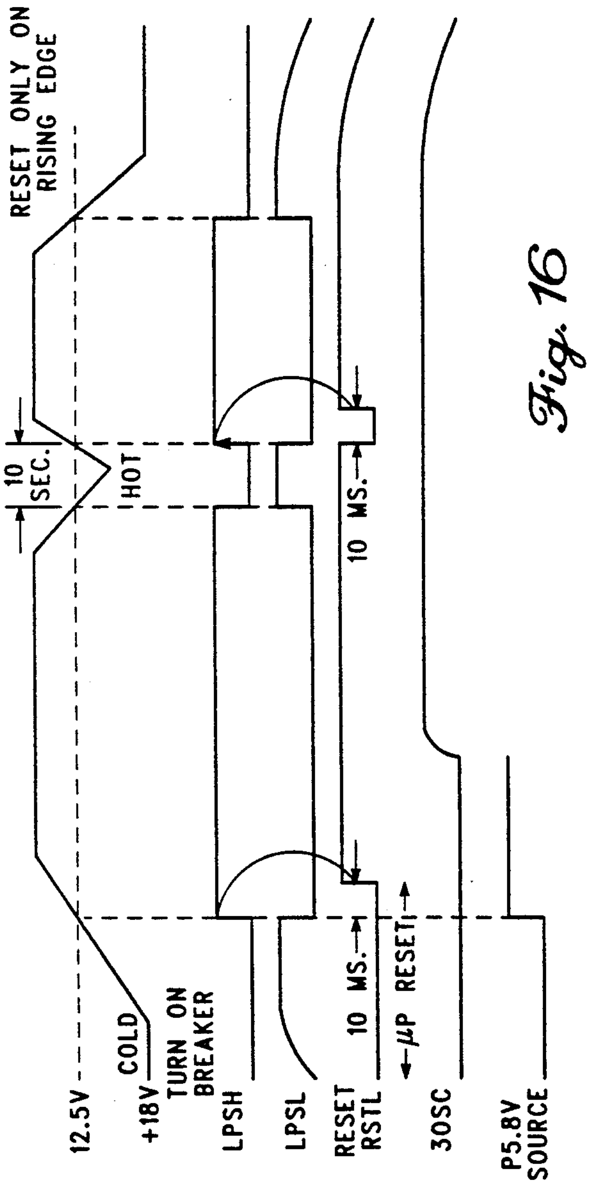
FIG. 16 is a timing diagram of a Trip Unit.
Figures 2B, 15:
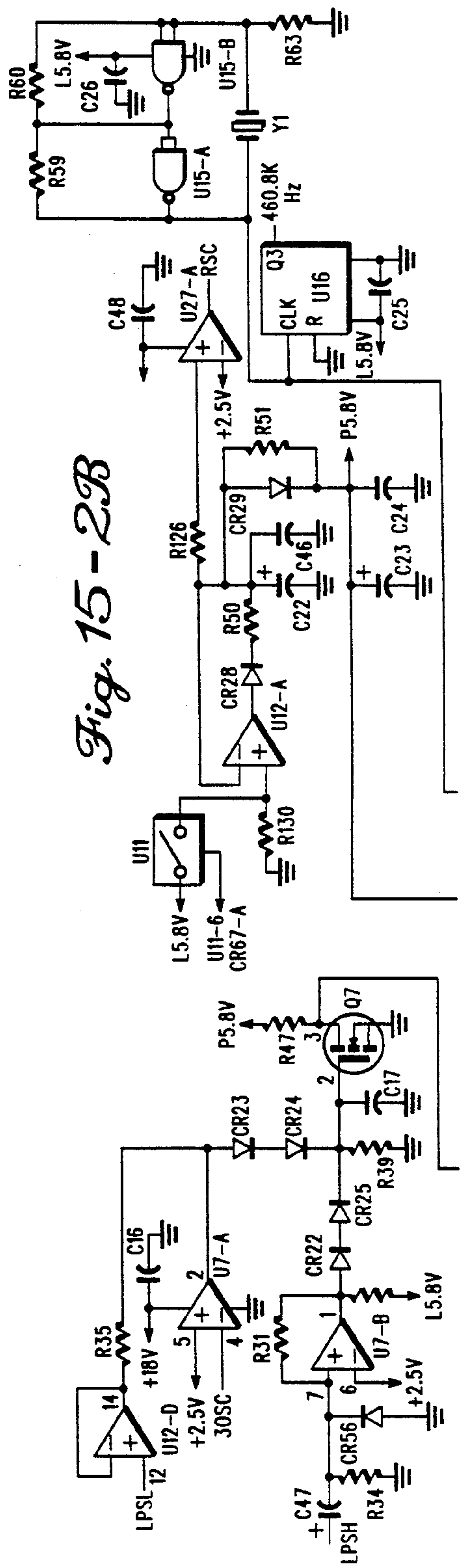
Figures 3A, 15:
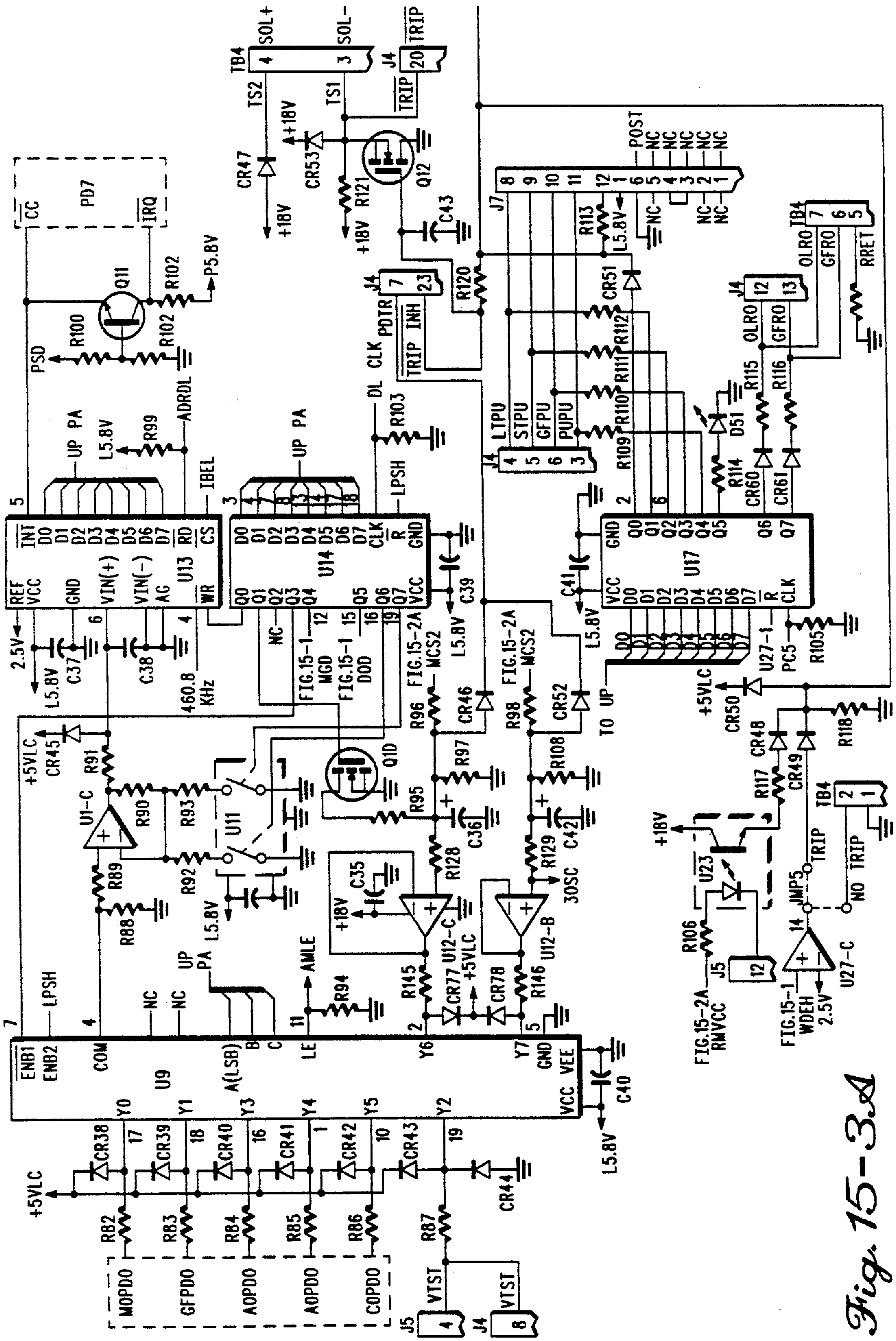

Power is "good" and the microprocessor U-24 can operate reliably when the 18 volt source reaches 12.5 volts. The fact that power is "good" is signaled by signal LPSL going "low" and LPSH going "high." The 18 volt source goes "good" after it reaches a potential of 12.5 volts. FIG. 16 is a timing diagram graph and shows logic signal LPSH going high at the time that the 18 volt source goes "good", and signal LPSL going low at the time that the 18 volt source goes "good". Also the graph shows the P5.8 volt source switching "on" to 5.8 volts, where the transition is caused by signal PS at the time that the 18 volt source goes "good".

LPSH means Logic Power Supply High. LPSL means Logic Power Supply Low. LPSH goes high when the 18 volt source becomes "good", or equal to 12.5 volts. LPSL goes low when the 18 volt source becomes "good".

MICROPROCESSOR RESET

Microprocessor U-24 is reset under control of logic signals LPSH, LPSL and an additional signal 30SC, as shown in FIG. 15-2. Reset of microprocessor U-24 is controlled by op-amp U7-A, op-amp U7-B, op-amp U12-D, and FET transistor Q7. Microprocessor U-24 is reset by first driving its pin 1,RST, to ground for a time period of at least 15 milliseconds, and then driving pin 1 "high" and holding pin 1 "high".

The logic provided by op-amps U7-A, U7-B, U12-D, and the associated circuitry, provides that microprocessor U-24 is reset when the power is initially turned "on", and further that the reset is properly handled in the event that a dip occurs in the 18 volt source to a potential beneath 12.5 volts. The potential of the 18 volt source may dip below 12.5 volts as a result of a variety of occurrences, including: disconnection of the load from the power main, a trip of the circuit breaker, etc . . . In the event of a trip of the circuit breaker, the circuit breaker may reclose within less than 30 seconds.

In the event that the circuit breaker is "out" for less than 30 seconds, data stored in RAM of microprocessor U-24 must be preserved. It is desirable not to apply the reset "low" transition to RST at pin 1 until the power supply becomes "good" in order to preserve the information held in microprocessor U-24 RAM. Power is maintained, in a trickle quantity, to keep microprocessor U-24 RAM "alive" by capacitors C22, C46 putting microprocessor U-24 to sleep LPSH at pin 22.

Under normal operating conditions, power is supplied to operate microprocessor U-24 from power supply P5.8 volt source at VDD pin 40 of microprocessor U-24. Power supplied by the P5.8 volt source also charges capacitor C22, C46 through resistor R51. Under normal operating conditions, capacitors C22, C46 are charged to 5.8 volts. In the event of the loss of the P5.8 volt source, capacitor C22, C46 discharge through diode CR29 to supply a trickle current to microprocessor U-24 in order to keep the RAM of microprocessor U-24 alive. In the event that power to the P5.8 volt source is lost for less than 30 seconds, and then is turned on, the recently turned on P5.8 volt source will drive microprocessor U-24 through its pin 40, and will also provide a charging current for capacitors C22, C46. A more rapid charging of the capacitors is effected through the 18 volt source, the L5.8 V source, op-amp U12-A, and diode CR28.

The reset pulse to the microprocessor U24 is controlled by FET transistor Q7. The gate of FET transistor Q7, at its pin 2, is controlled by logic signals LPSL, LPSH, and 30SC.

Signal 30SC is the voltage across the 30 second timing capacitor C42, shown in FIG. 15-3. The logic signals controlling the gate, pin 2, of transistor Q7 ensure that the proper reset pulse sequence is applied to microprocessor U24 during both a "cold" start and a "hot" start. A "cold" start is an application of power to the Trip Unit after the unit has had power removed for a time period exceeding approximately 30 seconds. A "hot" start is an application of electric power to the Trip Unit after less than 30 seconds have elapsed since power was last removed from the Trip Unit.

Cold Start

A cold start will first be traced through the logic signals. The signal 30SC will be at ground potential because the 30 second timing capacitor C42 will be discharged. As the 18 volt source rises from ground to 12.5 volts, logic signal LPSH is high, and logic signal LPSL gradually goes from low to high. A low value of logic signal LPSH prevents charging of timing capacitor C47, and also holds input pin 7 of op-amp U7-B at ground potential, thereby holding op-amp U7-B "on". With op-amp U7-B held "on", its output pin 1 is at ground potential, and thereby holds the gate, pin 2, of transistor Q7 at ground, thereby holding transistor Q7 "off". With transistor Q7 off, it's pin 3 is then free to rise to the P5.8 volt voltage source potential value, thereby bringing reset pin RST, pin 1, of microprocessor U-24 "high", that is, to the potential of the P5.8 volt source. The potential of the P5.8 volt source starts at zero potential and gradually climbs until it reaches 5.8 volts as the 18 volt power source potential rises Also, when signal 30SC is low, then op-amp U7-A is turned "on" as the 2.5 volt source rises in potential thereby driving positive input pin 5 of op-amp U7-A positive. Output pin 2 of op-amp U7-A tends to rise in potential, but is clamped by op-amp U12-D. Op-amp U12-D is "on" at the early initiation of electric power by signal LPSL rising positive and turning op-amp U12-D "on". Op-amp U12-D then tends to drive its output pin 14, and therefore pin 2 of op-amp U7-A, to ground when signal LPSL is high.

After the 18 volt source crosses the 12.5 volt threshold, then signal LPSH goes "high" and signal LPSL goes "low." When signal LPSH goes "high" capacitor C47 immediately charges and then tends to discharge through resistor R34. The time constant for capacitor C47 to discharge through resistor R34 is given by the values of capacitor C47 and resistor R34. Capacitor C47 may be 0.47 microfarad and resistor R34 may be 27K ohms. The RC time constant is then (0.47 *27)=15 milliseconds. As capacitor C47 discharges it holds pin 7 of op-amp U7-B "high," thereby driving output pin 1 of op-amp U7-B "high". Pin 1 of op-amp U7-B drives gate pin 2 of transistor Q7 "high," thereby turning transistor Q7 "on." Output pin 3 of transistor Q7 is driven to ground as transistor Q7 comes "on," thereby driving input pin 1, signal RST, of microprocessor U24 "low". Pin RST of microprocessor U24 is held "low" for a time given by the discharge time constant of capacitor C47, R34. Input pin 1, signal RST of microprocessor U24, is held "low" for approximately 15 milliseconds. After capacitor C47 discharges to below the 2.5 volt precision voltage source connected to input pin 6 of op-amp U7-B, op-amp U7-B turns "on," thereby grounding output pin 1 of op-amp U7-B, and grounding input pin 2 of transistor Q7, thereby turning "off" transistor Q7. Transistor Q7 turning "off" permits a transition of signal RST toward the P5.8 volt source, thereby driving signal RST "high." Microprocessor U24 is initiated by the sequence of driving its pin 1, signal RST, low for approximately 15 milliseconds and then driving it high and holding it high. Therefore, the sequence resets microprocessor U24, and starts it operating at its "start up" memory location.

Simultaneously, with signal LPSH going high, signal LPSL goes low. A low value of signal LPSL applied to input pin 12 of op-amp U12-D turns "off" op-amp U12-D thereby causing pin 14 to appear as an open circuit to the circuit to the right of resistor R35.

Within approximately 0.5 seconds from reset of microprocessor U-24 signal 30SC, applied to input pin 4 of op-amp U7-A, will go high. Thirty second timing capacitor C42, shown in FIG. 15-3, charges under the control of the software in microprocessor U24 from the L5.8 volt power supply through electronic switch U11. Electronic switch U11, shown in FIG. 15-2 is driven by output port P27 at pin 21 of microprocessor U24, as shown in FIG. 15-2. Charging current for both 30 second timing capacitor C42 and 5 minute timing capacitor C36 is controlled by switch U11, and capacitor C42 charges through signal MCS 1, and capacitor C36 charges through signal MCS 2. The charging time constant for 30 second capacitor C42 is given by the capacitance of capacitor C42 and the resistance of resistor R98. The capacitance of C42 may be 47 microfarad and the resistance of R98 may be 10K ohms giving a time constant of 0.47 seconds. Thus, in approximately one half second, capacitor C42 will be charged to approximately 63% of 5.8 volts and signal 30SC will go "high" in approximately 1 second to 2 seconds.

Hot Start

The sequence of events in a "hot" start will now be traced. A hot start is a situation in which power has been applied to the apparatus for a period of time, and a power loss is suffered, where the 18 volt source is below 12.5 volts for less than 30 seconds. As the 18 volt source drops below 12.5 volts, op-amp U10-A has its positive input pin 3 driven below the 2.5 volt potential at which its negative input pin 2 is connected. Op-amp U10-A therefore undergoes a transition and becomes conductive as the 18 volt supply drops through 12.5 volts, thereby driving signal LPSL "high" and driving signal LPSH "low". However, signal 30SC remains "high" for approximately 30 seconds, or for the time required for 30 second timing capacitor C42 to discharge to less than the 2.5 volt potential applied to input pin 5 of op-amp U7-A. The discharge of capacitor C42 occurs through resistor R108, and C42 may be 47 microfarad and R108 may be 1.0 megohm, giving a discharge time constant of 47 seconds.

Signal LPSH is low, and so op-amp U7-B is "on," holding output pin 1 at ground. Signal LPSL is "high" and so turns "off" op-amp U12-D thereby driving output pin 14 of op-amp U12-D "high," and this condition attempts to drive transistor Q7 "on." However, signal 30SC prevents transistor Q7 from being driven "on" by the high value of signal 30SC driving op-amp U7-A into conduction and thereby grounding output pin 2 of op-amp U7-A, thereby preventing the "high" value of signal LPSL from turning on transistor Q7.

In the event that power returns within 30 seconds, or before the internal RAM of microprocessor U24 goes "bad," then signal LPSL goes "low" and signal LPSH goes "high". When signal LPSH goes high, capacitor C47 charges quickly, and discharges slowly through resistor R34, and thereby applies an approximately a 15 millisecond "on" pulse to turn transistor Q7 on for approximately 15 milliseconds. Thereby, signal RST at pin 1 of microprocessor U-24 is grounded for approximately 15 milliseconds. At the expiration of the approximately 15 millisecond time period, input pin 2 of transistor Q7 goes low, thereby turning "off" transistor Q7 and driving signal RST high and resetting microprocessor U24, and the microprocessor begins running at its "start up" memory location.

Power Loss and Reset State of Microprocessor

The microprocessor U24 is put into an "asleep" state when the 18 volt power supply goes below 12.5 volts, as follows. Signal LPSH goes "low" as the 18 volt source goes below 12.5 volts, and signal LPSH is connected to microprocessor U24 at port PC6 pin 22. The microprocessor background code tests port PC6 periodically, for example, once each millisecond, and executes a "put to sleep" subroutine in the event that signal LPSH goes "low". The "put to sleep" subroutine stores critical data in the internal RAM of microprocessor U24, converts outputs to inputs in order to prevent current drain through external peripheral devices, and then executes a STOP instruction. The CPU of the microprocessor U24 then stops running. However, the data stored into the internal RAM is preserved by the power supplied by C22, C46. The external clock pulses applied to the microprocessor at port OSC1 pin 39 are gated "off" internally in the microprocessor. The external clock may die from lack of power, but a sputtering dying of the clock is immaterial to preservation of data stored in the internal RAM because the microprocessor U24 is halted and the clock pulses are gated "off".

Bus Disable—IBEL

The internal RAM of microprocessor U24 may be maintained "good" by the trickle current supplied by capacitor C22, C46 connected to connection VDD, pin 40, of microprocessor U24. However, it is necessary to disable the bus D0 . . . D7 from port PA0 . . . PA7 of microprocessor U24, or load on the data bus will draw too much current from capacitors C22, C46, thereby discharging the capacitors too quickly. A bus disable signal is labeled IBEL. The IBEL signal is generated approximately 5 milliseconds after LPSL goes low. IBEL is generated by op-amp U27-D, resistor R33 and capacitor C18, as shown in the upper left corner of FIG. 15-2 Signal LPSL goes low when the power supply becomes "good", causing capacitor C18 to discharge with an approximately 5 millisecond time constant through resistor R33. After positive input terminal pin 11 of op-amp U27-D goes lower than the 2.5 volt potential which negative input terminal pin 10 is connected to, then op-amp U27-D becomes conductive driving output pin 13 to ground. Therefore, signal IBEL taken from output pin 13 of op-amp U27-D is driven "low". A "low" IBEL signal enables the chips connected to the bus, including U21, and U22, on FIG. 15-2, and on FIG. 15-3 U13, and on FIG. 15-4 U28. Other chips connected to the bus are enabled by other logic signals, for example, U14 and U17 by signal LPSH.

A high IBEL signal disables the chips, and IBEL goes high when signal LPSL goes "high" upon transition of the 18 volt source to less than 12.5 volts. It is necessary to disable the chips connected to the bus during the time period that microprocessor U24 is energized from the trickle power supply provided by capacitors C24, C46, in order to prevent a large current flow from capacitors C22, C46 into the bus and through one of the chips to ground.

Also a bus enable signal connects to the microprocessor U24 at port PC3, pin 25.

Trip Unit Current Signals

Referring to FIG. 15-1, signals to the microprocessor giving measures of current flow are taken from points A, A′, and B, B′, and C, C′ for measures of current flow in individual phases. An output for the maximum phase current is taken between points MOBR and BRC. "BRC" stands for breaker common. A ground fault signal is taken between points GFBR and BRC.

Op-amp U1-A has inputs connected to points MBR and BRC, and produces an output voltage proportional to maximum phase current. Op-amp U1-B, diode CR8 and resistor R14 and capacitor C5 form a peak detector for the maximum phase current. Transistor Q2 provides a charge dump for capacitor C5. Transistor Q2 is controlled through its gate electrode pin 2 by signals which will be described hereinbelow.

Op-amp U3-C has inputs connected between points GFBR and BRC, at its output provides a voltage proportional to ground fault current. Because the SUM transformer is 1 to 5 rather than 1 to 10, the ground fault signal is proportionally larger than the phase fault signal produced by op-amp U1-A. A peak detector is formed by op-amp U1-D, diode CR10, resistors R18,R19 and capacitor C7. Transistor Q3 provides a dump for discharging capacitor C7. Transistor Q3 is controlled by its gate electrode at pin 2, as will be described hereinbelow.

Op-amp U2-A has inputs connected to A, A' and generates at its output a voltage proportional to current flow in phase A. A peak detector is formed by op-amp U2-B, diode CR11, resistor R20, and capacitor C8. A dump circuit for discharging capacitor C8 is formed by op-amp U4-B. Dump op-amp U4-B is controlled by signals at its pin 6, as will be described hereinbelow.

Op-amp U2-C has inputs connected to points B, B', and provides a voltage at its output proportional to current flow in phase B. A peak detector is formed by op-amp U3-A, diode CR20, resistor R27, and capacitor C12. Op-amp U4-C provides a dump circuit for discharge of capacitor C12.

Op-amp U2-D has inputs connected to point C,C' and an output providing a voltage proportional to current flow in phase C. A peak detector is formed by op-amp U3-B, diode CR21, resistor R29, and capacitor 13. Op-amp U4-D is a dump circuit for discharge of capacitor C13. Transistor Q6 provides control of the dumping elements, transistor Q2, transistor Q3, op-amp U4-B, op-amp U4-C, and op-amp U4-D.

Op-amp U4-A, working in conjunction with op-amp U6-C, which is connected as an approximately 3 volt Zener diode, provides control of dumping transistors Q2 and Q3. Also, op-amp U6-C provides control of dumping op-amps U4-B, U4-C, and U4-D. Also, control of the dumping units is provided by line DOD from sheet 3 latch U14 at pin 15, as will be described more fully hereinbelow.

As shown in FIG. 15-3, input to the microprocessor from analog signals is provided by analog to digital converter U13. Various analog units are switched, under control from the microprocessor, to an input of the analog to digital converter 13 by multiplexer U9. Input from maximum phase peak detector at the positive side of capacitor C5 is provided to multiplexer U9 at pin 17, input Y0. Input from the ground fault peak detector from the positive terminal capacitor C7 is provided the multiplexer U9 at its pin 18 at input Y1. Input from the A phase peak detector from the positive terminal of capacitor C8 is provided to multiplexer U9 at its pin 16 input Y3. Input from the B phase peak detector from the positive terminal of capacitor C12 is provided to multiplexer U9 at its pin 1, input Y4. Input is provided from the C phase peak detector at the positive terminal capacitor C13 to multiplexer U9 at its pin 6, input Y5. A test signal input to multiplexer U9 is provided at terminal 19 input Y2, as will be described herein below in the section describing the Test Set.

Two further inputs to multiplexer U9 are provided at its pins 2 and 5, inputs Y6 and Y7 to provide a power down history. Long term power-down history is provided by capacitor C36 and resistor R97. Capacitor C36 may be 47 microfarad and resistor R97 may be 10 megohms, giving a time constant of approximately 470 seconds, or approximately 8 minutes. Capacitor C42 and resistor R108 provide a short time power-down history. Capacitor C42 may be 47 microfarad and resistor R108 may be 1 megohm, giving a time constant of approximately 47 seconds. During power-up operation of the electronics, capacitor C36 is charged, and also capacitor C42 is charged. In the event that the circuit breaker trips "off" the load charging current to both C36 and C42 ceases.

Capacitor C36 then commences discharge through resistor R97, and capacitor C42 commences discharge through resistor R108. When the circuit breaker is again powered up, the microprocessor measures the voltage at points Y6 and Y7 of multiplexer U9, and digitizes these voltages by analog to digital converter U13. By measuring the voltage across capacitor C36, and the voltage across capacitor C42, the microprocessor is capable of determining the length of time that the circuit breaker has been powered "Off". The microprocessor may then compare the measured time with a predetermined time and other information which was read into non-volatile memory, and trip "off" the circuit breaker if it has not been "off" for a sufficiently long time, or initiate other appropriate action Multiplexer U9 serves as a number of electrically controlled switches. Each of its inputs may be connected to the output, marked COM at its pin 4. Which input is connected to the output COM is determined by voltages applied to lines A, B, and C. Lines A, B and C connect to a microprocessor data bus. Line A connects to data bus D0, line B connects to data bus line D1 and line C connects to data bus line D2. Line LE, pin 11 of multiplexer U9, connects to microprocessor U24 at its pin 14, port P B2.

Analog to digital converter (ADC) U13 is an 8 bit analog to digital converter. ADC U13 has an input at its pin 6, VIN, from the COM output of multiplexer U9. Op-amp U1-C provides amplification of the signal. Integrated circuit U11 provides switching under the control of the microprocessor U24 which controls the gain of op-amp U1-C.

ADC U13 provides digital output on the data bus, at lines D0, D1, D2, D3, D4, D5, D6, and D7. Control of ADC U13 is provided by the signal ADRDL provided by microprocessor U24 at its port PB4, at pin 16.

Op-amp U1-C, FIG. 15-3, provides four levels of adjustable gain for the analog signal appearing at multiplexer U9 output COM. Thereby, an auto-ranging algorithm adjusts the size of the signal applied to ADC U13 input VIN at its pin 6. Switch U11 actually controls the gain of amp U1-C. Latch U14 controls switch U11 through input from data bus D0 . . . D7 and the DL CLK signal, and through outputs Q6,Q7 at pins 16,19 of Latch U14.

Output from microprocessor U24 is provided by latch U14. Latch U14 takes output from data bus line DO, D1, D2, D3, D4, D5, D6, and D7. Control of latch U14 is accomplished by signal DLCLK provided by microprocessor U24 from its port P B3 at its pin 15. Signal DLCLK commands Latch U14 to accept input from the data bus and to direct that output to an appropriate output port of latch U14.

Trip Unit Serial Communications

Output serial communications are provided at microprocessor output port PD1 at pin 30. The LED at pins 1.2 of optoisolator U26 is driven by the P5.8 volt source and port PD1. Port PD1 acts as a switch to ground and is either "open" or "closed" under control of microprocessor U24. The photodiode at pins 4,5,6 of optoisolator U26 provides switch operations between "closed" and "open". Data bits are sent one 8 bit BYTE at a time during each 12 millisecond loop through the main software loop. The bits are sent at a 9600 baud rate.

Trip Unit Microprocessor Peripherals

Circuit U25 is a non-volatile memory. Circuit U25 is accessed by microprocessor U24 through ports PD4, PD3, and PD2, at microprocessor pins 31, 32, 33. Nonvolatile memory U25 also has an input from signal PB7 from microprocessor U24 at its pin 19.

The microprocessor clock is made up of the crystal controlled oscillator comprising crystal Y1, and integrated circuits U15-A and U15-B. The clock generates a 3.6864 megahertz pulse sequence. The clock signal is then input to microprocessor U24 at its input OSC1 at pin 39.

Divider U16 also accepts an input from the clock at 3.6864 megahertz. Divider U16 divides the input clock signal by a factor of 8, and produces an output signal of 460.8 kilohertz. The output pulse stream of divider U16 is connected to the clock input of analog to digital converter ADC U13 at pin 4 of U13. The input CLK at pin 4 of U13 provides clock pulses for ADC U13's digitization.

The switch array shown in FIG. 15-4 is made up of switch S1, S2, S3, S4, S5, S6, S7, S8, and resistors RP6. Switches S1 . . . S8 appear on the Trip Unit circuit board as shown in FIG. 2. Seven of the switches are controlled by knobs on the Trip Unit control panel, as shown in FIG. 3.

Switch S1 controls the time delay for the long tim delay, LTD.

Switch S2 controls the current for the long time pickup, LTPU.

Switch S3 controls the time delay for the short time delay, STD.

Switch S4 controls current for short time pickup, STPU.

Switch S5 controls time delay for the ground fault pickup, GFD.

Switch S6 controls current for the ground fault pickup, GFPU.

Switch S7 controls current for the instantaneous pickup, IPU.

Switch S8 controls a predetermined.

A switch that is not connected to a front panel knob, is set at the factory.

Resistors RP6 define the potentials on bus lines SC0 . . . SC7.

The switches read out to a data bus having lines marked SC0 . . . SC7. These lines are switched to data bus DO, D1, D2, D3, D4, D5, D6, and D7 by latch U28. Latch U28 is controlled by signal PC0 derived from microprocessor U24 at its port PC0, pin 28, and also the IBEL signal.

Multiplexer U29 controls which switch transfers its information to microprocessor U24 through latch 28. Multiplexer U29 is controlled by the microprocessor through data bus lines DO, D1, and D2. Operation of multiplexer U29 is further controlled by signals PC0 and PC1 from microprocessor U24 from ports PC0 and PC1. Multiplexer U29 is controlled at its pin 8 by signal PC0, and at its pin 11 by signal PC1. Power-up control signal LPSL controls multiplexer U29 at its pin 7.

As shown in FIG. 15-2, input communications to microprocessor U24 are provided through latch U21 from either a Display Unit or a Local Management Unit through jack J5, or a universal test set through jack J4. Latch U21 is controlled by microprocessor U24 at its port PC4, pin 24 by connection to latch U21 at its pin 1. Latch U21 permits transfer of data from data bus D0, D1, D2, D3, D4, D5, D6, and D7 to output jack J4 or J5. Also, resistor network RP4 provides a potential source for the output lines A1, A2, A3, A4, A5, A6, A7, and A8. Latch U21 permits tests to be run on the Trip Unit from a variety of external equipment, including an LMU, a DU, or a universal test set.

Microprocessor U24 reads the rating plug through jack J6. Latch U22 permits connection of data bus D0 . . . D7 to jack J6 to read the rating plug and the jack J4 plugs at pins 9, 10, 11.

As shown in FIG. 15-2, the presence of Jumber JMP-1 indicates that the hardware is a circuit breaker trip unit, and the absence of JMP-1 indicates that the hardware is a motor protector.

The presence of Jumper JMP2 inhibits the internal self test program and the absence of JMP2 enables the internal self test program.

Resistors RP4-A are pull up resistors to define the potentials on the input lines to switch U21. Resistors RP4-B are pull up resistors to define the potentials on the input lines to switch U22. As shown in FIG. 15-4, resistors RP6 are pull up resistors to define the potentials on the switch lines which serve as inputs to switch U28.

Switch S9 has three single pole switches which can be used to ground lines connected to pins 3, 4, 5 of latch U22. The single pole switches are used to indicate the calibration of the sensor used with the hardware as is set out in the table of Note 2 in FIG. 15-1.

TRIP UNIT SOFTWARE

Power Up Code

FIG. 17 shows a block diagram of the overall computer program flow. Microprocessor operation begins with the receipt of a hardware power-up signal. A hardware power-up signal is generated by the "power up sequence control". The power up sequence control provides a reset pulse to microprocessor U24, and also provides reset pulses, such as signal LPSH, to other elements of the circuit, as is discussed in greater detail hereinabove.

Upon receipt of the power-up signal, the "power-up code" program block is executed. FIGS. 22B, 22C are a flow chart for the "power-up code" block. The power-up code sequence block first determines the type of start: the type may be:

1. Cold Start

A cold start is a start in which no power has been applied to the apparatus for a time greater than five minutes.

2. Warm Start

A warm start is a start in which power has been applied within the last five minutes to the apparatus The "power-up code" selects a cold start or a "hot start" by performing the following functions:

Initialize the microprocessor by setting input and output ports to appropriate states; define a clock rate for the communication ports; initialize external hardware which needs to be initialized; resets various latch controls; reset front-end analog multiplexer U9; set buffer amplifier U1-C gain control by setting the switches of controllable switch U11; checks three power loss history indicators, (1) capacitor C36, a "5 minute loss timer", (2) capacitor 42, a "30 second" power loss timer; (3) capacitor C22 and C46, which are power hold capacitors.

Functionally, capacitor C42, C46 provide a power source for microprocessor U24 in the event of a power failure. Microprocessor U24 power is supplied through pin 40 at port VDD. Port PD5 is tied to port VDD, by pin 34 being tied to pin 40, in order to hold pin PD5 high for signalling purposes to the microprocessor U24. Power is supplied to pin 40 of microprocessor U24 from voltage source L5.8 volts through op-amp U12-A. Capacitors C22, C46 are charged by the output of op-amp U12-A. Current flow through diode CR29 supplies ordinary power to microprocessor U24 while the unit is in a powered-up stage. In the event of the loss of voltage on the L5.8 volt line, capacitors C22, C46 discharge through diode CR29 to supply power to microprocessor U24 at pin 40. When capacitor C22 and C46 are fully charged, they are capable of operating microprocessor U24 for a time period of approximately 30 seconds, if microprocessor U24 is in a "low power" operating state. Microprocessor U24 is driven into a "low" power operating state through signal LPSH going low at pin 22 port PC6 of microprocessor U24, and LPSH goes "low" when the 18 volt source goes below 12.5 volts.

In executing "power-up", the microprocessor first measures the voltage by looking at the output of comparator U27-A, shown in FIG. 15-2. The voltage at the positive terminal of capacitors C22, C46 is compared with the 2.5 volt supply by op-amp be read by microprocessor U24, and therefore a measurement made by U24 to determine if capacitor C22,C46 are charged to a voltage in excess of 2.5 volts. In the event that capacitors C22, C46 are not charged to excess of 2.5 volts, "Save" registers of microprocessor U24 are erased. In the event that capacitor C22, C46 are charged to excess of 2.5 volts, as determined by "power-up code", the microprocessor register values are retained.

"Power-up code" then proceeds to measure the voltage on 30 second timer capacitor C42 by commanding multiplexer U9 to connect its input Y7 to its output COM, and commanding ADC U13 to digitize the capacitor C42 voltage and read the output to data bus D0 . . . D7. Upon completion of digitization of the capacitor C42 voltage, ADC U13 interrupt output at pin 5 provides a signal to microprocessor U24 pin 36 at port PD7, thereby signalling microprocessor U24 that the digitization by ADC U13 is complete.

Certain accumulators of microprocessor U24 must be retained for power losses of 30 seconds or less, and the accumulator value is discarded in the event of power losses in excess of 30 seconds. Therefore, the accumulators are cleared in the event that capacitor C42 voltage has decayed to less than 2.5 volts. If the measured value of capacitor C42 voltage exceeds 2.5 volts, then the appropriate accumulator values are retained.

The microprocessor next reads the voltage of 5 minute timer capacitor C36 by directing multiplexer U9 to connect its input terminal Y6 to its output terminal COM, and commanding ADC U13 to digitize the voltage of capacitor C36. Upon completion of the digitization, ADC U13 provides the digitized information on the data bus and sets an interrupt flag on its interrupt INT output line at pin 5. Certain cumulators must be reset in accordance with the measurement of the voltage of 5 minute timer C36. For example, if an accumulator has accumulated a value greater than one-half the total trip accumulation value, and the power was lost for less than five minutes, the accumulator may be set to substantially 0.5 of the programmed accumulator trip value. In the event that power was lost for more than five minutes, accumulators may be set to zero.

Capacitor C30 and op-amp U27-B provide a 35 millisecond timer to input pin 6, input A5 of latch U21. "Power-up code" reads output pin Y5 of switch U21 in order to read 35 millisecond timer capacitor C30. Comparator U27-B gives a logical high signal on input pin A5 of switch U21 in the event that 35 millisecond timer capacitor C30 retains a potential in excess of 2.5 volts. In the event that power-off has been for 35 milliseconds or less, the microprocessor is instructed to retain all registers, if RSC is good, that is, power hold capacitor C22, C46 are charged. The RSC test indicates that the apparatus has been up and running before the 35 millisecond power loss. Since capacitor C22, C46 are capable of operating microprocessor U24 for up to 300 milliseconds, all registers retain valid data in the event that the power outage was for less than 35 milliseconds.

In the event that RSC tests bad for a power loss of 35 milliseconds or less, the indication is that the apparatus was not "up and running" before the 35 millisecond power loss, and so the contents of all registers of microprocessor 24 are discarded.

Next, "power up code" reads switches S1, S2, S3, S4, S5, S6, S7, and S8, as shown in FIG. 15-4. Switch S1 gives the long time delay LTD. Switch S2 gives the long time pick-up LTPU. Switch S3 gives the short time delay STD. Switch S4 gives the short time pick-up STPU. Switch S5 gives the ground fault delay GFD. Switch S6 gives the ground fault pick-up GFPU. Switch S7 gives the instantaneous pickup IDU. Switch S8 gives PUPU. Switch S7 is read to give the instantaneous pick-up value. The instantaneous pick-up delay time is fixed at a particular time, for example, it may be 10 milliseconds.

The switches S1 . . . S8 are read by microprocessor U24 commanding analog multiplexer U29 through data bus lines D0,D1,D2 and through signals PC0 from port PC0, signal LPSL, and signal PC1 from microprocessor port PC1. Switch U28 is turned on by signal PC0 from microprocessor port PC0. The switch settings are then read on data bus line D0 . . . D7.

Microprocessor U24 next clears and resets particular bytes depending upon the results of the tests of the various "power down" history timers.

The code then distinguishes between the breaker closing into a fault situation, and secondly, a fault developing after the breaker closed.

Following the "power-up code", the program starts a 1 millisecond timer. A device driver routine recognizes the timer inputs generated by the 1 microsecond timer. The device driver initiates operation of the front end multiplexer U9 FIG. 15-3, by commanding it, on signal AMLE from microprocessor U24 port PB2, pin 14, and commanding it to read data bus lines D0, D1, D2. Upon completion of an analog to digital conversion by ADC U-13, ADC U13 generates an interrupt signal in its INT output at its pin 5. The interrupt signal interrupts microprocessor U24 at its input port PD7 at pin 36. Transistor Q11 controls interrupt port IRQ of microprocessor U24 at its pin 2 in order to prevent an erroneous interrupt on power-up. The 1 millisecond timer causes current measurements of the max phase current and the ground fault current to be made every 1.0 millisecond.

Next, the program starts the 12 millisecond timer. The 12 millisecond timer is an overflow timer and runs for 142 milliseconds, that is, until the byte fills up with FFF. The timer generates various interrupt signals such as a 10 second signal and a 10 minute signal. The 12 millisecond timer controls the main code timing.

After initialization of the 12 millisecond timer, the "power up code" waits 2 milliseconds. At the expiration of 2 milliseconds, the "power up code" enters the main code as shown in FIG. 17. Upon completion of the main code, the program waits for the expiration of 12 milliseconds from the time of entering the main code. At the expiration of 12 milliseconds, the program again executes the main code. This 12 millisecond loop is repeated forever, or until power is lost by the electronics.

Main Code

Figure 19:
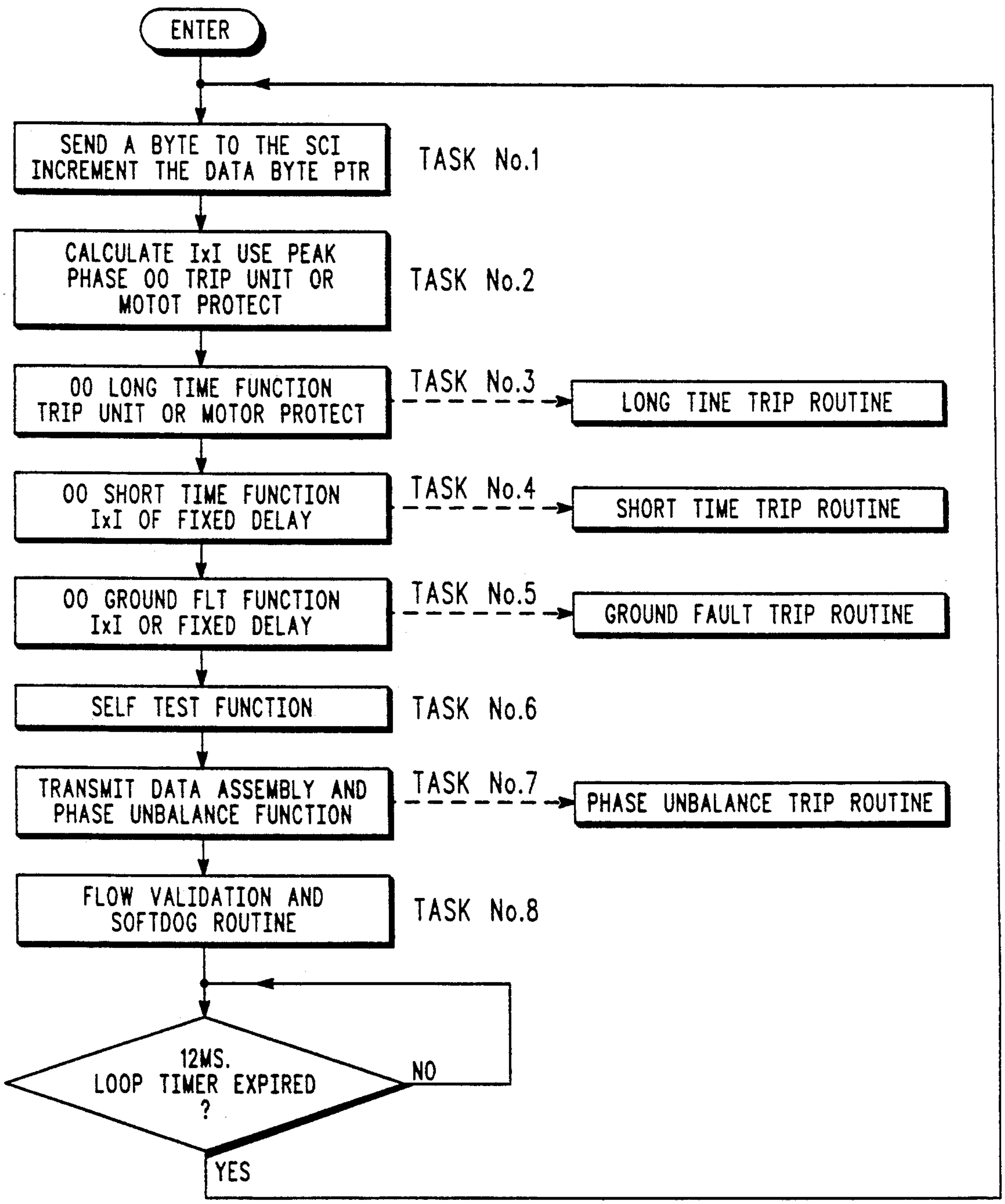
FIG. 19 is part of a flow chart for Trip Unit software.

The internal steps of the "main code" are shown in FIG. 19. Operations of the "main code" are broken up into 8 tasks. Task #1 through task #8. Also, the 12 millisecond times are shown.

Task 1

Task 1 sends a BYTE to the serial communications interface for transfer to a Local Management Unit or other device. The serial communications interface is driven by port PD1 at pin 30 of microprocessor U24, as shown in FIG. 15-2. When pin 30, port PD1, goes low, current flow occurs through the light emitting diode of optocoupler U26. When current flows through optocoupler U26, from pin 30 of microprocessor U24, an output signal is generated at pins 4, 5, and 6 of the optocoupler, U26. Signals RNVCC, TD0 and TDR are directed to output jacks J5, J4, and TB4 from pins 4, 5, and 6 of optocoupler U26. These output signals provide communication from the Trip Unit to other equipment. The other equipment may consist of, for example, a Display Unit DU, or a Local Management Unit, LMU, or a remote indicator unit, RIU.

Each time the program passes through the "main code", task #1 transmits a byte out through the serial communications port. The proper byte to be transmitted is assembled from the last pass of the program by task #7, to be discussed further hereinbelow.

Task 2

The program enters task #2 upon the completion of task #1. In task #2 the square of the current is calculated from the peak phase measurement, as obtained from diode bridge CR1 and the peak detector capacitor C5.

The program reads a jumper JMP out in order to determine if it should act as a circuit breaker or act as a motor protector.

Task 3

The program enters task #3 upon the completion of task #2. Task #3 accumulates the square of the current for the long time function, in the event that the measured peak current exceeds a fraction of P, for which accumulation for the long time function begins. The fraction of P is input from switch S2, LTPU when the program reads the switches through multiplexer U29. The accumulator accumulates the values of peak phase current on each pass through the main program. Switch LTD, the long time delay, selects a value from a table stored in software. The accumulated value is compared against the table value selected by switch LTD. In the event that the accumulated value exceeds the table value, task #3 activates the "long time trip routine". The "long time trip routine" ultimately activates trip coil drive transistor Q12. Trip drive transistor Q12 is driven into conduction by an output signal from microprocessor U24, through switch U17, at port Q0 at pin 2 of U17.

Task 4

The program enters task #4 upon completion of task #3. At task #4 the program executes the short time trip. The short time trip may be either with:

$I^2T$ = Constant or may be for a fixed time delay. The position of switch STD, S3 read by multiplexer U29 determines the short time delay characteristic. If the maximum phase measurement exceeds a threshold determined by LTPU switch S2, controlled by multiplexer U29, values of squared current are accumulated in the short time accumulator. Positions of switch STD S3 determine whether $I^2T$ equals a constant or a fixed time delay is employed. The position of switch STD S3 directs the program to look up table values for comparison against the accumulated value. In the event that the accumulated value exceeds the table value, then task #4 activates the short time trip routine. The short time trip routine results in the trip coil being activated by initiation of conduction of trip driver transistor Q12.

Task 5

The program goes to task #5 upon completion of task #4. In task #5 ground fault pickup and ground fault delay are executed. The square of the ground fault current is accumulated in a ground fault accumulator. The ground fault current is compared with a fixed delay or an ($I^2T$=constant) type delay, much like the short time delay in task #4. In the event that the accumulated value exceeds a threshold value pointed to by settings of switch GFD,S5, in a table, then task #5 initiates the ground fault trip routine. The ground fault trip routines results in energization of the trip solenoid and tripping of the circuit breaker into the "Off" position.

Task 6

The program enters task #6 upon completion of task #5. Task #6 is a self-test function. The self-test function has two modes of operation:

Mode 1 is an internal self-test;,

Mode 2 is an external self-test.

The program normally executes Mode 1, the internal self-test function unless an external test set is plugged into the Trip Unit, in which case the external test overrides the internal self-test. An external test unit may be the Display Unit or a Local Management Unit, DU or LMU.

In the internal self test under normal operation of the program, Task #6 checks a number of functions including:

The analog to digital converter U13 shown in FIG. 15-3, is tested. The analog to digital converter is tested; first, by applying a ground voltage to the analog to digital converter, ADC U13. The ground voltage is applied by opening switch ENB of multiplexer U9 under control from microprocessor U24 through switch U14. The switch U14, controlled by signal ENB1 at pin 7 of multiplexer U9, opens the circuit to output COM under control of signal of ENB1 at pin 7 of multiplexer U9. When switch ENB is open, resistor R88 gives a ground input to ADC U13 at its pin 6. The self-test program of task #6 checks the reading from the ADC against its intended value of zero. In the event that the value disagrees by more than the allowable amount from zero, the program displays an error message and may trip the breaker.

The self test function then applies 5 volts to the ADC input by measuring the voltage across 30 second timer capacitor C42. The voltage across capacitor C42 is available to multiplexer U9 at its input Y7, at pin 5, and this input is connected to COM in order to apply a 5 volt output signal to output COM of multiplexer U9. The output of ADC U13 is compared with its expected value by microprocessor U24. In the event that the measured value disagrees with the expected by more than an allowable amount, the microprocessor U24 displays an error message and may trip the breaker.

The test function, task #6 sets a good or bad flag. If the zero volt test is bad, task #6 sets a "bad" zero volt flag. If the 5 volt test is bad, task #6 sets a "bad" 5 volt flag.

Task #6 performs additional tests. Next, task #6 computes 80% of the latest peak phase current measurement. The 80% value of the latest peak phase current measurement is compared with the latest current measurements for phase A, phase B, and phase C. One phase must be greater than the 80% of peak phase current, or there is something wrong with the analog front end of the Trip Unit. Task #6 signals the 80% test by the use of an 80% flag. The 80% flag is set to "good" if the test is good, and the flag is set to "bad" if no phase is greater than the 80% of peak phase current measurement.

Next, the self-test function section computes 120% of the latest maximum phase current measurement, and compares this 120% value with the latest values measured for phase A, phase B, and phase C. All phase values must be less than the 120% max phase current measurement, or there is a problem with the analog front end. Task #6 uses a 120% flag to signal the results of this test. In the event that all phases are good, the 120% flag is set to "good", and if a phase is bad, the 120% flag is set to "bad".

Next, task #6 compares the 120% of max phase current measurement with the latest ground fault current measurement. The ground fault current measurement must be less than 120% of peak phase current, or there is a problem with the analog front end of the apparatus. The ground fault test signals with a ground fault flag. The ground fault flag is set to "good" if the test is passed, and is set to "bad" if the the test is not passed. The above series of tests are repeated every 12 milliseconds.

An external test may be performed on the apparatus by an operator utilizing a Display Unit, DU, or a Local Management Unit, LMU. The DU or LMU supplies test voltages to test the unit. A request for external self-test comes in on control lines SD0, SD1, SD2 in plug J4 or J5 to switch U21, as shown in FIG. 15-2. A test voltage is applied through jack J5 and is labeled VTST and is applied to terminal Y2 of front end multiplexer shown in FIG. 15-3. When the control lines request a self-test, then the device driver routine commands U9 to transmit the signal VTST at its connection Y2, pin 19, to its COM output.

The test voltage VTST may be interpreted by the microprocessor to be an input voltage on any of the current measurement inputs. Thus, the external test may test all functions in the circuit breaker. In interpreting the measured value of VTST, microprocessor U24 uses measured values of the voltage appearing at pin Y2, interprets them as current measurements, on any one of the channels, but uses a different register for accumulation. Thus, a test and an accumulation may occur simultaneously, without loss of protection to the Local Trip Unit.

The internal self-test is done continuously every 12 milliseconds, that is, each time the program goes through task #6. The external self-test is done only when the apparatus is commanded to do so by an operator.

Task 7

The program enters Task #7 after completion of Task #6. Task #7 prepares information for transmission on the serial communications interface, port PD1 of microcomputer U24. For example, if in task #1, byte 11 was transmitted, then at task #7, byte 12 will be prepared. The output data stream through the serial communications interface is specified hereinbelow in the section entitled "Serial Communications Interface Datastream".

Task #7 also performs calculations in the event that the apparatus is installed as a "motor protection unit". The Trip Unit, TU functions as a motor protector unit by the installation of A jumper. To function as a motor protector unit, the apparatus must compute phase unbalance. The unit uses the measured current flows in phase A, phase B, and phase C to compute phase unbalance. Operation of the apparatus as a motor protector is determined by the presence or absence of jumper JMP1. If the jumper is in, the apparatus is a Trip Unit. If jumper JMP1 is out, the apparatus functions as a motor protector unit. Jumper JMP1 is connected to input pin A2 of switch U21.

Task 8

The program enters task #8 upon completion of task #7. Task #8 performs both validation and softdog routine for internal checks. The program first checks the flags set by the internal self-test routine, task #6. If internal self-test fails too many times, then the task #8 takes action. The action is determined by the presence or absence of jumper JMP5 and jumper 6, JMP5 and JMP6, as appears at the of FIG. 15-3. If JMP 5 is in, the program trips the breaker. If JMP6 is in, the program sounds an alarm horn. Both JMP5 and JMP6 may be in simultaneously. The use of jumpers JMP5, JMP6 to determine the action of the apparatus in the event of the failure of an internal test provides flexibility for a system designer to make a misfunctioning breaker perform as he desires.

A second function performed by task #8 is the softdog routine. The softdog routine monitors the voltage on a capacitor which must be periodically discharged by microprocessor U24 in order to determine if microprocessor U24 is functioning. Comparator U27-C appearing at the lower left corner of FIG. 15-4 compares the voltage developed across capacitor C10 with 2.5 volts. Capacitor C10 is on FIG. 15-1, and its voltage is signal WDE14. In the event that the voltage across capacitor C10 exceeds 2.5 volts, output pin 14 of op-amp U27-C goes high, thereby driving coil driver transistor Q12 into conduction and tripping the breaker, in the event that JMP5 is in place. Capacitor C10, shown in FIG. 15-1, is periodically discharged by transistor Q4 being driven into conduction along with the dump cycle for the peak detectors. If the dump cycle fails and transistor Q4 fails to discharge capacitor C10, then comparator U27-C will go high at its output terminal 14, thereby in the presence of jumper JMP5, tripping the breaker by driving transistor Q12 into conductance.

Hardware

The software passes through the main code once each 12 milliseconds. An AC line cycle period is 1000/60 or 16⅔ milliseconds. The program loop timing is completely independent of the AC line cycle. Thus, the peak detector dump switches are closed more than once each AC cycle, on the average.

Peak Detector Dump Control

The peak detector dump switches are controlled by line MGD shown in FIG. 15-1 connecting to switch U14 at its pin 12, and by line DOD, connecting to switch U14 at its pin 15. Switch U14 is on FIG. 15-3. Switch U14 is, in turn, controlled by signal DLCLK connected to microprocessor U24 at its port PB3 at pin 15. Dump of the peak detector capacitors is controlled by the software so that it occurs once each pass through the main code.

Restraint In and Restraint Out Circuits

Overload "restrain in" signal OLRI drives buffer PB0 at pin 12 of microprocessor U24. Ground fault "restraint in" signal, GFRI drives microprocessor U24 at input port PB1 at its pin 13. The voltage at OLRI drives input pin 8 of op-amp U7-C. Microprocessor U24 operates normally when a restrain in line, OLRI or GFRI, is logically "low". A logical "low" signal is a ground connection for OLRI and GFRI.

In the event that overload "restrain in" signal in OLRI goes positive sufficiently to cause a transition at output pin 15 of comparator U7-C, then microprocessor port PB0 will go logically "high". Microprocessor U24 detects the logical high as a software interrupt upon the occurrence of a high transition at port PB0, and branches to a restrain in look-up table for the overload pickup and delay values. The result is that microprocessor U24 keeps the breaker active for a longer time period upon the receipt of a transition of line OLRI to logical high, that is, upon the receipt of a "restrain in" signal, in order to permit a downstream breaker to trip first into an "Off" state.

A ground fault "restraint in" signal, GFRI, is connected to pin 10 of comparator U7-D. Normal operation of the circuit breaker occurs when signal GFRI is logically low, that is, at ground potential. In the event that signal GFRI makes a transition sufficiently high to cause comparator U7-D to turn off, microcomputer U24 at port PB1 makes a transition to logical low, and the transition to logical low at port PB1 signals microprocessor U24 that a ground fault "restraint in" signal has been received. Microprocessor U24 interprets the receipt of a ground fault restrain in signal by going to a "ground fault restrain in look up table" for ne trip values for ground fault pick-up and ground fault delay. The result is that microprocessor U24 keeps the circuit breaker from tripping to an "Off" situation for a longer time upon the receipt of a ground fault "restrain in" signal, in order to permit a downstream breaker to trip first.

As circuit breaker U24 enters a trip routine such a task #3, task #4, task #5, as shown in FIG. 19, microprocessor U24 generates a "restraint out" signal as an input signal to upstream breakers, where that input signal is a "restrain in" signal for the upstream breakers. The "restraint out" signal is developed by a combination of controls on databus D0 . . . D7 and control by signals output by microprocessor U24 at its port PC5 at its pin 23, and these control signals control switch U17, shown in FIG. 15-2. Switch U17, at its output ports Q6 and Q7, generate the "restrain out" signals. Output port Q6 of switch U17 produces the overload "restrain out" signal OLR0. Output port Q7 of switch U17 generates the ground fault "restrain out" signal GFR0. Normal operation of the upstream breaker occurs when the overload restrain out signal OLR0 is at ground potential, and restrained operation of the upstream breaker occurs when signal OLR0 goes logically "high". Normal operation of the upstream breaker occurs when the ground fault restrain out signal, GFR0, is logically "low", and restrained action of the upstream breaker occurs when signal GFR0 goes logically "high". Control of the circuit breaker from a Display Unit DU, or a Local Management Unit "LMU" occurs, FIG. 15-3, through jack J5, at its pin 12, using signal TREXT. Current flow in TREXT causes the light-emitting diode, LED, in optocoupler U23 to illuminate, and drive its associated phototransistor into conduction. Conduction of the phototransistor and optocoupler U23 drives transistor Q12 into conduction, thereby tripping the circuit breaker.

Trip Unit Background Code

The Trip Unit background code controls reading of data from front end multiplexer U9. The background program is driven by interrupts. A timing interrupt initiate operation of data reading. A "conversion complete" interrupt signal generated by ADC U13 signals the end of data reading and conversion. Data is read every 1 millisecond.

Front end multiplexer U9 permits measurement of each of its inputs in sequence, and this measurement runs continuously in background under control of the 1 millisecond clock pulse and the interrupt output on line INT pin 5 of ADC U13, as will be described in greater detail hereinbelow in the section entitled BACKGROUND.

A device handler routine controls initiation of data reading. The device handler initiates data reading upon expiration of 1 millisecond, as signaled by the 1 millisecond timer setting a "time-out" flag. The device handler provides signals to switch U14 to set the proper gain using switches U11. The device handler also commands front end multiplexer U9 to connect the proper input channel to analog to digital converter ADC U13. The device handler initiates analog to digital conversion, and then waits. Analog to digital converter ADC U13, upon completion of analog to digital conversion, generates an interrupt signal INT at its pin 5, and this signal is input to the microprocessor at its port PD7 at its pin 36. The device handler, while waiting, continuously tests for a transition in the INT signal at microprocessor 24 input port PD7, and when it detects the conversion, initiates further action by the background program. The background program stores the measured value, and updates the appropriate accumulators for either current accumulation or current square accumulation.

The main program is executed once each 12 milliseconds. During each 1 millisecond within this 12 millisecond period, the 1 millisecond timer initiates data reading by the device driver. During time periods 1, 2, 3, 4, 5, and 6, the device driver commands the front end multiplexer U9 and ADC U13 to measure peak phase current and ground fault current. During 1 millisecond time periods 7, 8, 9, 10, 11, and 12, the device driver commands front end multiplexer U9 and ADC U13 to measure, as before, peak phase current and ground fault current, plus one other input parameter. The "one other input parameter" is one chosen from the following list: A phase, B phase, C phase, Test Voltage VTST, Y7 voltage for self-test (5 volts), and Ground potential for self-test by opening switch ENB in series with output COM by activating signal ENB1 at pin 7 of multiplexer U9. Each of these six measurements is taken in seriatim, with one item being measured during each 1 millisecond time interval, from interval 7 through interval 12.

The potential applied to input channel Y6 at pin 2 of multiplexer 9 is measured by the device driver only during a power up sequence in order to measure the power down history by sampling the potential on capacitor C36.

Transistor Q11 is controlled by the "power up sequence controller" in order to permit the microprocessor to operate for 2 milliseconds before beginning initiation of current measurements. This 2 millisecond waiting time permits the microprocessor to develop stable operation before measurements are initiated.

The microprocessor retains historical information in non-volatile memory U25. The background program updates storage of information in non-volatile memory U25. Information retained in non-volatile memory U25 includes: the number of long time trips, the number of short circuit trips including short time trips and short circuit trips, the number of ground fault trips, and the cause and level of last trip. The level of the trip is the measured amount of current causing it to trip. When the system is powered up, the program first reads a location in non-volatile memory. This "first read location" in non-volatile memory tells the program either: no trip occurred at last power down, or there was a trip at last power down. In the event that the location states there was no trip at last power down, then the program does not update trip history in the non-volatile memory.

In the event that there was a trip at last power down, the non-volatile memory says to the microprocessor, "Take information that I am giving you from my "non-volatile" memory and update the trip histories in my non-volatile memory". The action with the non-volatile memory may occur during the 2 millisecond waiting time on power up.

Non-volatile memory U25 may be a Xicor, part, Product X2444. The Xicor X2444 has a RAM and an $E^2$ PROM, an electrically erasable programmable read only memory. The microprocessor reads and writes into the internal RAM of the X2444. The microprocessor then initiates a store cycle into the $E^2$ PROM when it is required to update storage in the non-volatile memory.

The following component parts have been found useful in the practice of the present invention:

U9 and U29 are generic 8 to 1 analog multiplexers of type 74HC4351. U13 may be an ADC0804 type National Semiconductor analog to digital converter.

U14 may be a latch of type 74HC273. Upon the rising edge of receipt of a CLK signal, the inputs then present at input pins 3, 4, 7, 8, 13, 14, 17, 18 are latched and these values appear at the output terminals Q0, Q1, Q2, Q3, Q4, Q5, Q6, Q7.

U21, U22, may be type 74HC541 octal buffers of generic manufacture. When control terminal OE1 goes logically "low", the input is coupled to the output. Subsequent changes in input cause corresponding changes in input voltages.

U16 may be a type HC4024 shift register or divider, of the type manufactured by National Semiconductor.

TRIP UNIT SERIAL COMMUNICATIONS

Overview

This section details the serial communications protocol from the Trip Unit to external devices such as an LMU, a DU, or a Remote Indicator Unit (RIU). The Trip Unit continually transmits a serial data stream when fault power is sufficient. The first byte (Byte 0) of the data always contains a 1 in the lowest bit position (bit 0) to identify itself. The receiving unit then recognizes this as byte 0. Subsequent bytes have a 0 in the lowest bit position and are counted by the receiving unit to keep track of the byte number.

The byte transmission restarts at byte 0 whenever any of the following occur:

A. Power-on restart has occurred

B. A trip is about to take place

C The sequence of 31 BYTES transmission has been completed.

The receiving unit checks every BYTE for a 1 in the lowest bit position to see if byte number 0 is being transmitted.

Requirements

1. Output: Optically Isolated Serial Data Stream
2. Frame Format: 1 Start Bit, 8 Data Bits, 1 Odd Parity Bit, 1 Stop Bit
3. Transmission Rate: 9600 Baud
4. Byte Transmission Sequence:
   - 4.1 Number of Bytes: 31 (Byte 0 through Byte 30)
   - 4.2 Byte Zero Identification: Byte Zero contains a 1 in its bit 0 position. All other bytes contain a 0 in this position.
   - 4.3 Byte zero transmission: Byte zero is transmitted, upon receipt of a TMBT (Transmit Buffer Empty) interrupt and the completion of a 250 microsecond (minimum) delay, when any of the following conditions is true:
     - 4.3.1 Upon power-up of the microprocessor. This synchronizes external devices to the byte stream.
     - 4.3.2 Just before the microprocessor commands a trip. This alerts external devices that a trip is taking place.

4.3.3 Every 31st 12 millisecond period. This will be the start of the next cycle of byte transmission.

4.4 Bytes 1, 2 and 3 Transmission: Bytes 1 and 2 always follow Byte 0. Byte 3 will follow Byte 2, unless a trip is occurring. The minimum delay between these bytes will depend on whether or not a trip is occurring. These Bytes are transmitted as follows:

4.4.1 If no trip is occurring, Byte 1, the Self Test Status Byte, will be transmitted at the start of the next 12 millisecond period following Byte 0. Bytes 2 and 3 will then follow in the next two 12 millisecond periods following byte 1. They contain the value of Phase A current.

4.4.2 When a trip is taking place, Byte 0 will be transmitted not sooner than 250 microseconds after the end of the Stop Bit of the Byte currently being transmitted, but as soon as possible thereafter. Bytes 1 and 2 contain the magnitude of the highest phase current and Byte 3 is not transmitted. Byte 1 will be transmitted not sooner than 250 microseconds after the end of Byte 0's Stop Bit, but as soon as possible thereafter. Byte 2 will be transmitted not sooner than 250 microseconds after the end of Byte 1's Stop Bit, but as soon as possible thereafter. Transmission ceases after Byte 2 and does not resume until the breaker opens and re-closes.

4.5 Byte 4 through Byte 9 Transmission: Bytes 4 through 9 will be transmitted in order in the 12 millisecond periods following byte 3. Bytes 4 through 9 will not be transmitted during a trip.

4.6 Byte 10 through Byte 30 Transmission: Byte 10 through byte 30 will be transmitted in order in the 12 millisecond periods following every fifth transmission of byte 9.

Twelve millisecond periods 10 through 30 will contain no transmissions during the other 4 transmission cycles. This will allow the receiving unit extra time to process data received in previous periods. Bytes 10 through 30 will not be transmitted during a trip.

4.7 Byte Data: The following summarizes the data content of each byte of the Trip Unit Serial Communications Stream:

4.7.1 The following summarizes data transmitted during normal operation of the breaker, i.e., while no trip is occurring:

A BYTE contains 8 bits, $b_0$–$b_7$.

Schematically, the bits are laid out as follows in a BYTE;

| $b_7$ | $b_6$ | $b_5$ | $b_4$ | $b_3$ | $b_2$ | $b_1$ | $b_0$ |
|---|---|---|---|---|---|---|---|
| x | x | x | x | x | x | x | 1 |

Bit 0 is transmitted first and bit 7 is transmitted last.

BYTE Zero: Pickup/trip indicating BYTE $b_7$: 1 for Phase Unbalance pickup or trip 0 otherwise $b_6$: 1 for ground fault pickup or trip 0 otherwise $b_5$: 1 for short time pickup or trip 0 otherwise $b_4$: 1 for long time pickup or trip 0 otherwise $b_3$: 1 for 90 percent of long time pickup 0 otherwise $b_2$: 1 for instantaneous pickup or trip 0 otherwise $b_1$: 1 if trip is occurring (indicates other bits are for trip)

0 if no trip is occurring (indicates other bits are for pickup)

$b_0$: Always 1 to indicate byte 0

BYTE One: Self Test Status Word $b_7$: 1 indicates aborting self test 0 otherwise $b_6$: 1 indicates a ground fault pickup condition 0 otherwise $b_5$: 1 indicates a short time pickup condition 0 otherwise $b_4$: 1 indicates a long time pickup condition 0 otherwise $b_3$: TBD $b_2$: 1 indicates an instantaneous pickup condition 0 otherwise $b_1$: 1 indicates the occurrence of a Self Test trip condition 0 otherwise $b_0$: Always 0

BYTES Two and Three: Phase A current—Amps RMS

BYTE 2

$b_7$: Always 0

$b_6$–$b_5$: Two bit BCD exponent. Indicates the power of 10 applied to the following digits.

$b_4$–$b_1$: Most Significant Digit of Phase A Current Level (BCD encoded)

$b_0$: Always 0

BYTE 3

$b_7$–$b_5$: Always 0

$b_4$–$b_1$: Least Significant Digit of Phase A Current Level (BCD encoded)

$b_0$: Always 0

BYTES Four and Five: Phase B current—Amps RMS

BYTE 4

$b_7$: Always 0

$b_6$–$b_5$: Two bit BCD exponent. Indicates the power of 10 applied to the following digits.

$b_4$–$b_1$: Most Significant Digit of Phase B Current Level (BCD encoded)

$b_0$: Always 0

BYTE 5

$b_7$–$b_5$: Always 0

$b_4$–$b_1$: Least Significant Digit of Phase B Current Level (BCD encoded)

$b_0$: Always 0

BYTES Six and Seven: Phase C current—Amps RMS

BYTE 6

$b_7$: Always 0

$b_6$–$b_5$: Two bit BCD exponent. Indicates the power of 10 applied to the following digits.

$b_4$–$b_1$: Most Significant Digit of Phase C Current Level (BCD encoded)

$b_0$: Always 0

BYTE 7

$b_7$–$b_5$: Always 0

$b_4$–$b_1$: Least Significant Digit of Phase C Current Level (BCD encoded)

$b_0$: Always 0

BYTES Eight and Nine: Ground Fault Current—Amps RMS

BYTE 8

$b_7$: Always 0

$b_6$–$b_5$: Two bit BCD exponent. Indicates the power of 10 applied to the following digits $b_4$–$b_1$: Most Significant Digit of Ground Fault Current Level (BCD encoded)

$b_0$: Always 0

BYTE 9

$b_7$–$b_5$: Always 0

$b_4$–$b_1$: Least Significant Digit of Ground Fault Current Level (BCD encoded)

$b_0$: Always 0

BYTE Ten: Option Byte

BYTE 10

$b_7$: Always 0

$b_6$: 0 indicates Trip Unit configuration; 1 indicates Motor Protection Unit configuration $b_5$–$b_0$: Always 0

BYTE Eleven: Sensor Plug Identification Indicator $b_7$: Sensor Identifier Bit $S_3$ $b_6$: Sensor Identifier Bit $S_2$ $b_5$: Sensor Identifier Bit $S_1$ $b_4$: Sensor Identifier Bit $S_0$ $b_3$: Plug Identifier Bit $P_2$ $b_2$: Plug Identifier Bit $P_1$ $b_1$: Plug Identifier Bit $P_0$ BYTE Twelve: Long Time Switch Positions $b_7$–$b_5$: Long Time Delay Switch Position (0–7).

$b_4$–$b_2$: Long Time Pick Up Switch Position (0–7)

$b_1$: 1 indicates Instantaneous Function is in the "OFF" position 0 otherwise $b_0$: Always 0

BYTE Thirteen: Short Time Switch Positions $b_7$–$b_5$: Short Time Delay Switch Position (0–7).

$b_4$–$b_2$: Short Time Pick Up Switch Position (0–7)

$b_1$: 1 indicates Short Time Function is not installed 0 otherwise $b_0$: Always 0

BYTE Fourteen: Ground Fault Switch Positions $b_7$–$b_5$: Ground Fault Delay Switch Position (0–7)

$b_4$–$b_2$: Ground Fault Pick Up Switch Position (0–7)

$b_1$: 1 indicates Ground Fault Function is not installed 0 otherwise $b_0$: Always 0

Byte Fifteen: Instantaneous/Phase Unbalance Switch Positions $b_7$–$b_5$: Instantaneous Pickup Switch Position (0–7).

$b_4$–$b_2$: Phase Unbalance Percent Switch Position (0–7)

$b_1$: 1 indicates Phase Unbalance Function is not installed 0 otherwise $b_0$: Always 0

Bytes Sixteen and Seventeen: Long Time Trip Memory

BYTE 16

$b_6$–$b_2$: Six Most Significant Bits of Number of Long Time Trips in binary (Bit 7 is MS bit)

$b_1$–$b_0$: Always 0

$b_1$: 1 indicates Short Time Function is not installed 0 otherwise $b_0$: Always 0

BYTE 17

$b_7$–$b_2$: Six Least Significant Bits of Number of Long Time Trips (Bit 2 is LS Bit)

$b_1$–$b_0$: Always 0

$b_1$: 1 indicates Short Time Function is not installed 0 otherwise $b_0$: Always 0

Bytes Eighteen and Nineteen: Short/Instantaneous Trip Memory

BYTE 18

$b_6$–$b_2$: Six Most Significant Bits of Number of Short Time or Instantaneous Trips in binary (Bit 7 is MS Bit)

$b_1$–$b_0$: Always 0

BYTE 19

$b_7$–$b_2$: Six Least Significant Bits of Number of Short Time or Instantaneous Trips (Bit 2 is LS Bit)

$b_1$–$b_0$: Always 0

Bytes Twenty and Twenty-One: Ground Fault Trip Memory

BYTE 20

$b_6$–$b_2$: Six Most Significant Bits of Number of Ground Faults Trips in binary (Bit 7 is MS Bit)

$b_1$–$b_0$: Always 0

BYTE 21

$b_7$–$b_2$: Six Least Significant Bits of Number of Ground Fault Trips (Bit 2 is LS Bit)

$b_1$–$b_0$: Always 0

Bytes Twenty-Two and Twenty-Three: Last Fault Level Memory—Amps RMS

BYTE 22: Amps most recent fault $b_7$: Always 0

$b_6$–$b_5$: Two bit BCD exponent. Indicates the power of 10 applied to the following digits.

$b_4$–$b_1$: Most Significant Digit of Current Level of most recent fault (BCD encoded)

$b_0$: Always 0

BYTE 23: Cause of Last Trip $b_7$–$b_5$: Cause of Last Trip, encoded as follows:

| $b_7$ | $b_6$ | $b_5$ | Cause of Trip |
|---|---|---|---|
| 0 | 0 | 0 | None |
| 0 | 0 | 1 | Instantaneous |
| 0 | 1 | 0 | Short Time |
| 0 | 1 | 1 | Long Time |
| 1 | 0 | 0 | Ground Fault |
| 1 | 0 | 1 | Phase Unbalance |
| 1 | 1 | 0 | Softdog/Self-test |

$b_4$–$b_1$: Least Significant Digit of Current Level of most recent fault (BCD encoded $b_0$: Always 0

Bytes Twenty-Four Through Twenty-Seven: Not Used

BYTES Twenty-Eight Through Thirty: Percent Unbalance by Phase

BYTE 28

$b_7$–$b_1$: Percent unbalance, in binary, of phase $b_0$: Always 0

BYTE 29

$b_7$–$b_1$: Percent unbalance, in binary, of phase B
$b_0$-: Always 0

BYTE 30

$b_7$–$b_1$: Percent unbalance, in binary, of phase C
$b_0$: Always 0

END OF NORMAL DATA STREAM

Trip Event Data System

The following summarizes data transmitted while a trip is occurring:

Byte 0: Pickup/Trip indicating byte $b_7$: 1 for Phase Unbalance pickup or trip 0 otherwise
$b_6$: 1 for ground fault pickup or trip 0 otherwise
$b_5$: 1 for short time pickup or trip 0 otherwise
$b_4$: 1 for long time pickup or trip 0 otherwise
$b_3$: 1 for 90 percent of long time pickup 0 otherwise
$b_2$: 1 for instantaneous pickup or trip 0 otherwise
$b_1$: 1 if trip is occurring (indicates other bits are for trip) 0 if no trip is occurring (indicates other bits or pickup)
$b_0$: Always 1 to indicate byte 0

Bytes One and Two: Highest Phase Current—Amps RMS

BYTE 1

$b_7$: Always 0
$b_6$–$b_5$: Two bit BCD exponent. Indicates the power of 10 applied to the following digits
$b_4$–$b_1$: Most significant Digit of Highest Phase Current Level (BCD encoded)
$b_0$: Always 0

BYTE 2

$b_7$–$b_5$: Always 0
$b_4$–$b_1$: Least Significant Digit of Highest Phase Current Level (BCD encoded)
$b_0$: Always 0

END OF TRIP MESSAGE

DISPLAY UNIT

Figure 20A:
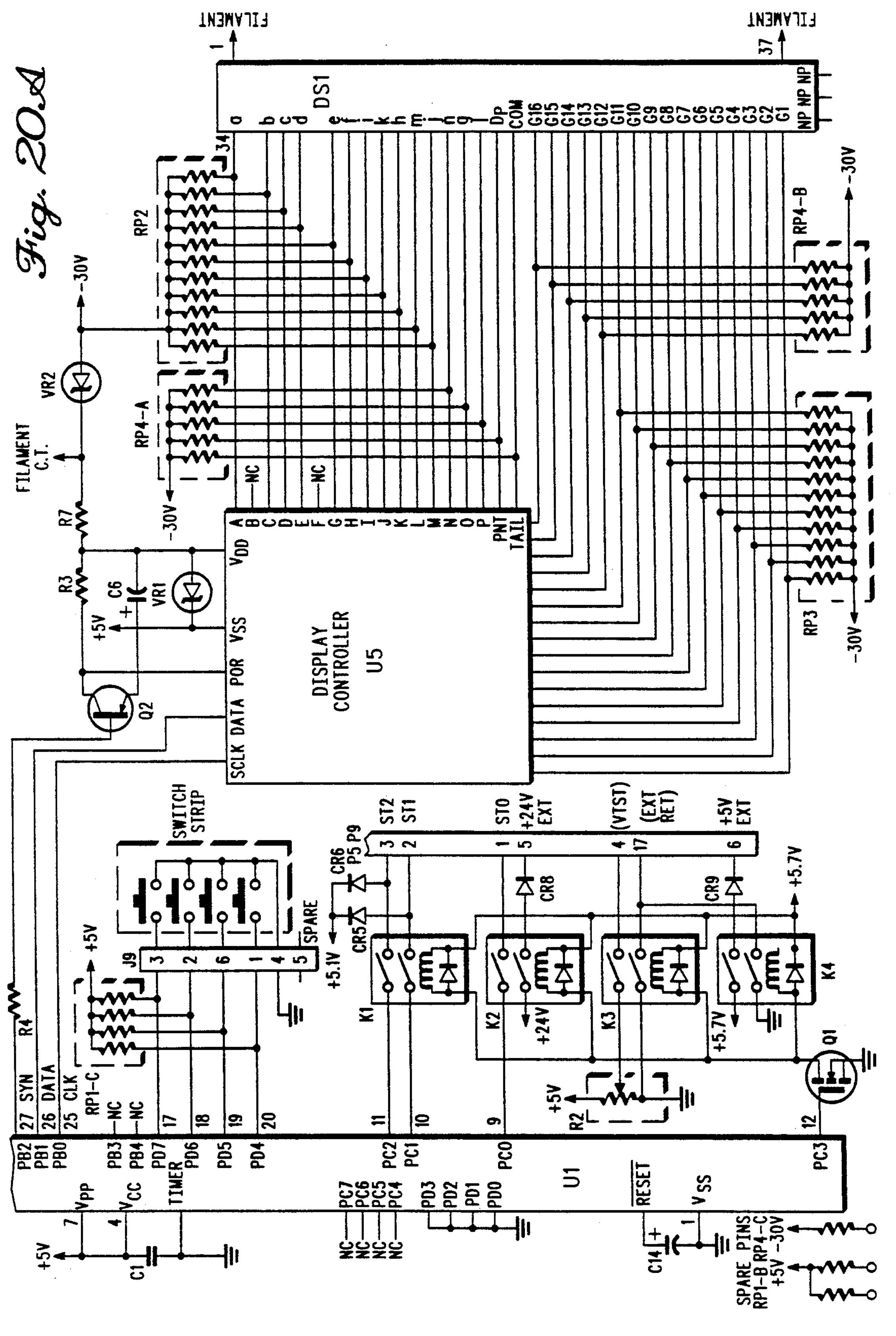
FIGS. 20A and 20B comprise a schematic of a Display Unit.
Figure 20B:
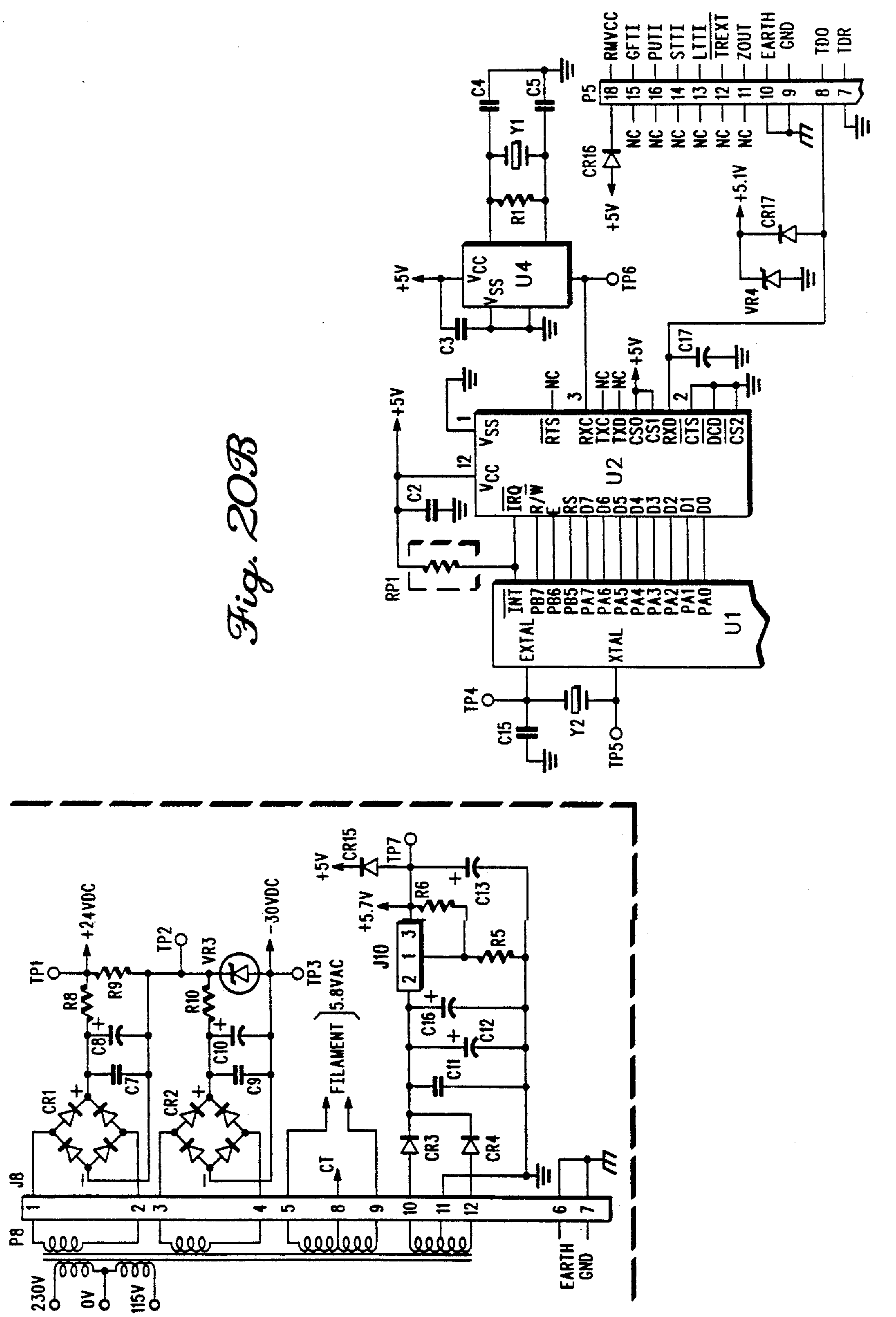
Figure 21:
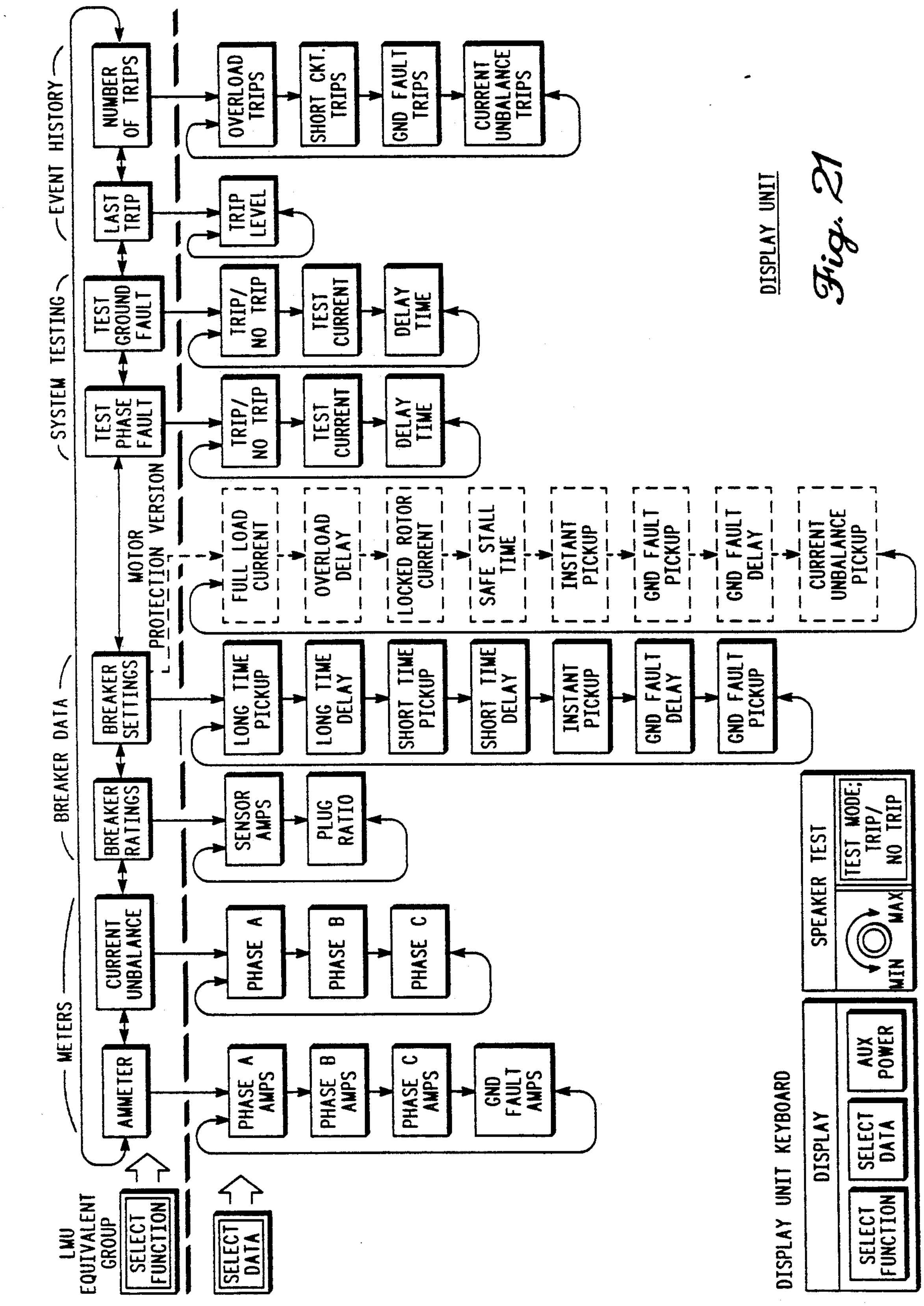
FIG. 21 is a block diagram of a menu program for a Display Unit.

FIG. 20 is a schematic diagram of a Display Unit (DU). FIG. 21 is a menu diagram of the Display Unit readout. Also, the Display Unit keyboard is shown in FIG. 21.

The Display Unit has a self-contained power supply operated by a step down transformer, and may be operated on 115 volts between transformer connections 12, 13. Alternatively, the DU may be operated on 230 volts by connection between transformer pins 11, 13. A diode bridge CR1 produces a +24 volt DC supply. Diode bridge CR2 produces a −30 volts DC source. A +5 volt precision source is provided by diode CR3, CR4.

Microprocessor U1 is powered from the +5 volt source and is connected between pin 4 (VCC) and pin 1 (VSS). In addition, pin 7 (Vpp) is connected to pin 4 (VCC) to disable the programming function of the chip. The time base clock for microprocessor U1 utilizes the internal clock generator and is derived using two external components Y2 and C15. It has been found satisfactory to use a 4 megahertz crystal for Y2. Microprocessor U1 may satisfactorily use a Motorola type 68705U3 microprocessor chip.

The Asynchronous Communications Interface Adapter (ACIA) U2 is powered from the +5 volt source connected between pin 12 (VCC) and pin 1 (VXX). The ACIA connects to microprocessor U1 using an 8 bit parallel data bus configuration. In addition, three control lines and an interrupt request line are provided by U1 to operate and extract information from the ACIA. ACIA U2 receives input data from the trip unit at input pin 2 (RXD). Pin 2 of the ACIA is connected to pin 8 of the Display Unit jack P5. The input data arrives at jack P5, pin 8. The input data line at ACIA U2 pin 2 is clamped by diode CR17 so that its potential cannot exceed the level of the +5 volt DC power supply. Signal RMVCC is supplied through pin 18 of jack P5 in order to supply a +5 volt operating voltage to the serial data optoisolator U26 located in the trip unit, as shown in FIG. 15-2.

The 14-stage ripple carry binary counter U4 is configured as a crystal oscillator. A 2.4576 megahertz crystal (Y1) has been found satisfactory to produce the serial data receiver clock timebase required at the RXC input pin 3 of ACIA U2.

Display Controller U5 controls the Display Unit's 16 character alphanumeric display (DS1). Control signals for the display controller are supplied by microprocessor U1 through its output line PB0, PB1, PB2 at its pins 25, 26, 27 respectively. A Futaba type 16-SY-03Z display panel has been found useful, and a display controller U5 type 10937PE-50 has been found to be satisfactory.

The DU has a set of four input switches connected at jack J9, pins 1, 2, 3, 6. The switches connect to microprocessor U1 at its port PD7, PD6, PD5, PD4 at its pins 17, 18, 19, 20 respectively. Pull up resistors RP1-C define potentials on the switched lines by connection to the +5 volt source.

Tests of the Trip Unit may be initiated from the DU. Microprocessor U1 ma initiate test procedures through its ports PC0, PC1, PC2, PC3 at its pins 9, 10, 11, 12. Self test commands to the TU are provided as signals ST0, ST1, ST2, and also as shown in FIG. 15-2. The signals can be applied by energization of relays K1, K2, K3, K4. The relays are energized by driving transistor Q1 into conduction by a signal from output port PC3 of microprocessor U1.

A variable test voltage VTST may be applied to the TU by adjustment of variable resistor R2. Variable resistor R2 has an adjustment knob which is accessible by an operator at the front panel of the Display Unit. A +24 volt external power supply voltage is supplied by jack P5 at its pin 5 for operation of the trip unit for self test purposes. A +5 volt external test voltage is applied to the TU by pin 6 of jack P5.

Operation of the Display Unit is discussed by reference to FIG. 21. Referring to FIG. 21, the Display Unit keyboard is shown to have four switches, identified as "Select Function", "Select Data", "Auxiliary Power", and "Test Mode: Trip/No Trip". These four push button switches are shown in FIG. 20 as the switch strip connected at jack P9.

Adjustable resistor R5 has a knob visible on the front panel of the DU, and is indicated as "Test Level", and goes from a counter clockwise "MIN" position to a fully clockwise "MAX" position.

Pressing the "Auxiliary Power" push-button located on the front panel of the Display Unit activates the internal relays to apply auxiliary power of an unpowered Trip Unit. If a Trip Unit is connected and operational, the Display Unit will then advance to the select function mode.

The Select Function key selects "group" data for viewing on the display panel. The various "groups" include: "Meters", "Breaker Data", "System Testing", and "Event History".

The "Select Data" button permits viewing on the display panel of various quantities in each group. When viewing in the "Meters" group, the "Select Data" button permits viewing currents in Phase A, Phase B, Phase C, and ground fault. The "Select Function" button in the "Meters" group, has a "Current Unbalance" position. In the "Current Unbalance" position the "Select Data" push button permits current unbalance to be read in "Phase A", "Phase B", or "Phase C".

When the "Select Function" push button is in the "Breaker Data" group, there are two positions, and they are "Breaker Ratings" and "Breaker Settings". The "Select Data" push button when the "Select Function" push button is in the "Breaker Ratings" position permits reading on the display the "Sensor Amps" or the "Plug Ratio". The sensor amps and plug ratio are read by the trip unit from a switch array, and the results are transmitted in the serial data stream into the Display Unit.

The "Select Data" push button, when the "Select Function" button is in the "Breaker Settings" position permits reading either one or two groups, depending on whether the TU is in a "Circuit Breaker" version or a "Motor Protect" version. In the "Circuit Breaker" version, the "Select Data" push button permits reading: long time pickup, long time delay, short time pickup, short time delay, instantaneous pickup, ground fault delay, or ground fault pickup settings of the TU. In the "Motor Protect" version, the "Select Data" push button permits reading the: full load current, overload delay, lock rotor current, safe stall time, instantaneous pickup, ground fault pickup, ground fault delay, current unbalance pickup, settings of the TU. Alternatively, both motor protector data and circuit breaker data may be displayed on a single menu.

When the "Select Function" push button is in the "System Testing" group, there are two positions: "Test Phase Fault", and "Test Ground Fault". When the "Select Function" push-button is in the "Test Phase Fault" position, the "Select Data" push-button permits access to the test mode. Next, the "Select Trip/No Trip" push-button allows the selection of either a breaker trip or no trip test mode. Each press of the "Select Trip/No Trip" push-button will toggle the selection between these two modes. Once the type of trip mode has been determined, the "Select Data" push-button is pressed to lock in the mode in addition to selecting the test current display mode. Using the "Test Level" adjustment potentio meter, the test current is adjusted as indicated on the alphanumeric display. Once the test current level is adjusted, pressing the "Select Date" push-button will initiate the breaker test. At the conclusion of the test, the test delay time will be indicated on the alphanumeric display. Pressing the "Select Data" push-button after the test delay time display will return the Display Unit to the select trip/no trip mode. If the "Selection Function" push-button is pressed instead of the "Select Data" push-button, the Display Unit returns to the select function mode. The implementation of the "Test Ground Fault" position is exactly the same as that for the "Test Phase Fault" position.

When the "Select Function" push button is in the "Event History" group, there are two positions, "Last Trip", and "Number of Trips". The "Select Data" push button, when the "Select Function" is in the "Last Trip" position, permits reading the magnitude of the last trip on the display panel. The "Select Data" push button, when the "Select Function" push button is in the "Number of Trips" position, permits reading the number of trips in: overload trips, short circuit trips, ground fault trips, current unbalance trips.

REMOTE INDICATOR UNIT

Figure 22:
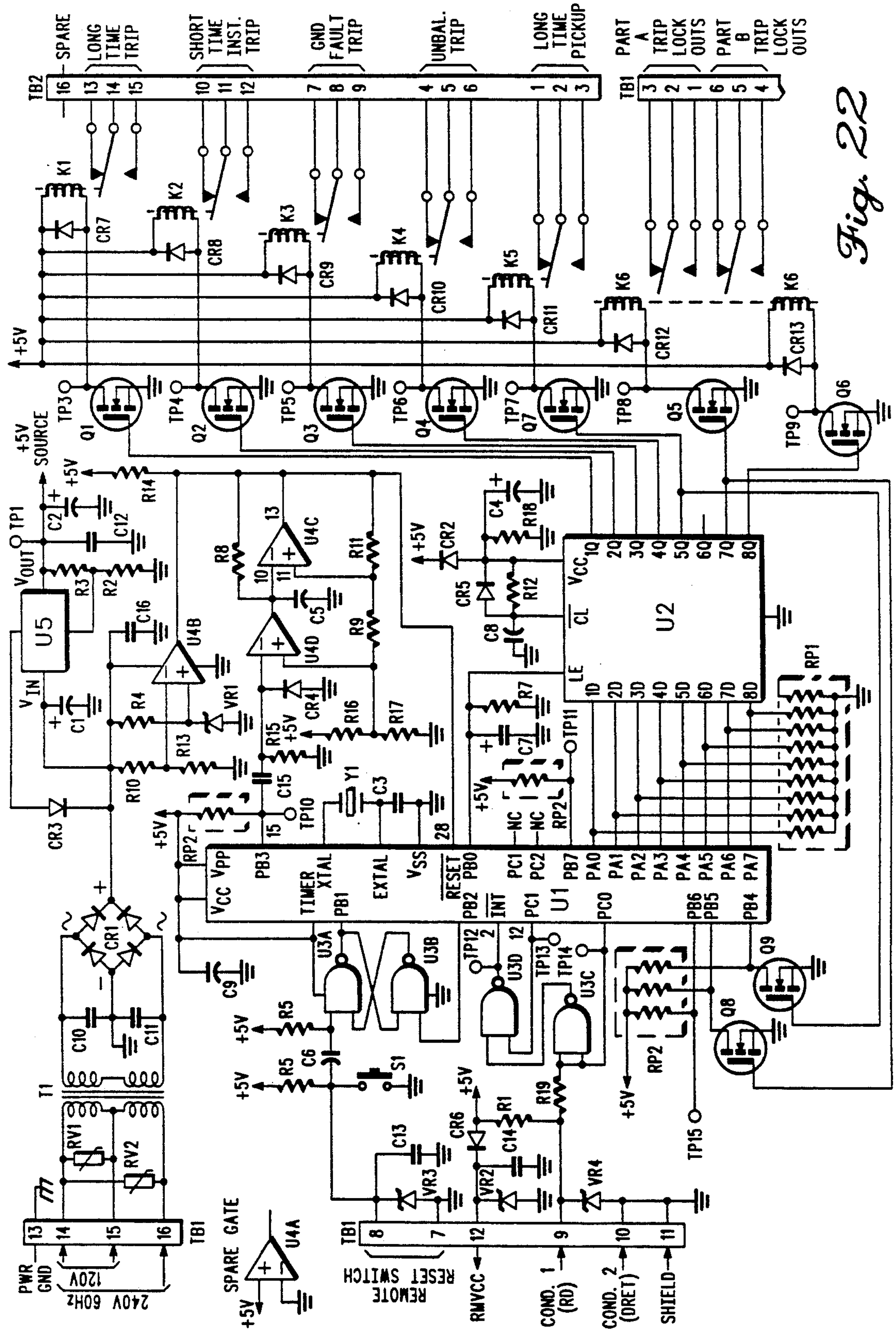
FIG. 22 is a schematic of a Remote Indicator Unit.

FIG. 22, the RIU receives the serial data stream output by the Trip Unit. The RIU interprets byte zero of the serial data stream, and ignores the 31 other bytes in the serial data stream.

Remote Indicator Hardware

Data enters the remote indicator unit through pin 9 of terminal block TB1, as shown in FIG. 22. Input data is a negative going pulse. The pulse proceeds through resistor R19 to both AND gate U3C and input port PC0 of microprocessor U1. The input pulse is shaped by U3C and gated with AND gate U3D, from which it is connected to interrupt $\overline{\text{INT}}$ port at pin 2 of microprocessor U1.

Upon the receipt of a start bit at port $\overline{\text{INT}}$, at pin 2 of microprocessor U1, the microprocessor generates a disable signal on port PC1 and applies it to pin 12 of AND gate U3D. The disable signal applied from port PC1 has a duration that is not less than the time required for the TU to transmit a complete byte of information. In addition, the disable signal is removed from pin 12 of AND gate U3D to allow reception of a trip message within 250 ms after the last byte transmitted.

After receipt of an interrupt signal, microprocessor U1 reads the 8 following bits. If bit zero (b0) is set to a "0" value, all remaining bits of the byte are ignored.

If the value of the first bit is set to "1", then microprocessor U1 reads the remaining 7 bits. The values of the bits are interpreted as follows:

Bit 1: zero if no trip is occurring.

1 if trip is occurring

Bit 2: 1 for instantaneous trip 0 otherwise.

Bit 3: is ignored, but could be interpreted as a 90% of long time pick-up situation.

0 otherwise.

Bit 4: 1 for long time pick-up or trip 0 otherwise.

Bit 5: 1 for short time pick-up or trip.

0 otherwise.

Bit 6: 1 for ground fault pick-up or trip.

0 otherwise.

Bit 7: 1 for phase unbalance pick-up or trip 0 otherwise.

After interpreting the bits of byte 0, the microprocessor U1 checks the parity bit which follows the 8 data bits transmitted by the Trip Unit. In the event that the parity bit is in agreement with the data bits, the microprocessor concludes that the data transfer was a transfer of valid data. Receipt of the stop bit transmitted by the Trip Unit is interpreted by microprocessor U1 and permits the microprocessor to drive the output port PC1 high in order to enable port INT. Enabling input port INT permits the microprocessor U1 to be in a ready state for further receipt of data bytes.

Microprocessor U1 then generates output signals on lines PA0 . . . PA7, thereby providing input to latch U2. Latch U2 is latched "on" by a signal from port PB0 of microprocessor U1. The output of latch U2 is applied to FET transistors Q1 . . . Q7. When an output transistor is driven into conduction, a relay, K1 . . . K6 closes. Transistor Q5 energizes latching relay K6. Transistor Q6 resets latching relay K6.

Closure of contacts of relays K1 . . . K6 provide indications of the information carried in byte 0 from the Trip Unit data stream. Indications of the following are presented by contacts of relays K1 . . . K6:

1. Long time trip is indicated by relay K1.
2. Short time or instantaneous trip is indicated by relay K2.
3. Ground fault trip is indicated by relay K3.
4. Phase unbalance trip is indicated by relay K4.
5. Long time pick-up is indicated by relay K5.
6. The existence of a trip is indicated by a relay K6. Relay K6 is a latching relay. Latching relay K6 may be reset by a pulse applied to transistor Q6.

In the event of an electric power failure of the power supplied to the remote indicator unit, the microprocessor U1 will lose power. However, capacitor C4 will slowly discharge and hold the latch U2 in an active state. If the power is off for less than 5 seconds, information latched by the latch will be preserved. If the electric power returns within less than 5 seconds, then the 5 volt power supply through diode CR2 will return latch U2 to its active state.

Upon the return of electric power to microprocessor U1, microprocessor U1 reads lines connected to ports PB5 and PB4 in order to determine the state of latch U2 before loss of power. In the event that a trip has occurred, microprocessor U1 will obtain this information from port 7Q of latch U2. In the event that a long-time pick-up had occurred before the power failure, microprocessor U1 will obtain this information by reading port 5Q of latch U2.

Upon restoration of power to microprocessor U1, a hardware reset occurs through $\overline{\text{RESET}}$ pin 28 of microprocessor U1. Microprocessor U1 then goes to an initialization portion of its program. Part of the initialization is to read ports PB4 and PB5. If power has been off for longer than 5 seconds, both ports 5Q and 7Q of latch U2 will be "low". Note information content is present in two low values of ports 5Q and 7Q of latch U2, and so microprocessor U1 will start with a fresh start.

In order that latch U2 draws sufficiently little current that capacitor C4 can keep it active for at least 5 seconds, FET Q8 and FET Q9 are used as buffers between ports 5Q and 7Q of latch U2 and ports PB4 and PB5 of microprocessor U1. By having the port of the latch connected to the gate of an FET, substantially no current is drawn from the latch by the FET during a power loss situation. Thus, FET Q8 and FET Q9 act as buffers on the output of latch U2. Also, FET Q1 . . . Q7 have their gates connected to respective output pins of latch U2, and therefore, draw substantially zero current from the latch. FET Q1 . . . Q6 act as buffers on the output of latch U2 so that capacitor C4 can hold latch U2 in an active condition for the required time period during a power outage.

In summary, the Remote Indicator Unit has a microprocessor driving a latch. The latch power supply has a capacitor to hold the latch active during a power outage and the latch drives relays through low current drain buffers. Low current drain buffers are connected to at least one output line of the latch, and the buffer output connected to input ports of the microprocessor. The microprocessor reads the input ports upon reset, and a reset occurs on "power up", thus the microprocessor uses the latch as memory to preserve information during the power outage.

Jack TB1 provides connection between the remote indicator unit and the Trip Unit. The remote indicator unit power supply provides a 5 volt source to the top of resistor R1, and through diode CR6 provides input power RMVcc to power the phototransistor of the optoisolator and the Trip Unit. The output signal from the Trip Unit is applied to pin 9 of jack TB1 and is connected from pin 9 to input pin 9 and pin lo of AND gate U3-C. The return conductor for the signal line connects to pin 10 of jack TB1 which is referenced to circuit ground potential in the RIU.

A power supply voltage monitor comprises comparator U4B. Zener diode VR1 sets a potential below which, should the potential on pin 7 of comparator U4B go, causes comparator U4B to make an output transition which resets microprocessor U1 at its reset port at pin 28.

A watchdog test of software functioning is provided at output port PB3 of microprocessor U1. As the software in microprocessor U1 executes its normal sequence, it generates a low transition periodically at output port PB3. The low pulse generated at output port PB3 causes comparator U4D to go low at its output, thereby discharging capacitor C5. Capacitor C5 normally tends to charge toward +5 volts through resistor R8 and resistor R14. In the event that capacitor C5 is not discharged by a low going transition at output port PB3 of microprocessor U1, then the voltage at the positive terminal at capacitor C5 will approach 5 volts. Comparator U4C has its input terminal 11 tied to a fixed fraction of 5 volts by voltage divider R16 and R17. If the voltage at the positive terminal of capacitor C5, which is connected to input pin 10 of comparator U4-C goes above the potential at pin 11 of comparator U4-C, then the output terminal of pin 13 of comparator U4-C goes low, thereby resetting microprocessor U1 at its reset input at its pin 28. In the event that the software ceases functioning for an extended time period, then the negative input terminal at pin 8 of comparator U14 will be pulled toward 5 volts through resistor RP2 and resistor R15, thereby permitting capacitor C5 to charge to 5 volts, and microprocessor U1 to be continuously reset by comparator U4C. This action prevents uncoordinated noise from being transmitted through latch U2 to relays K1 . . . K6.

Microprocessor U1 attempts to reset upon receipt of a reset pulse at reset pin 28. As part of the initialization routine, microprocessor U1 generates low going pulses at port PB3 at its pin 15. These low going pulses discharge capacitor C5. In the event that the program ceases functioning again, then capacitor C5 charges to the +5 volts through resistor R8 and resistor R14 thereby generating another reset pulse. The new reset pulse generates further low pulses at port PB3 during the initialization routine of microprocessor U1. Port PB3 is pulled up to +5 volts by resistor RP2.

In the event that a trip occurs, even in the presence of a power loss or microprocessor misfunction, latching relay K6 will stay latched and continue the output indication that a trip has occurred.

The output indicators of the remote indicator unit must be manually reset by an operator by his depressing manual reset switch S1. Microprocessor U1 reads input port PB1, and in the event the manual reset switch S1 is depressed, it clears all the output indicating relays.

LOCAL MANAGEMENT UNIT HARDWARE

Figure 23:
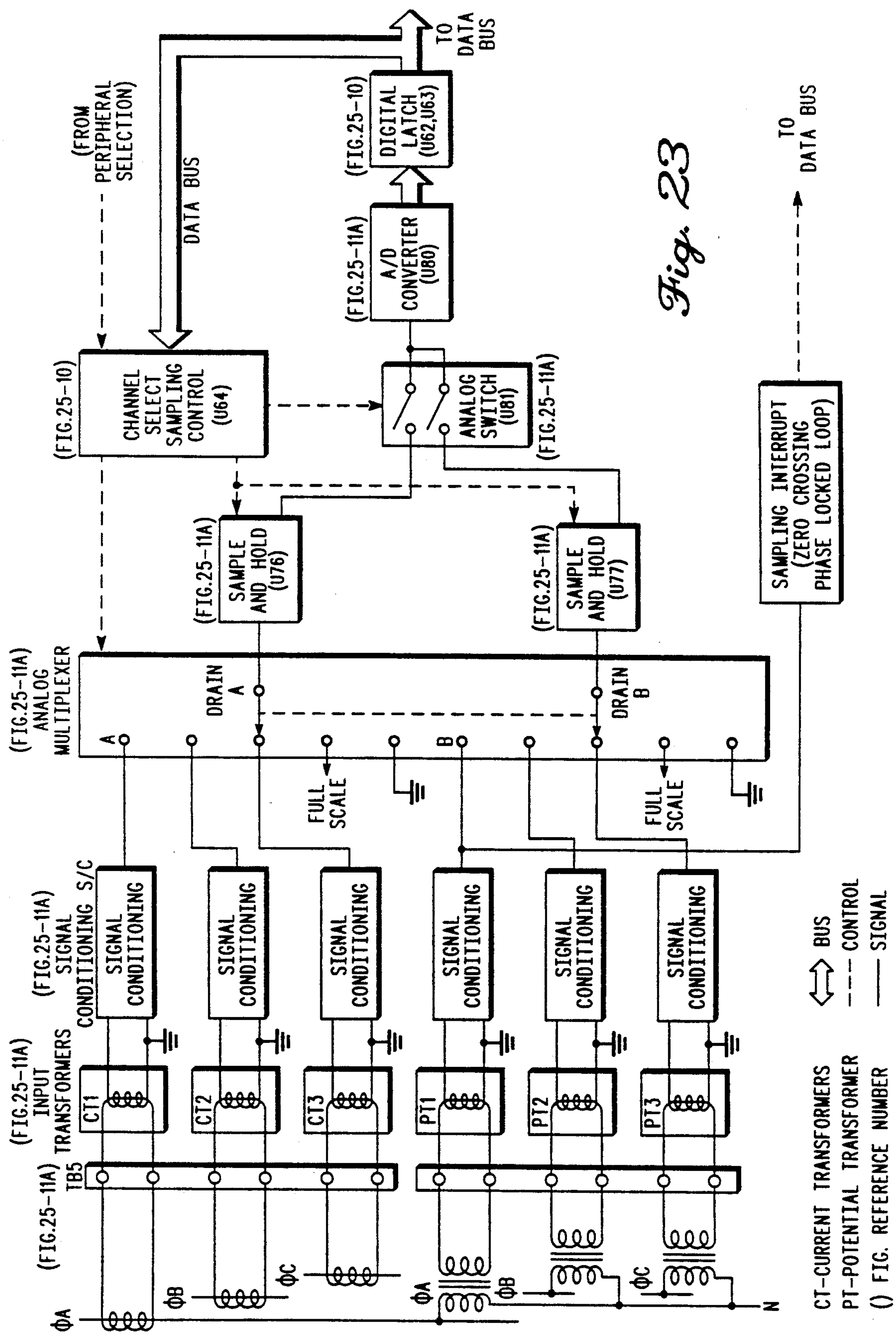
FIG. 23 is a block diagram of a Local Management Unit, sheet 1 of 2.
Figure 24:
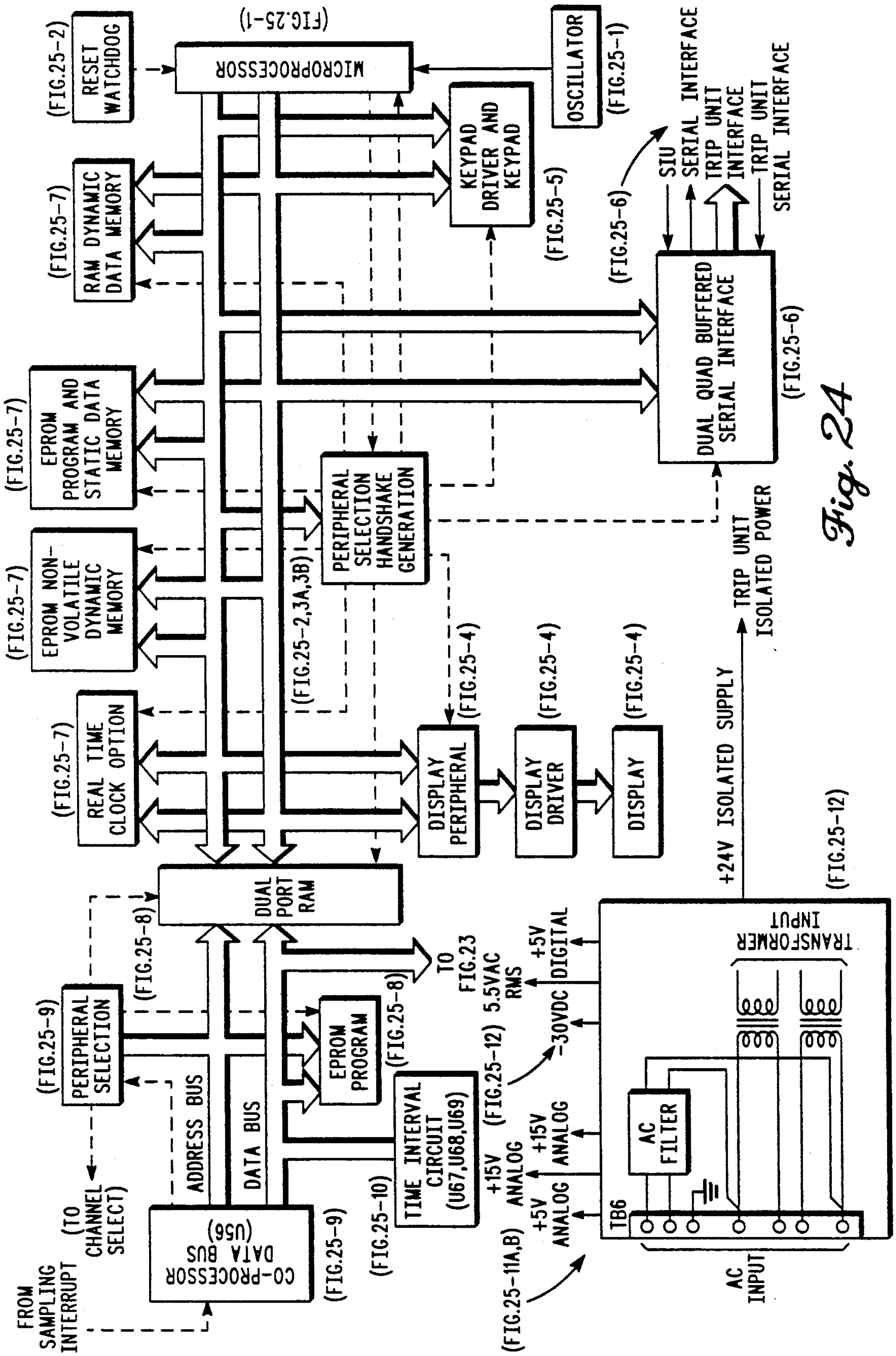
FIG. 24 is a block diagram of a Local Management Unit, sheet 2 of 2.

FIG. 23 and FIG. 24 are a block diagram of the Local Management Unit, LMU, hardware. A three phase alternating current power line has Phase A, Phase B, Phase C, and a neutral line. Current transformer CTA is responsive to current flow in the conductor on Phase A. Current transformer CTB is responsive to the current flow in Phase B. Current transformer CTC is responsive to the current flow in Phase C. Potential transformer PTA develops an output voltage proportional to the potential in the conductor of Phase A. Potential transformer PTB develops an output voltage proportional to the potential of the conductor in Phase B. Potential transformer PTC develops an output voltage proportional to the potential in the conductor of Phase C. The primaries of the potential transformers connect between their respective conductors and the neutral conductor.

The current transformers are connected into circuits carrying current from 0–10 amperes, and each drives a respective input transformer. The current transformers, CTA, CTB, CTC are chosen so that the maximum expected current flow in their respective phases results in a 10 ampere flow in the current transformer secondary. Current transformer CTA drives input transformer CT1. Current transformer CTB drives input transformer CT2. Current transformer CTC drives input transformer CT3.

The secondaries of the current transformer input transformers, CT1, CT2, CT3 connect to signal conditioning circuits S/C. The output of the respective signal conditioning circuits provides a voltage proportional to their input currents, and supply that voltage to the double pole analog multiplexer and the signal conditioning circuits limit the voltages appearing at their output in order to protect downstream equipment from overvoltages.

Potential transformers PTA, PTB, PTC each drive a respective input transformer. Potential transformer PTA drives input transformer PT1. Potential transformer PTB drives input transformer PT2. Potential transformer PTC drives input transformer PT3. The secondaries of the potential input transformers PT1, PT2, PT3 drive signal conditioning circuits S/C. The output of the signal conditioning circuits are connected to the double pole analog multiplexer. Signal conditioning circuits S/C limit their output voltages in order to protect downstream electronics from over-voltages.

An additional output from the Phase A input transformer PT1 connects to the sampling interrupt (zero crossing/phase-lock loop) block. The sampling interrupt block contains a zero crossing detector and generates 32 interrupt signals during each Phase A voltage cycle. The interrupts are equally spaced and ar used to control the reading of data through the double pole analog multiplexer. The interrupt directly controls the co-processor shown in FIG. 24.

The double pole analog multiplexer has a first switch labeled Drain A which connects to the current signals, and to a full scale line and a grounded line. The double pole analog multiplexer has a second switch labeled Drain B which connects to the output signal proportional to phase potential, and also connects to a full scale line and a grounded line.

The double pole analog multiplexer is controlled by the co-processor. The co-processor controls the analog multiplexer by a signal on its databus to the peripheral selection block, and by a signal on the channel select line to the channel select sampling control block. The channel select sampling control block has input from both the databus and the channel select line. The channel select sampling control block controls the double pole analog multiplexer.

The double pole analog multiplexer Drain A provides input to the "sample and hold" block U76. The Drain B output of the double pole analog multiplexer provides input to "sample and hold" block U77. Analog switch U81 controls which "sample and hold" circuit, U76, U77, is digitized by the analog to digital converter U80. The analog switch is controlled by the channel select sampling control block. A programmable gain stage, U82, follows analog switch U81 providing an increased dynamic range of measurement.

Output of the analog to digital converter U80 provides input to the digital latch U62, U63. The digital latch U62, U63 provides output to the co-processor databus.

A dual port random access memory, dual port RAM, receives input from the data bus of the co-processor.

The co-processor measures current in Phase A, Phase B, and Phase C. It also measures potential in Phase A, Phase B, and Phase C. The measurements of current and potential are made 32 times during each AC cycle of Phase A. The measurements are made in response to interrupts generated by the sampling interrupt block which is responsive to zero crossing of the Phase A potential. 32 equally spaced interrupts are generated by the sampling interrupt block and delivered directly to the co-processor on the interrupt line.

During each Phase A AC cycle the co-processor measures 32 equally spaced values of the various current and voltage inputs. The co-processor then stores a running sum of, for example, the measured quantities, desired products of instantaneous current and voltage values, and of the square of the measured quantities, in the dual port RAM. Also, a message cell in the dual port ram is updated to indicate the end of a Phase A AC cycle.

The main processor, shown in FIG. 24, reads data from the dual port RAM. A read cycle from the dual port RAM is initiated by an update of the message cell indicating the end of an AC cycle on Phase A. The main processor reads the accumulated running sums from the dual port RAM and reinitializes the appropriate registers to zero.

The main processor then computes several parameters for each phase, including, RMS voltage, RMS current, average power, and power factor. Also, the AC frequency is calculated on the basis of the Phase A zero crossing time intervals. Each of the RMS values is computed by taking the square root of 1/32 of the sum of the squared values.

The average power for each phase is computed by taking 1/32 of the sum of the 32 samples of instantaneous voltage multiplied by instantaneous current. The power factor for each phase is computed by dividing the average power by the product of the RMS current and the RMS voltage. The phase angle may then be computed, and the power factor is equal to the cosine of the phase angle.

The co-processor periodically tests the front end circuitry by connecting a precision 4.75 volt reference source through the dual port analog multiplexer, and also by connecting a ground through the dual port analog multiplexer.

Calibration measurements using the 4.75 volt reference and the ground connection are made at the end of the 32 time periods during each AC cycle. A full calibration is accomplished each 8 AC cycles. Two values of gain are available to the analog to digital converter. Two calibration voltages, 4.75 volts and, ground, or 0 volts, are available for calibration. Calibration is performed on either Drain A for current measurements or on Drain B for potential measurements. Thus there are 8 possible combinations of calibrated values, and since one is done each AC cycle, a complete calibration sequence is done each 8 AC cycles.

Additionally, the co-processor does other internal self checks on the ROM, RAM, and itself.

The main processor controls a number of peripherals through its databus and address bus. As shown in FIG. 4, the LMU contains a number of keypad switches and a display device. The keypad switches command the display device through a menu, and the devices are controlled by the main processor. The internal status of many functions of the LMU are displayed in the display device.

LMU HARDWARE SCHEMATICS

The apparatus shown in block form in FIG. 23 and FIG. 24 is shown in greater detail in the schematics, FIG. 25-1 through FIG. 25-12. The individual schematics are tied to apparatus shown in FIGS. 23 and 24 by numbers placed in hexagons on FIG. 23, FIG. 24. The number within the hexagon refers to the designation 1 . . . 12 in FIG. 25-1 . . . FIG. 25-13.

The numbering of the schematic diagrams FIG. 25-1 . . . FIG. 25-13 proceeds with FIG. 25-1 containing the main processor, as shown on FIG. 24, and proceeding to the left in the block diagram with FIG. 25-11 containing the input current transformers, potential transformers, the analog multiplexer, and the sample and hold circuits. It is more convenient to discuss the schematic diagram in the order in which the signal is detected by the apparatus and processed throughout the apparatus.

Co-Processor

The schematic diagram FIG. 25-1 . . . FIG. 25-13 will be discussed by tracing the input signal through their processing by the electronics, including the co-processor U56 FIG. 25-9. The main processor U1 FIG. 25-1 will be discussed hereinbelow.

The co-processor U59 provides rapid sampling of both voltage and current from each of the phases of a 3 phase AC line. Simultaneous values of voltage and current are sampled using an analog sample and hold chip. Also, the co-processor does multiplications and sums based on the measured values of current and voltage. A Texas Instruments type TMS 32010 microprocessor has been found suitable as a co-processor.

Voltage and Current Input Signals

FIG. 25-11 shows the input current transformers CT1, CT2, CT3, and also shows the input potential transformers PT1, PT2, PT3. The input transformers are also shown in FIG. 23.

The secondaries of the transformers are clamped so that their output voltage does not exceed approximately +10.7 volts and −10.7 volts. The source of the clamping voltage is shown in FIG. 25-11 at the upper right corner. A VLSI chip, U75, provides a precision 10 volt output voltage at its pin 6. The U75 VLSI chip is particularly insensitive to temperature changes, and so the +10 volt reference output voltage at pin 6 of U75 is substantially independent of the temperature of the apparatus. A Linear Technologies type LT1021CCN8-10 device has been found satisfactory as chip U75. The +10 volt reference source is amplified by op-amp U78-D op-amp U78-C, and finally has current amplification by transistor Q6. The emitter of transistor Q6 provides an approximately 10.7 volt signal SRCC. Signal SRCC connects to diode CR6, CR8, CR10, CR12, CR14, and CR16 in order to provide a clamping voltage for the input transformers. Also, the +10 volt reference, 10VR, provides input to op-amp U78-A and current amplifying transistor Q7 to provide an approximately −10.7 volt reference identified as signal SNKC. Signal SNKC provides clamping voltage to diode CR5, CR7, CR9, CR11, CR13, and CR15 on the secondaries of the input transformers.

A precision 4.75 volt source is provided by the +10 volt reference, 10 VR at the output of op-amp U78-B. The 4.75 volt source is identified as FSC. Signal FSC is used to calibrate the analog to digital converter, as will be described more fully hereinbelow.

The secondaries of the transformers connect to analog multiplexer U73. The output of the current transformers CT1, CT2, CT3 connect to input A1 at pin 19, input A2 at pin 20, and input A3 at pin 21, respectively. Inputs A4, A5, A6, and A8 connect to ground, and thereby provide a zero reference input to the multiplexer U73. Potential transformers PT1, PT2, and PT3 connect to input B1 at pin 11, B2 at pin 10, and B3 at pin 9, respectively. Inputs B4, B5, B6 and B8 connect to ground. Input A7 at pin 25 and input B7 at pin 5 connect to signal FSC, the 4.75 volt precision calibration voltage provided at the output of op-amp U78-B, as shown in the upper right side of FIG. 26-11.

Analog multiplexer U73 has an output at Drain A at pin 28 connecting to "sample and hold" circuit U76. Analog multiplexer U73 has an output at Drain B pin 2 connecting to "sample and hold" circuit U77.

The output of "sample and hold" circuits U76, U77 connect to separate inputs, pin 2 and pin 10, respectively, of analog multiplexer U81. One input or the other may be directed through an output switch to op-amp U82, at its input pin 3. The output of op-amp U82 provides an input to analog to digital converter, ADC U80. The gain of op-amp U82 is controlled by switch B of multiplexer U81. Thus, op-amp U82 provides an adjustable gain buffer on the input line to ADC U80.

Multiplexer U73 is controlled by signals on line ANA0, ANA1, and ANA2 on pins 17, 16 and 15, respectively. Multiplexer U81 is controlled by signals ISEL, VSEL, and 2XH at its pins 1, 9, 16. These control signals all derive from various pins of output latch U64, where latch U64 is connected to the 16 bit data bus of the co-processor, as shown in FIG. 25-10

In operation, potentials proportional to current flow and voltage on the conductors controlled by the LMU appear at respective input pins of analog multiplexer U73. Beginning at a particular instant in time, sample and hold circuits U76,U77 sample a selected current signal and a selected voltage signal. The two signals, one current and one voltage, are both sampled during the same time interval, beginning at the selected instant. The two respective signals are "held" for digitization by ADC U80. ADC U80 then digitizes the two signals in a prescribed order, and transfers the results of each digitization to the 12 bit bus, ANDB0 . . . ANDB11, at its output channel DB0 . . . DB11 at pins 16 . . . 27 of ADC U80. The 12 bit bus ANDB0 . . . ANDB11, connects to digital buffers U62, U63 as shown in FIG. 25-10. Digital buffers U62, U63 pass the digitized values to the 16 bit data bus TD0 . . . TD15, of the co-processor U56 under the control of clock strobe RSO at their input pin 1. Strobe RSO is generated by address decoder U60 under the control of address bus TA0 . . . TA11 of co-processor U56. Digital buffers U62, U63 provide input of the digitized current and voltage signals to the 16 bit data bus TD0 . . . TD15 of the co-processor U56. Also shown in FIG. 25-11 is a precision quiet power supply for the ADC U80. Precision voltage reference chips U83,U84 provide power supplies for op-amp U79-B. The output of op-amp U79-B at its pin 7 provides a power supply to transistor Q11. The output of transistor Q11 at its pin 3 provides a precision quiet 5 volt 50 milliampere power supply for ADC U80, and is supplied to ADC U80 at its pin 1.

Zero Crossing Detector

As shown in FIG. 25-11, a zero crossing detector is formed from op-amp U79-A, which takes input at its pin 2 from the phase A potential signal by connection to the secondary of potential transformer PT1. Output pin 1 of op-amp U79-A undergoes a transition at each zero crossing of the potential at pin 3 of the secondary of potential transformer PT1, and thereby causes the logical state of the output of transistor Q8 at pin 3 to undergo a transition. The logical transition of the output of transistor Q8 is coupled into a phase locked loop consisting of VLSI chips U71, U72, U74-A, and U57-C. Output pin 6 of VLSI chip U74-A carries 32 pulses per phase A AC cycle The signal at output pin 6 is designated $\overline{\text{TMSINT}}$ and connects to co-processor U56 at its input pin 5 to generate an interrupt to co-processor U56. The interrupt controls sampling of voltage and current values at 32 equally spaced time intervals in the phase A AC cycle. Co-processor U56 is shown in FIG. 25-9.

Co-processor Clock

Co-processor U56, shown in FIG. 25-9, has an internal clock controlled by crystal Y3. For example, crystal Y3 may operate the internal clock at a frequency of approximately 14.3 megahertz.

As shown in FIG. 25-10, three 4 bit counters U67, U68, U69 count pulses on signal CLOCKOUT from co-processor U56 at pin 6, and derived from the clock controlled by crystal Y3, in order to generate "accurate clock time". Counters U67, U68, U69 are controlled through digital latches U65, U66. Latches U65, U66 latch accurate clock time onto the data bus TD0 . . . TD15 of co-processor U56, as shown in FIG. 25-10. Service of latches U65, U66 is done each of the 32 sample periods generated by the phase A zero crossing circuit, as initiated by the signal $\overline{\text{TMSINT}}$ input to co-processor U56 at its input pin 5.

Additional Co-Processor Peripherals

As shown in FIG. 25-9, input and output for co-processor U56 is provided by the 16 bit data bus TD0 . . . TD15 at pins 18 . . . 26 of co-processor U56. Data bus pull up resistors RP13-A, RP14 pull up the data bus lines to +5 volts in order to define data bus line potential.

A 12 bit address bus TA0 . . . TA11 for co-processor U56 connects to the co-processor at its port A0 . . . A11. The address bus uses pull up resistors RP16-B, RP13-B in order to define potentials on the address bus line.

As shown in FIG. 25-8, electrically erasable programmable read only memory chips U53 and U54 each have 64K bits or 8K BYTES of memory for holding the co-processor U56 program.

Figures 7, 25:
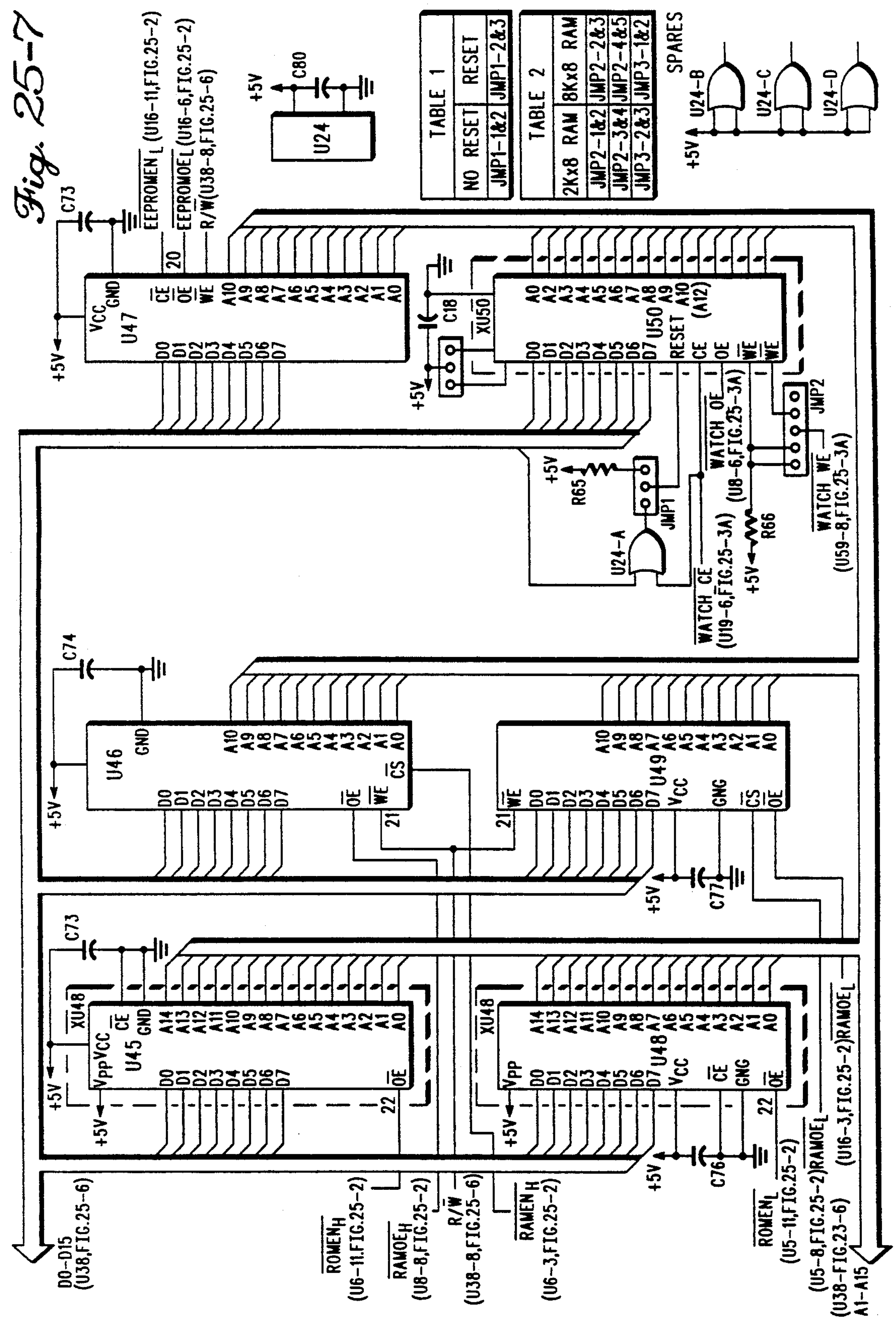
Figures 8, 25:
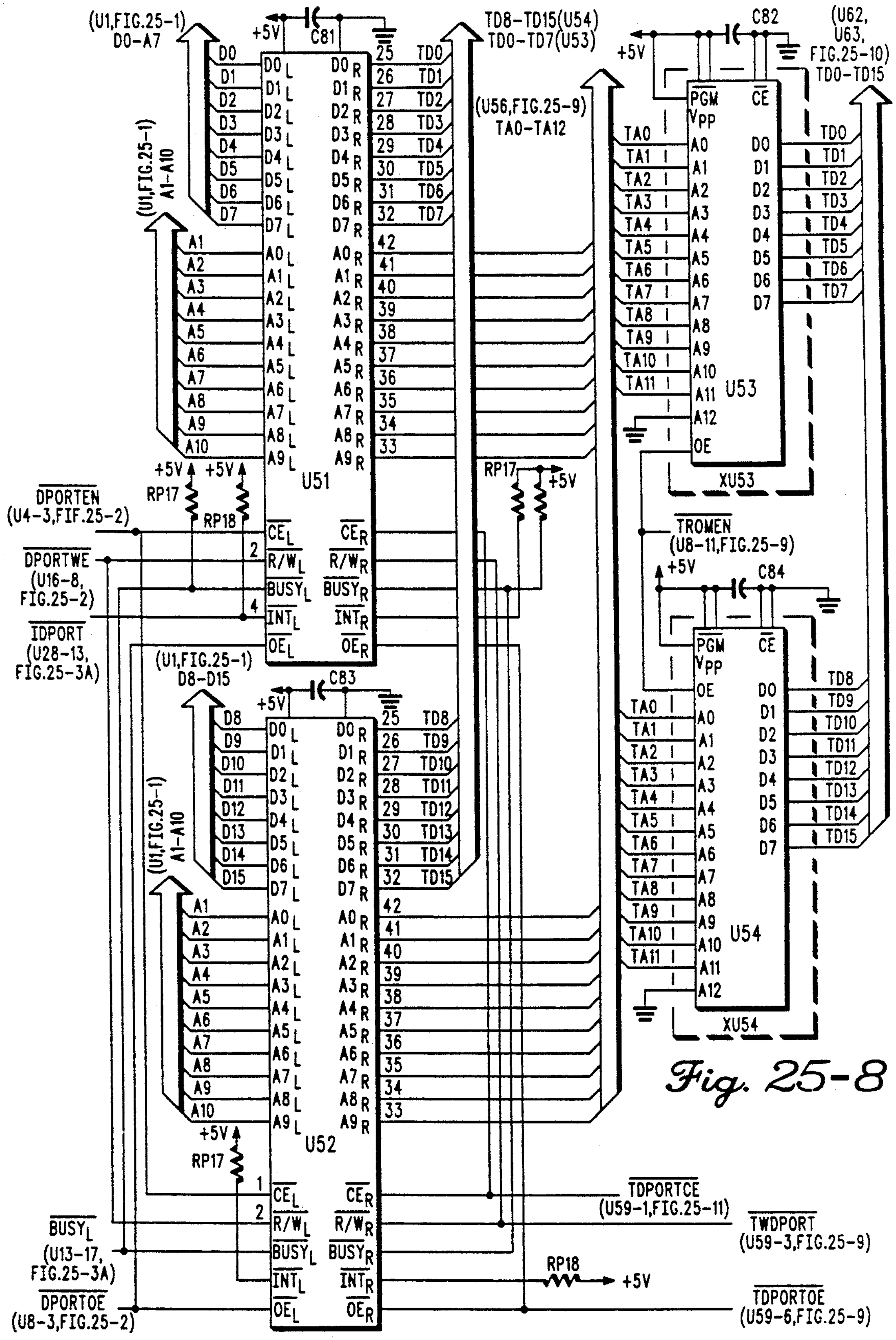
Figures 9, 25:
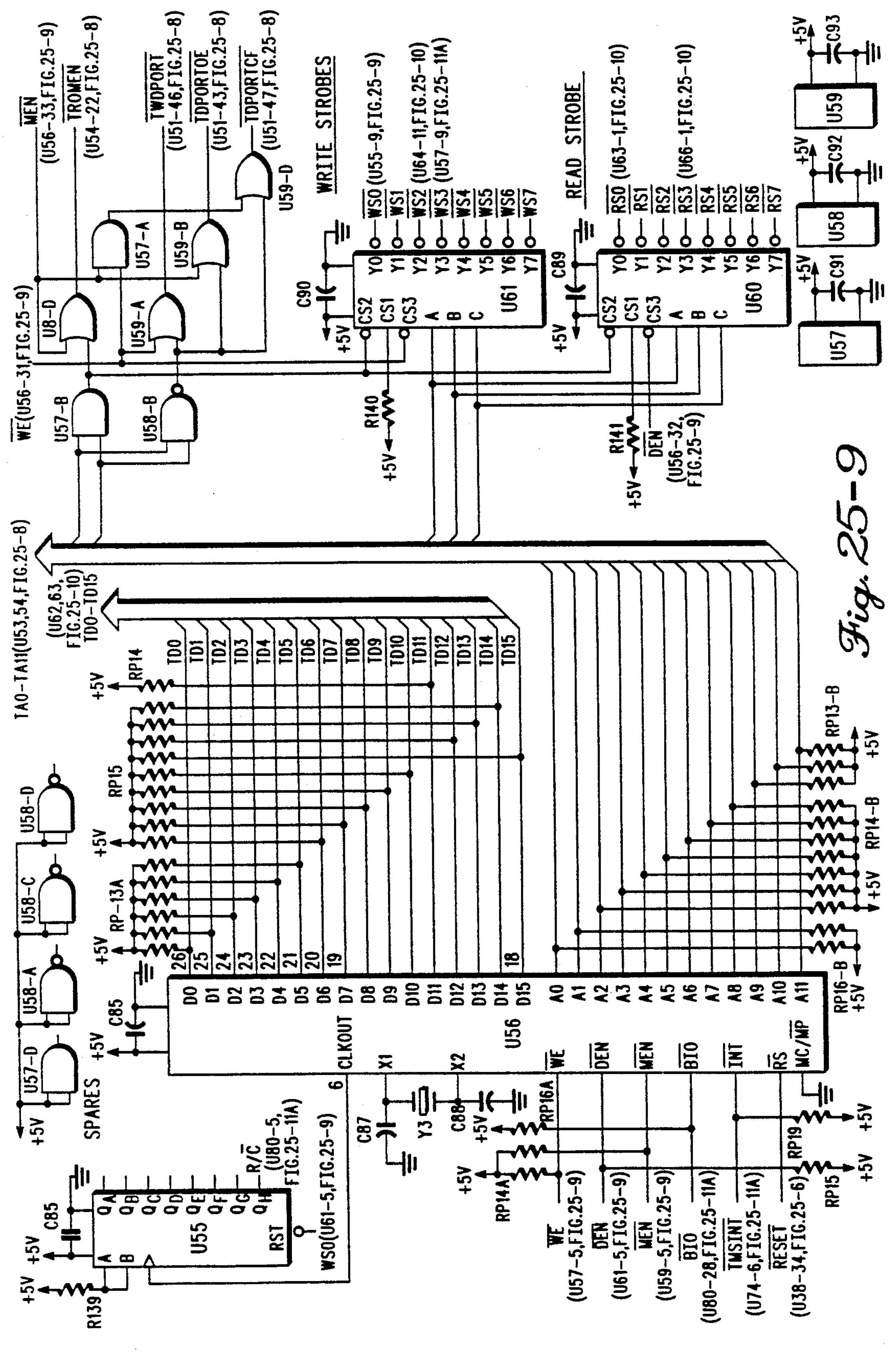
Figures 10, 25:
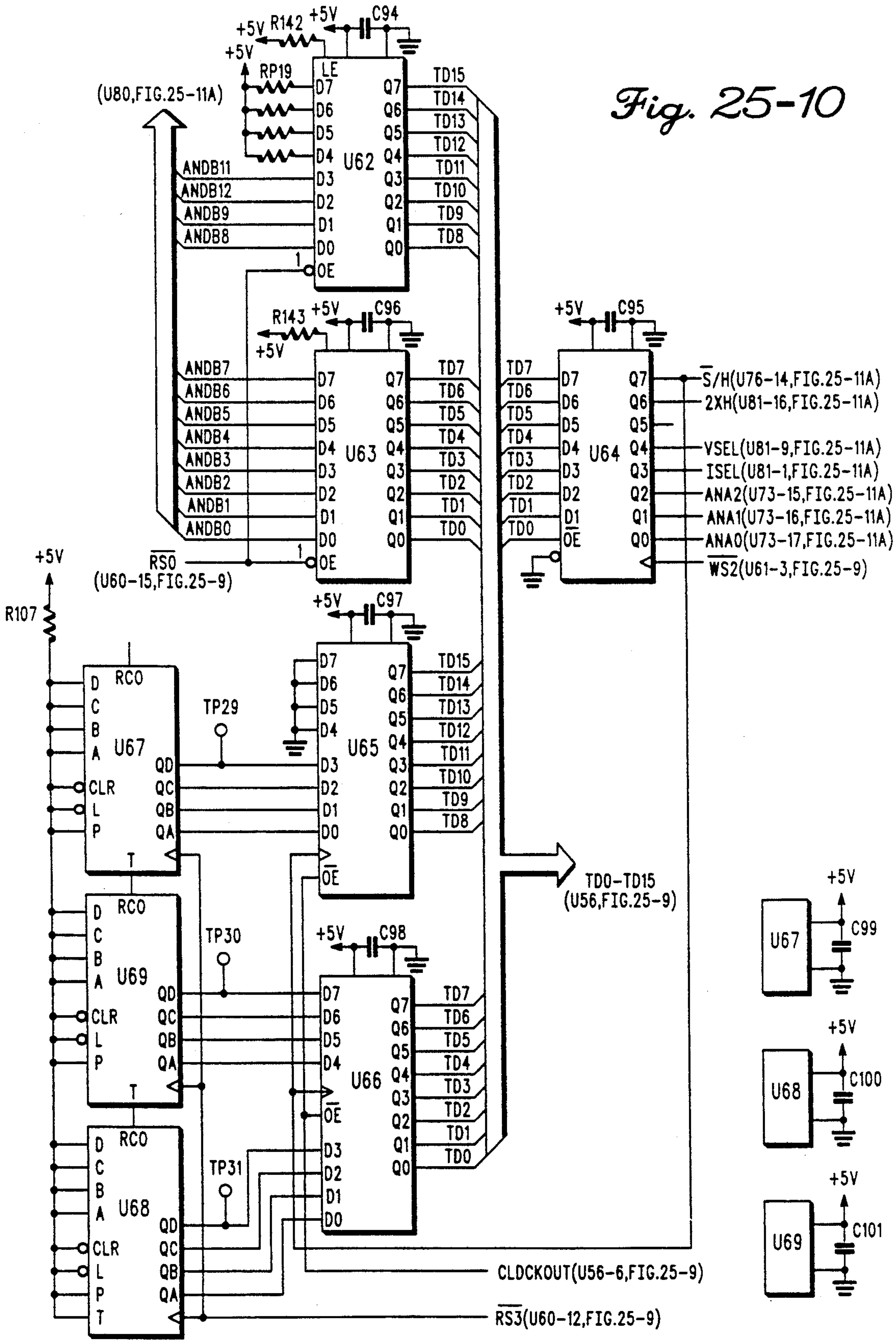
Figures 11A, 25:
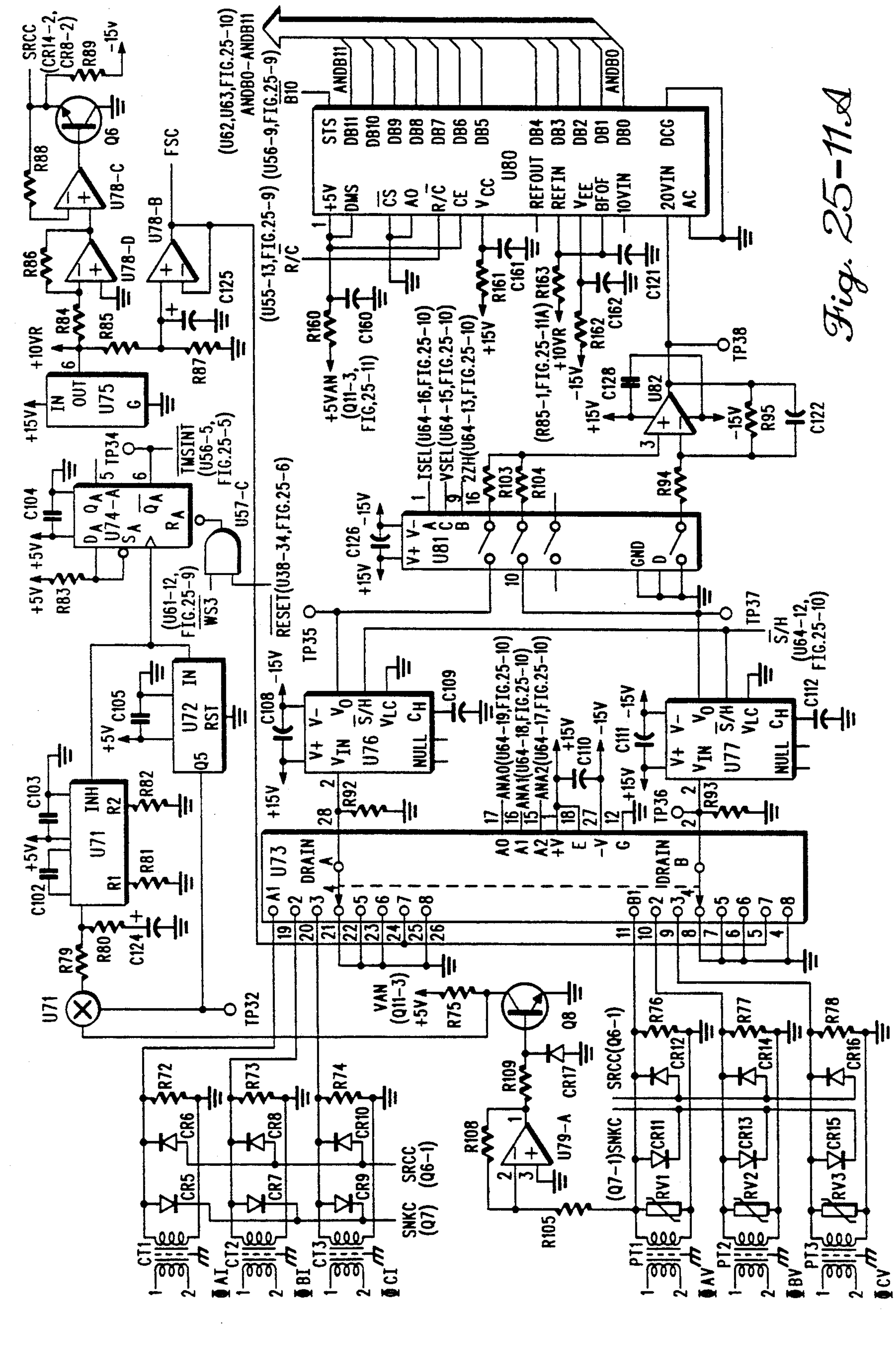
Figures 11C, 25:
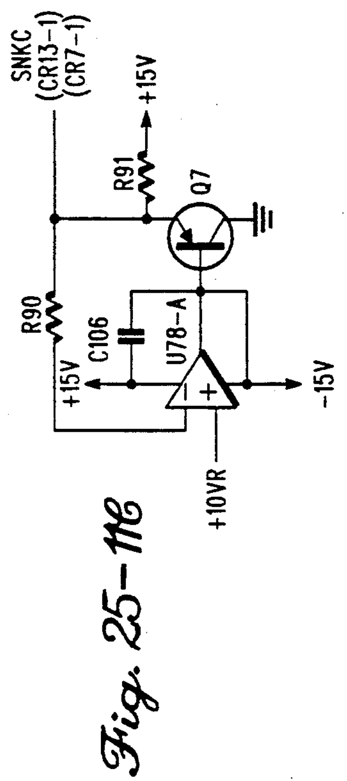
Figures 11D, 25:
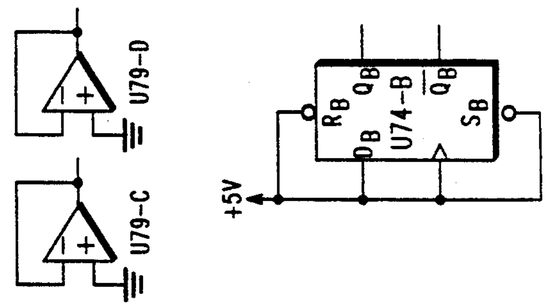
Figures 11B, 25:
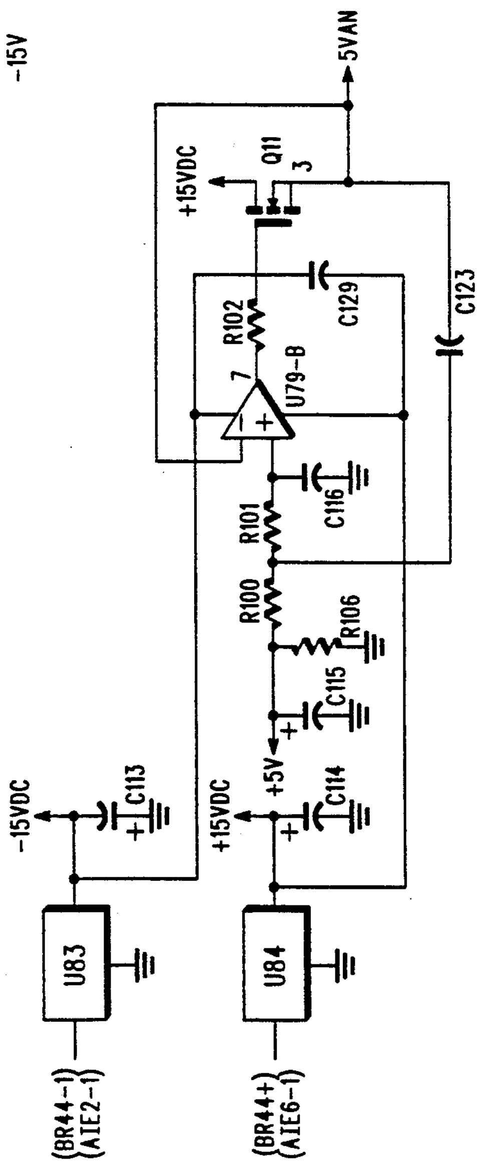
Figures 12, 25:
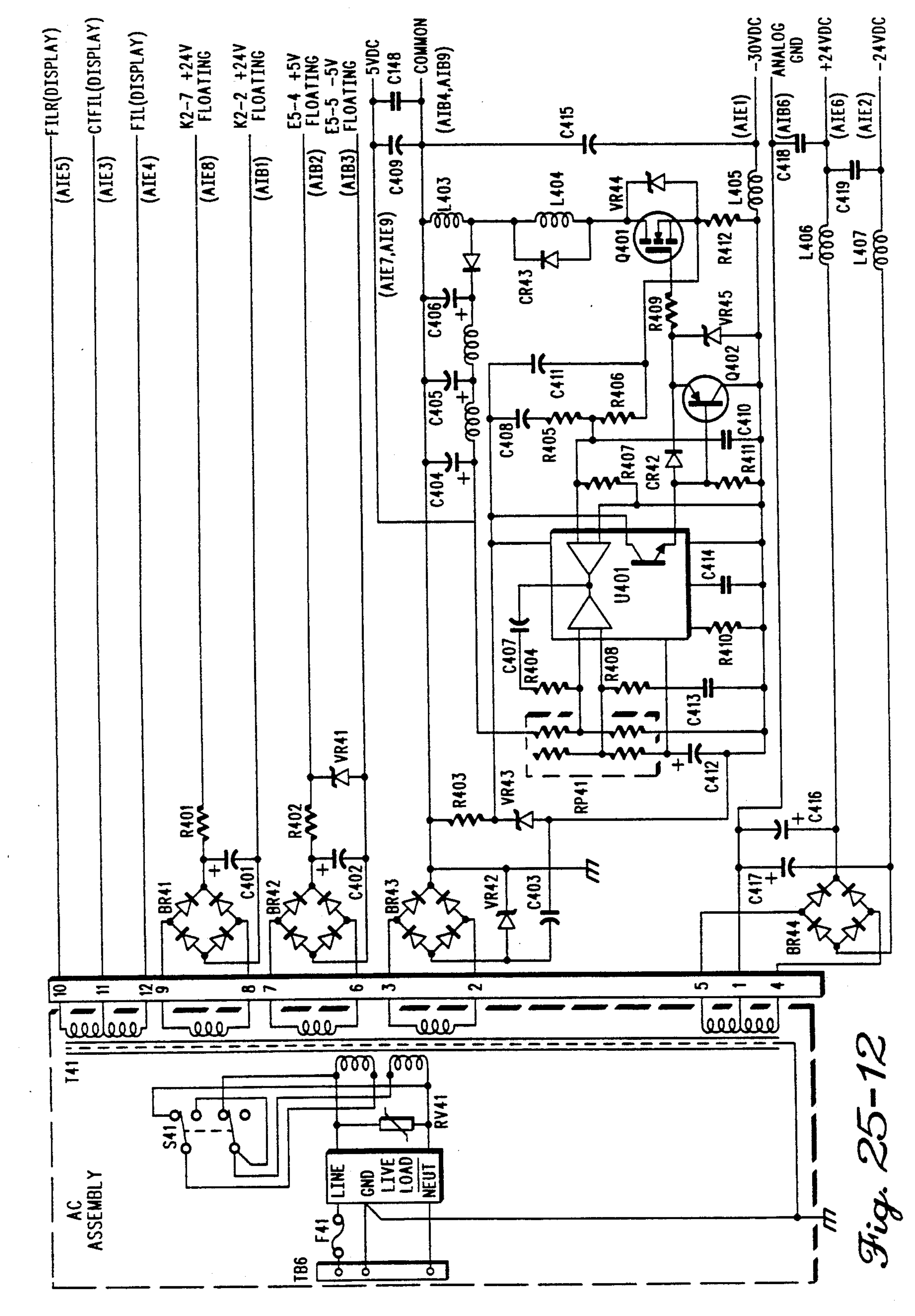
Figures 13A, 13B, 25:
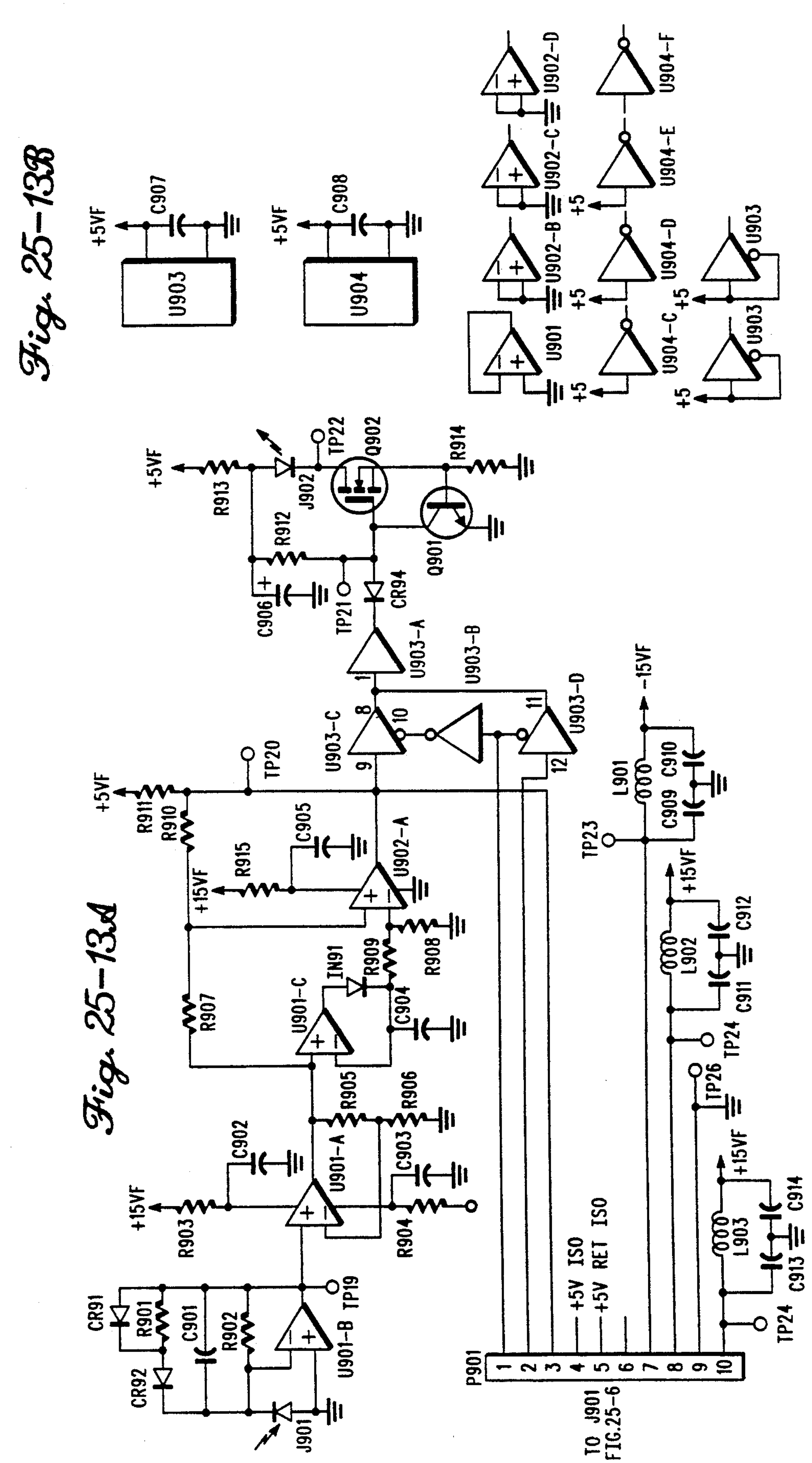
Figure 29:
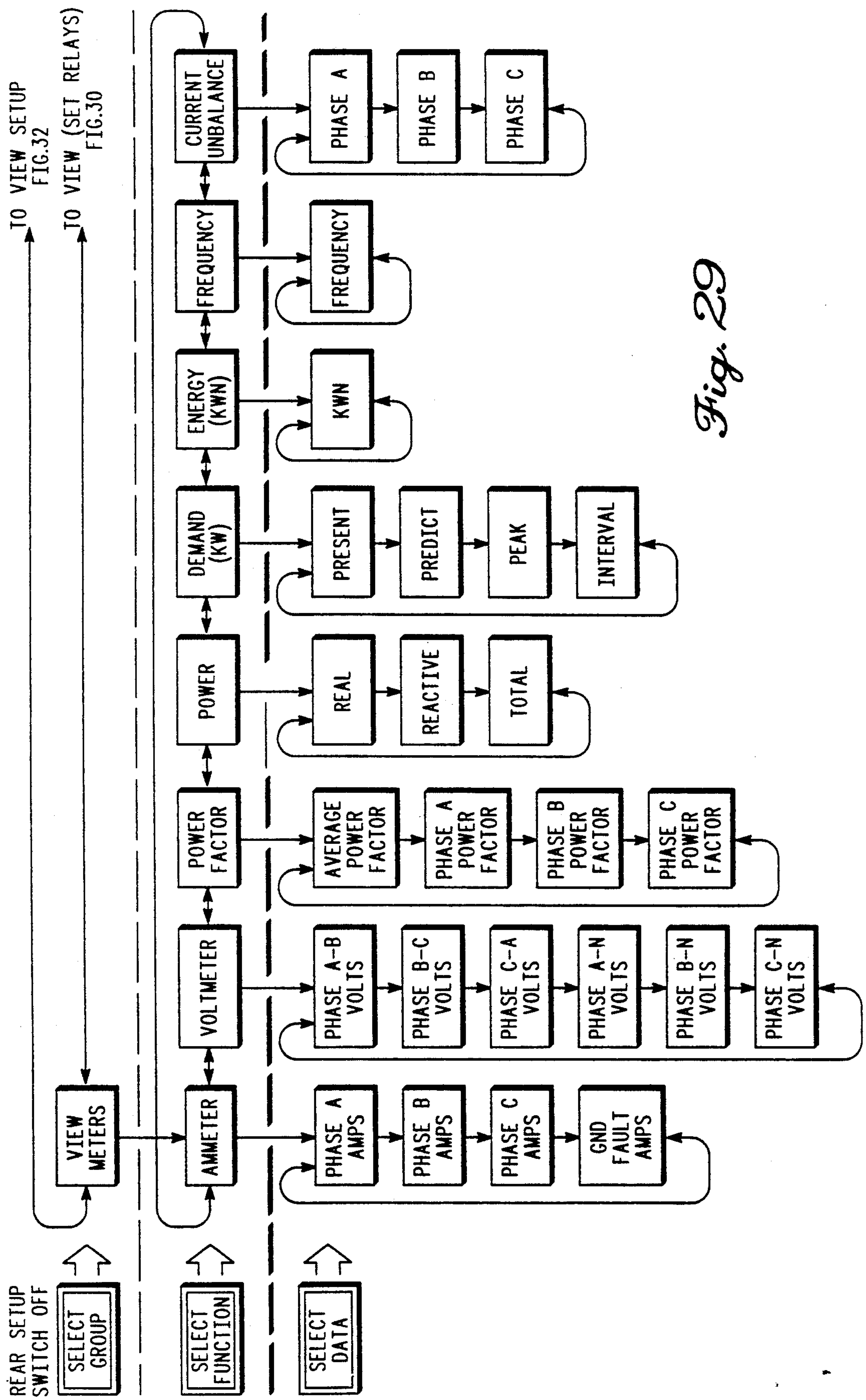
FIG. 29 is a diagram of a menu for an LMU, sheet 1 of 4.

As shown in FIG. 25-9, output strobes are generated from the address bus by address decoding logic circuits U57-B, U8-D, U57-A, U58-B, U59-A, U59-B, and U59-D, as shown in FIG. 25-7. The output strobes are identified as signals $\overline{\text{TROMEN}}$ for the EPROM U54, and $\overline{\text{TWDPORT}}$ and $\overline{\text{TDPORTCE}}$, for the dual port RAM U51.

Write strobes are generated from the address bus by decoder U61 shown in FIG. 25-9 for the devices shown in FIG. 25-10 and FIG. 25-11.

Read strobes are generated from the address bus by decoder U60 as shown in FIG. 25-9 to activate buffers to send data to co-processor U56 from devices shown on FIG. 25-10 and FIG. 25-11.

Dual Port RAM—Co-Processor Side

FIG. 25-8 shows the dual port memory. U51 and U52 each provide 1K BYTES of 8 bit dual port RAM. The 16 bit data bus TD0 . . . TD15 of co-processor U56 connects to RAM U51 at its input ports D0R . . . D7R at its pins 25 . . . 32, and connects to dual port RAM U52 at its input ports D0R . . . D7R at its input pins 25 . . . 32. The co-processor U56 address bus TA0 . . . TA12 connects to dual port RAM U51 at its input ports A0R . . . A9R, and connects to dual port RAM U52 at its input ports A0R . . . A9R, that is at pins 33 . . . 42 of U51, U52 respectively.

Dual port RAM U51, U52 transfers information from co-processor U56 to main processor U1, shown in FIG. 25-1.

Input to main processor U1 is provided once each AC cycle on phase A from the dual port RAM, shown in FIG. 25-8. Also input to main processor U1 occurs from the keypad switches, the trip unit serial communications input port, and the optical ring serial communications port, the programmable read only ROM, U47, FIG. 25-7, associated with the main processor U1, and from the other peripherals.

Main Processor

The main processor's hardware will be described starting with the main processor U1 as shown on FIG. 25-1, and working through the peripheral devices.

Main processor U1 has a 23 pin address bus A1 . . . A23.

Main processor U1 has a 16 bit data bus D0 . . . D15.

Resistors RP3, RP4 serve as data bus pull up resistors to define the potentials on the data bus D0 . . . D15.

Resistors RP1-B, RP5, RP6, RP7-A, RP2, and RP10 serve as address bus pull up resistors to define the potential on the address bus A1 . . . A23.

It has been convenient and satisfactory to use a Motorola type 68000 microprocessor for microprocessor U1. Signals appear at the pins of microprocessor U1 as follows:

| PIN | SIGNAL |
|---|---|
| 14 | A +5 volt operating voltage is applied to microprocessor U1. |

-continued

| PIN | SIGNAL |
|---|---|
| 16 | Ground connection. |
| 18 | $\overline{RESET}$, pull "low" and return "high" to start the microprocessor at a known address. Hold "high" to keep the microprocessor running. |
| 10 | $\overline{DTACK}$ Input to the microprocessor as a peripheral handshake. |
| 21 | $\overline{VPA}$ An input signal to the microprocessor as a handshake signal from the M6800 family of chips. |
| 19 | $\overline{VMA}$ An output signal from the microprocessor as a handshake signal to the M6800 family of chips. |
| 20 | E Clock Output signal as an interface to M6800 family of chips. |
| 17 | $\overline{HALT}$ The halt and reset signals are pulled "low" and pulled "high" simultaneously. |
| 12 | Not used. |
| 22 | " |
| 13 | " |
| 11 | " |
| 25 | $\overline{IPL0}$ Interrupt request bus for interrupt coming from a peripheral. |
| 24 | $\overline{IPL1}$ Interrupt request bus for interrupt coming from a peripheral. |
| 23 | $\overline{IPL2}$ Interrupt request bus for interrupt coming from a peripheral. |
| 6 | $\overline{AS}$ Address Strobe, output from microprocessor, verifies that a valid address has been outputted by the microprocessor. |
| 7 | $\overline{UDS}$ Upper Data Strobe microprocessor output. |
| 8 | $\overline{LDS}$ Lower Data Strobe microprocessor output. |
| 9 | R/W Read/Write Strobe microprocessor output. |
| 15 | CLK Microprocessor clock input pulse. |
| 28 | $\overline{FC0}$ Function Code outputted by microprocessor which reflects state of processor, including recognition or acknowledgment of an interrupt signal from a peripheral. |
| 27 | $\overline{FC1}$ Same use as FC0. |
| 26 | $\overline{FC2}$ Same use as FC0. |

An abbreviated diagram of the main processor U1 bus cycle is shown in FIG. 26. As shown in FIG. 26, the main microprocessor U1 sets addresses on the address bus. The microprocessor then generates a data strobe, such as $\overline{AS}$, $\overline{LDS}$, or $\overline{UDS}$, as shown in FIG. 26-B. An enable signal is generated by the microprocessor to permit the peripheral to become active, as shown in FIG. 26-D. The enable signal is generated by circuitry external to the microprocessor U1, but in response to data strobe signals and addresses generated by the microprocessor. The strobe signals are usually the $\overline{LDS}$, $\overline{UDS}$ and $\overline{AS}$ signals. Also, an output enable signal as shown in FIG. 26-E is generated by circuitry external to the microprocessor to activate the output of a peripheral. The peripheral responds by providing a $\overline{DTACK}$ signal after receipt of the strobe, as shown in FIG. 26-C. The $\overline{DTACK}$ signal enables the microprocessor to proceed with the bus cycle.

The signal R/$\overline{W}$, as shown in FIG. 26-F is generated by the microprocessor U1 at its pin 9 in order to activate a peripheral to either read or write. If the R/$\overline{W}$ signal is "high" then "read" is true and the peripheral is activated for microprocessor U1 to read from it. If the R/$\overline{W}$ signal is "low" then "write" is true and the peripheral is activated to be written to by microprocessor U1.

As shown in FIG. 26-G, a validated transfer occurs on the data bus sometime after the appropriate strobe signal and the appropriate other control signals reach their "true" value, and after the microprocessor receives a $\overline{DTACK}$ signal. The timing is arranged so that the data transfer occurs after sufficient time has passed for transients to die out.

Control lines provide signals to main processor U1, as shown by the arrowheads pointing toward main processor U1 in FIG. 25-1. Control signals provided by main processor U1 are shown by lines having arrowheads pointing away from the main processor in FIG. 25-1.

FIG. 25-2 shows address decoder U3. Address decoder U3 derives signals from address bus lines A20 . . . A23.

Output of address decoder U3 are OR gated with one of the following signals, $\overline{UDS}$, $\overline{LDS}$, or $\overline{AS}$. The signals are "active low" signals. Circuits such as U6-D, U6-A, U5-D, U5-C, etc. are OR gates. The OR gates provide Boolean AND logic function for active low signals. If both inputs are low, the output will be low. If one input is low and one input is high, the output will be high. If both inputs are high the output will be high. Thus, a generation of an output active low output signal only occurs when both input signals are low, and therefore the OR gate provides a Boolean AND function for the "active low" signals.

As shown in FIG. 25-3, the signals ROMSEL, RAMSEL, and DPORTSEL are taken directly from outputs Y0, Y1, Y2 of address decoder U3. Signals produced by OR with the upper data strobe signal $\overline{UDS}$ and the outputs of Y0, Y1, Y2 include $\overline{ROMENH}$, $\overline{RAMENH}$. Signals produced by a logic OR of the lower data strobe signal $\overline{LDS}$ and the outputs of Y0, Y1, Y2 include the signals $\overline{ROMENL}$, $\overline{RAMENL}$, and $\overline{DPORTDS}$. Other signals produced by a logical OR between the signal $\overline{LDS}$ and another output of handshake strobe generator U3 include the signals $\overline{EEPROMENL}$, $\overline{DPORTWE}$. Signal $\overline{DISPENL}$ is produced by a logical OR between signals VMA from microprocessor U1 pin 19 and output Y12 of handshake generator U3. Signals produced by a logical OR between address strobe signal AS and output of and shake strobe generator U3 include the signals $\overline{DPORTEN}$, $\overline{TIMENL}$, $\overline{DUARTIEN}$. Signals produced by a logical OR between R/$\overline{W}$ and previously generated signals include; $\overline{RAMOEH}$, $\overline{RAMOEL}$, and $\overline{EEPROMEL}$, $\overline{DPORTOE}$. All of the aforementioned signals are "active low" signals.

The signals ROMSEL, RAMSEL, and DPORTSEL connect to multiplexer U13 FIG. 25-3. Multiplexer U13 generates data transfer acknowledge signals for the main processor U1 for the electrically erasable programmable only memory, EEPROM, the RAM, and the dual port RAM. Multiplexer U13 includes a timer which allows time for the peripheral to settle before generation of the $\overline{DTACK}$ signal.

Functionally, signals ROMSEL, RAMSEL, DPORTSEL connect to data transfer acknowledge generation chip U13. U13 generates the $\overline{DTACK}$ signal as the handshake acknowledge signal input to the microprocessor.

Signal $\overline{ROMENH}$ strobes the high BYTE of EPROM chip U45 shown in FIG. 25-7.

Signal $\overline{RAMENH}$ strobes high BYTE of RAM chip U46 as shown in FIG. 25-7.

Signal $\overline{ROMENL}$ strobes lower ROM BYTE chip U48, and EEPROM chip shown in FIG. 25-7.

Signal $\overline{RAMENL}$ strobes lower BYTE RAM chip U49 as shown in FIG. 25-7.

Signal $\overline{DPORTDES}$ is a dual port RAM data strobe, and connects to gate U21-A at FIG. 25-3, and provides input to the data transfer acknowledge generation chip U13.

Signal $\overline{EEPROMENL}$ strobes the EEPROM chip U47 shown in FIG. 25-7, and also enables generation of a $\overline{DTACK}$ signal at chip U20-A shown in FIG. 25-3.

Signal $\overline{DPORTWE}$ is the dual port read/write enable signal and strobes both dual port RAM chip U51 and chip U52 at their pins 2 as shown in FIG. 25-8.

Signal $\overline{DISPENL}$ enables the display, and strobes the display control chip U30 at its pin 23 as shown in FIG. 25-4.

Signal $\overline{DPORTEN}$ is the dual port RAM enable strobe and strobes both upper dual port RAM chip U51 and lower dual port RAM chip U52 at their pin 1 as shown in FIG. 25-8.

Signal $\overline{TIMENL}$ strobes a timer resident in the keypad control chip U34 as shown in FIG. 25-5.

Signal $\overline{DUARTIEN}$ is the enable signal for the dual universal asynchronous receiver transmitter chip U38 at its pin 35 as shown in FIG. 25-6.

Signal $\overline{RAMOEH}$ enables RAM high BYTE chip U46 for the microprocessor to read or write.

Signal $\overline{RAMOEL}$ enables the low BYTE RAM chip U49 for the microprocessor to read or write to it as shown in FIG. 25-7.

Signal $\overline{EEPROMOEL}$ enables EEPROM chip U47 at its pin 20 for the microprocessor to read or write to it as shown in FIG. 25-7.

Signal $\overline{DPORTOE}$ enables dual port RAM chips U51, U52 for the microprocessor to read or write to them as shown in FIG. 25-8. Clock pulses are developed by chip U12-B and chip U12-A from an input of signal SYSCLK. Signal SYSCLK is generated by crystal Y1 and is provided to main processor U1 at its input terminal 15.

Signals produced by chips U12B, U12A include MFPCLK, a 4 megahertz signal connected to U34 at its pin 35 as shown in FIG. 25-5; and signal SIUCLK, a 500 kilohertz signal connected to circuit U38-2 as shown in FIG. 25-6; and signal MFPTIMER, a 31.25 kilohertz signal connected to chip U34-17 as shown in FIG. 25-5.

As shown in FIG. 25-3, chip U18 is connected to address bus line A1, A2, A3 and develops output signals $\overline{INTACK5}$ and $\overline{INTACK6}$ as interrupt acknowledge signals for smart peripheral U34, shown in FIG. 25-5. Also, signals FC0, FC1, FC2 from main processor U1 serve as input to gate U17-A, and the output of gate U17-A is AND gated with output of chip U18 to produce the signals $\overline{INTACK5}$ and $\overline{INTACK6}$.

Signal $\overline{VPA}$ is an acknowledge signal from peripheral to the main processor U1 that a data transfer is ready for transfer into the main processor U1 from a 6800 type chip. Signal $\overline{VPA}$ is an input signal to main processor U1 at its pin 21, and signal $\overline{VPA}$ is developed by tristate buffers U15-A, U15-B, after logic processing of output from chip U18, signals FC0, FC1, FC2, and signal $\overline{AS}$, and signal DISPSEL obtained from chip U3 at pin 14 as shown in FIG. 25-2.

The $\overline{HALT}$ and $\overline{RESET}$ signals for main processor U1 at its pins 18 and 17 are generated by inverters U27-A, U27-F. The $\overline{HALT}$ and $\overline{RESET}$ signals simultaneously pull the $\overline{HALT}$ and $\overline{RESET}$ inputs at pins 17, 18 of main processor U1 low. The signals are generated by chip U26 in response to an output signal from chip U29-A at its pin 4. Chip U29-A is controlled by a number of signals including switch S1, a SPDT momentary contact switch controlling the input to gate U7-B, and a watchdog reset signal WATCHDOG RST from chip U36 pin 3 as shown in FIG. 25-5 and as described hereinbelow in the watchdog section.

Output Display

FIG. 25-4 shows chip U30, a versatile interface adapter, which is a parallel to serial converter for controlling the output display. It is used also as a timer for software interrupt for timing service of the keypad switches. The keypad input is checked every 10 milliseconds under control of the timer. Chip U30 receives input from main processor data bus DO . . . D7. Also, chip U30 receives input on main processor address lines A1 . . . A4. A strobe to reset the display is generated through transistor Q1 using output signals from port CA2 pin 39 of chip U33. Also control signals for the display are derived from pins 18, 19 of chip U30. The display controller is chip U31. The vacuum display is a 16 alphanumeric unit indicated as DSP1. A filament power supply for the display unit is provided on pins 1,33 of unit DSP1.

Also shown in FIG. 25-4 is comparator U41-A which serves as a power failure detector. Comparator U41-A has an input of +5 volts and an input of −30 volts. In the event of a power failure, signal $\overline{IPWRFAIL}$ is produced at the output of comparator U41-A, and prevents the main processor U1 from tripping the circuit breaker if the LMU loses power.

FIG. 25-5 shows the smart peripheral U34, which may be a Motorola type MC 68901 multifunction I/O port. A demultiplexer U35, and keypad switches S3, S4 are also shown in FIG. 25-5. Switch S3 is nine keypad switches. Switch S4 is 12 keypad switches. The keypad switches operate through demultiplexer U35. Demultiplexer U35 is controlled by address select lines for reading key switch rows derived from smart peripheral U34 at its output pins 27, 28, 29. Reading columns of switches is controlled by smart peripheral U34 at its input lines I2, I3, I4 at pins 24, 25, 26. The smart peripheral U34 is connected to main processor data bus D0 . . . D7, and also is connected to main processor address bus line A1 . . . A5. The key switch and the set up switch are serviced through output pins 22 and 23 of smart peripheral U34. The watchdog square wave signal WATCHDOG-RST is provided by an oscillator in smart peripheral U34 at its output port TA0 pin 13.

Switch line potentials are defined by pull up resistors RP10 and RP7. Key switch and set up line potentials are defined by pull up resistors RP12-B, RP12-C.

Manual Reset

Switch S1, FIG. 25-3, is a SPDT momentary contact switch that is normally open. Depression of switch S1 by an operator causes the main processor to reset. Switch S1 is useful in testing the LMU.

A reset pulse is generated by input of a pulse to chip U29-A at its pin 1 through AND gate U7-B. Chip U29-A generates an output pulse in response to its input pulse at pin 1, and the output pulse appears at pin 4. The output pulse serves as input to chip U26. In response to its input pulse, chip U26 generates a output pulse at its pin 3. The output pulse at pin 3 of chip U26 is buffered by open collector inverter U27-A which provides a signal $\overline{HALT}$ to main processor U1 at its pin 17 FIG. 25-1. Also, the output of chip U26 at its pin 3 provides input to open collector inverter U27-F which provides a signal $\overline{RESET}$ which resets a variety of peripherals as shown in FIG. 25-3.

In operation, chip U26 resets the main processor by driving its output pin 3 low and holding it low for approximately $\frac{1}{2}$ second. At the expiration of approximately $\frac{1}{2}$ second, the output pin 3 of chip U26 is driven "high", thereby restarting the main processor U1. The main processor does not require a full $\frac{1}{2}$ second of a low halt signal, but by using a $\frac{1}{2}$ second "low" signal the peripherals have time to stabilize in preparation for a high transition on the $\overline{RESET}$ signal. Chip U29-A is a pulse shaping circuit providing an input trigger to chip U26. Chip U26 generates the $\overline{HALT}$ and the $\overline{RESET}$ signals.

Upon the event of a halt signal going low for a sufficiently long time period, and then going high, main processor U1 starts at a known address with a known supervisor set point.

Watchdog

On power up the main processor U1 instructs peripheral U34 to begin generating a square wave output at its port TA0 pin 13. This square wave provides input to inverter U33-B and tristate buffer U36-A. The output of tristate buffer U36-A provides the signal WATCHDOG RST, which is input to chip U9 pin 1 FIG. 25-3. A square wave having a period of approximately 1/6 seconds is produced as signal WATCHDOG RST. After power up, a clock in peripheral U34 continually generates the signal WATCHDOG RST. Even if the main processor dies and ceases operation the square wave signal WATCHDOG RST continues being produced by peripheral U34.

Signal WATCHDOG RST provides input to chip U9-A pin 1. Chip U9-A is a 4 bit counter which counts the incoming pulses at its pin 1. In the event that 8 input pulses at its pin 1 are counted, output of chip U9-A at its pin 6 goes high, and causes a reset of main processor U1.

Signals $\overline{AS}$, G are applied as input to OR circuits U5-A and the output is applied to OR circuit U7-A along with signal $\overline{RESET}$. The output of OR circuit U7-A provides input to pin 2, RST, of chip U9-A. An input pulse at pin 2 causes U9-A to reset its internal counter. When the main processor is operating properly, input pulses will occur at pin 2 of chip U9-A sufficiently often to prevent a count of 8 pulses from signal WATCHDOG RST coming into chip U9-A at its pin 1. In the event that main processor U1 should cease operation, then no reset pulse will be applied to chip U9-A at its pin 2, and a reset pulse will be applied to the main processor after chip U9-A counts 8 WATCHDOG RST pulses.

The signal WATCHDOG RST provides a means for resetting the main processor in the event that it should cease functioning. Thus, the signal WATCHDOG RST provides a recovery means in the event that the main processor should hang up, for example, from a power glitch, or other cause.

In an alternative embodiment, the occurrence of output pulses from chip U9-A pin 6 as a result of counting 8 or more WATCHDOG RST pulses may trigger the transmission of a warning signal from the LMU to the SIU, or in some other way alert an operator that the main processor is misfunctioning.

Interrupt Request Generation

As shown in FIG. 25-3, interrupt request generator U28 accepts input signals from peripherals requesting an interrupt of the main processor U1. Interrupt generator U28 then generates an interrupt signal on the interrupt bus comprising main processor lines $\overline{IPL0}$, $\overline{IPL1}$, $\overline{IPL2}$, at pins 25, 24, 23, respectively of the main processor.

A Motorola type 74HC147 chip has been found satisfactory as the interrupt request generator U28.

The interrupt request bus is a 3 bit bus, and the value of the binary signal on this bus determines the priority of the interrupt request. The priority of the interrupt request is determined by the location on the interrupt request generator input at which the interrupt request occurred. The interrupt request is "active low", and a low signal on any of the U28 chip input lines D2 . . . D3, D5 . . . D7 generates a corresponding signal on the interrupt bus.

A power fail interrupt request has highest priority, and is provided by chip U41 at its pin 2 in FIG. 25-4. Referring to FIG. 25-4, chip U41-A drives its output "low" in the event that the power supply goes low. The signal $\overline{IPWRFAIL}$ goes low, or "true", and causes a highest priority interrupt on the interrupt bus. The power failure interrupt prevents the main processor from tripping the circuit breaker in the event that the LMU looses power.

Signal $\overline{IDUART}$ provides input to the interrupt request generator at its pin 3, and signal $\overline{IDUART}$ comes from DUART U38 pin 21 FIG. 25-6. When signal $\overline{IDUART}$ goes low, or "true", an interrupt request is provided by interrupt request generator U28 on the interrupt bus, causing the main processor to service the DUART U38. The DUART has a number of registers, and the main processor services the DUART by reading and writing these registers. The registers inform the main processor what has happened, including: that an input signal has been received from the trip unit, that an input signal has been received from the optical ring, or that a transmission into the optical ring has been completed. Other functions signaled through the DUART include signals necessary for performing and controlling external tests of the trip unit. A memory map of the main processor and also the registers in the peripherals is given in FIG. 27.

Signal $\overline{IMFP}$ provides input to interrupt request generator U28 at its pin 2. Signal $\overline{IMFP}$ derives from chip U34 at its pin 32 FIG. 25-5. Chip U34 is the keypad decoder, and the interrupt request signal $\overline{IMFP}$ indicates that a key has been depressed, and requests that the main processor service the keypad.

Signal $\overline{IDPORT}$ is input to the interrupt request generator at its pin 13. When signal $\overline{IDPORT}$ goes "low", it signals the interrupt request generator to request the main processor to read the dual port RAM.

Signal $\overline{IVIA}$ is input to interrupt request generator U28 at its pin 12. Signal $\overline{IVIA}$ is produced by chip U30 at its pin 21 as shown in FIG. 25-4. Chip U30 is the vacuum display versatile interface adaptor. Signal $\overline{IVIA}$ is necessary for operation of the vacuum display by the main processor.

Handshake $\overline{\text{DTACK}}$ Signal

The $\overline{\text{DTACK}}$ signal is generated by a number of peripheral devices to indicate that it is ready to either provide data on the data bus or receive data from the data bus. Also, the $\overline{\text{DTACK}}$ signal may be generated external to the peripheral when the generator delays generation of $\overline{\text{DTACK}}$ by using a timer long enough for the peripheral to respond. The $\overline{\text{DTACK}}$ signal connects to microprocessor U1 at its pin 10, FIG. 25-1.

Dual Port RAM $\overline{\text{IDPORT}}$ Signal

The co-processor writes information into the dual port RAM once each AC cycle. A semaphore works by the co-processor setting a signal indicating that "yes, the data is good and valid". The main processor then completes a read of the information stored in the dual port RAM, and clears the semaphore. The next time that the co-processor begins to write in the dual port RAM, the co-processor checks the semaphore, and if it has not been cleared by the main processor, the co-processor signals an error to the main processor. The semaphore signals operate as messages stored in RAM and as parameters in software.

The $\overline{\text{IDPORT}}$ signal is generated by the co-processor simply writing to a specific address in the dual port RAM. The interrupt is cleared by the main processor reading that cell in the dual port RAM. By reading that cell in the dual port RAM, the main processor clears the interrupt so that the dual port RAM is ready for the next Phase A AC cycle.

LMU Communications

FIG. 25-6 shows the LMU serial communications circuits. Chip U38 is a dual universal asynchronous receiver transmitter, DUART. DUART chip U38 connects to the main processor U1 data bus D0 . . . D7, and connects to the main processor address bus lines A1 . . . A4. A crystal clock is controlled by crystal Y2, and may, for example, generate a signal of 3.6864 megahertz. Also, DUART chip U38 is controlled by a number of signals including R/$\overline{\text{W}}$, $\overline{\text{IRQ}}$, IACK, $\overline{\text{CS}}$, $\overline{\text{RESET}}$, and SIVCLK. Chip U38 generates a $\overline{\text{DTACK}}$ signal at its pin 9.

Communications on the fiber optic ring between the LMU and an SIU is controlled through chip U38 output pins 29, 30, 31. Photo diode J901 receives the input optical signals from the optical fiber. The voltage generated across photo diode J16 is amplified by op-amp U901-B. A second stage of amplification is provided by op-amp U901-A. An adaptive threshold circuit is provided by op-amp U901-C. Comparator U902-A and the adaptive threshold circuit provide a data detection function.

Buffer amp U903-C operates as a data pass switch. When input pin 10 is "low" then buffer amp U903-C provides an output that reproduces its input. When pin 10 of buffer amp U903-C is "high", then buffer amp U903-C acts as a high impedance at its output pin 8, and prevents the input signal at input pin 9 from appearing at output pin 8.

An input signal is applied to inverter U904-A at its input pin 1 by either the output of buffer amp U903-C pin 8 when buffer amp U903-C is enabled with a "low" at pin 10, or alternatively the input to inverter U904-A is provided by output pin 30 of DUART chip U38. Pin 30 of DUART chip U38 connects to input pin 12 of buffer amp U903-D, and signals pass from output pin 11 of buffer amp U903-D to input pin 1 of inverter U904-A. The output of inverter U904-A drives the gate of transistor Q902. Transistor Q902 drives light emitting diode, LED, at jack J902. LED at jack J902 is a light source providing optical signals in the output optical fiber cable. Transistor Q901 provides current limiting for output transistor Q902.

A "transmit" or "receive" control signal is provided on output pin 29 by DUART chip U38. Pin 29 then can go either "high" or "low". When pin 29 is "high" it blocks an outgoing signal through buffer amp U903-D. The "high" value also is input to inverting inverter U904-B, and provides a "low" signal at pin 10 of buffer amp U903-C, thereby enabling buffer amp U903-C to pass an incoming signal on its pin 9 through to LED driver transistor Q902. In the event that DUART chip U38 pin 29 goes "low", the "low" signal enables buffer amp U903-D and therefore permits an output signal on chip U38 pin 30 to pass through to LED driver transistor Q902 and simultaneously inverter U904-B inverts the logic signal thereby applying a "high" to pin 10 of buffer amp U903-C and blocking any input signal at pin 9 of buffer amp U903-C from appearing at output pin 8 of buffer amp U903-C.

Pin 31 of DUART chip U38 provides an input for the LMU from the optical ring.

In operation, pin 29 of DUART chip U38 is normally "high" so as to block an output pulse from the DUART, and enables an input signal coming from the optical ring to pass through buffer amp U903-C. The input signal is provided to main processor U1 through input port pin 31 of DUART chip U38. In the event that main processor U38 decides to transmit a message into the optical ring for receipt by the SIU, then first the control line at pin 29 of DUART chip U38 is driven "low" to enable buffer amp U903-D, and to inhibit buffer amp U903-C. After the outgoing message is transmitted by the main processor U1, then the control line at pin 29 of DUART U38 returns to its normal "high" level.

A test sequence for the circuit breaker Trip Unit TU can be initiated by DUART U38 at its output ports OP1, OP2, OP3, OP4, OP5, and OP6. Transistor Q4 may be driven into conduction by a signal on output port OP6 at pin 26 of chip U38. Transistor Q4 drives relay K1.

Output port OP5 may drive transistor Q5 into conduction. Transistor Q5 controls relay K2. When relay K2 is energized, then a +24 volt supply is connected to variable resistor R70 which is a front panel knob on the LMU front panel. Variable resistor R70 may be adjusted to supply a variable test voltage VTST to the trip unit. A 24 volt supply for supplying electrical power to the Trip Unit is provided on jack J5 at pin 5 as +24 V EXT.

Output ports OP1, OP2, OP3 provide a 3 bit control bus to control the Trip Unit in test mode. Optoisolators U42, U43, U44 provide electrical isolation between the LMU and the Trip Unit.

Output port OP4 provides an external trip for the Trip Unit. If OP4 goes "low" then the Trip Unit trips and opens the circuit breaker.

Input port RXDB at pin 10 of chip U38 provides input to main processor U1 for the serial data stream transmitted by the Trip Unit. The serial data stream passes through an optoisolator in the Trip Unit. That optoisolator is powered by the LMU using transistor Q19 and op-amp U85-A as a voltage regulator. The power for the Trip Unit's optoisolator is provided as signal RMVCC and appears at pin 15 of jack J5. The input signal TDO from the optoisolator in the Trip Unit enters the LMU at pin 8 of jack J5, and provides input to buffer op-amp U40-B. The output of op-amp U40-B is connected to pin 10 of DUART chip U38. DUART chip U38 then provides input to main processor U1 of the serial data stream transmitted by the Trip Unit.

RAM and EEPROM

FIG. 25-7 shows EPROM U45, U48. Each EPROM is a 256k bit device, and therefore holds 32k BYTES. EPROM U48 connects to main processor data bus lines D0 . . . D7, and EPROM U45 connects to main processor data bus lines D8 . . . D15. Both EPROM chips U45, U48 connect to main processor address bus lines A1 . . . A15. EPROM chip U45 provides a high BYTE and connects at pin 22 to signal $\overline{ROMENH}$ from chip U6 pin 11 FIG. 25-2. EPROM chip U48 provides a low BYTE and connects at pin 22 to signal $\overline{ROMENL}$ from chip U5-11 FIG. 25-2.

As shown in FIG. 25-7, chips U46, U49 are both scratch pad RAM for main processor U1. RAM chip U49 connects to main processor data bus lines D0 . . . D7. RAM chip U46 connects to main processor data bus lines D8 . . . D15. Both RAM chips U46, U49 connect to main processor address bus lines A1 . . . A11.

Both RAM chips U46, U49 receive read write signal R/$\overline{W}$ at each chip's pin 21. RAM chip U49 provides a low BYTE and is controlled by signals $\overline{RAMENL}$ derived from chip U5 pin 8 FIG. 25-2, and signal RAMOEL derives from chip U16 pin 3 FIG. 25-2. RAM chip U46 provides a high BYTE and is controlled by signal $\overline{RAMENH}$ derived from chip U6 pin 3 FIG. 25-2 and signal $\overline{RAMENH}$ derived from chip U8 pin 8 FIG. 25-2.

Chip U47 is an electrically erasable programmable read only memory, EEPROM. EEPROM chip U47 connects to main processor data bus lines D0 . . . D7, and connects to main processor address lines A1 . . . A11. EEPROM chip U47 is controlled by signals including read/write signal R/$\overline{W}$, $\overline{EEPROMOEL}$ signal derived from chip U16 pin 6 shown in FIG. 25-2, and signal $\overline{EEPROMENL}$ derived from chip U16 pin 11 FIG. 25-2.

Chip U50 is a real time clock. The real time clock connects to main processor data bus lines D0 . . . D7 and main processor address line A1 . . . A13. Jumper 1 controls whether the real time clock is reset by the signal $\overline{RESET}$ as shown in Table 1, also in FIG. 25-7. The clock enable signals $\overline{WATCHCE}$ and $\overline{WATCHOE}$ derive from chip U19 and chip U8 shown in FIG. 25-3, and serve as inputs to the real time clock U50. The clock enable signal $\overline{WATCHWE}$ derives from chip U59 pin 8 shown in FIG. 25-3 is input to real time clock chip U50, under the control of jumper JMP2. Jumper connections are shown in table 2, also shown in FIG. 25-7.

Dual Port RAM—Main Processor Side

FIG. 25-8 shows the dual port memory chip U51, U52. The left side of the dual port memory connects to the main processor U1.

Dual port RAM chip U51 connects to main processor data bus lines D0 . . . D7, and connects to main processor address bus lines A1 . . . A10. Dual port memory chip U52 connects to main processor data bus lines D8 . . . D15, and connects to main processor address bus line A1 . . . A10. The main processor data bus lines connect to their respective chips U51, U52 at ports D0L . . . D7L. The dual port memory chips U51, U52 connect to the main processor address bus lines at their port A0L . . . A9L. The dual port read and write functions are controlled by the signal $\overline{DPORTEN}$ derived from chip U4 pin 3 FIG. 25-2, a read/write signal $\overline{DTORTWE}$ derived from chip U16 pin 8 FIG. 25-2, BUSYL derives from chip U13 pin 17 FIG. 25-3, and read signal $\overline{DPORTOE}$ derives from chip U8 pin 3 FIG. 25-2.

Dual port memory chip U51 port INTL pin 4 provides the $\overline{IDPORT}$ signal. The corresponding port on dual port memory chip U52 is simply tied to +5 volts. Signal $\overline{IDPORT}$ provides an input to interrupt request chip U28 shown in FIG. 25-3. Interrupt request generation chip U28 provides output signals for input to the main processor U1 interrupt bus lines $\overline{IPEL0}$, $\overline{IPEL1}$, $\overline{IPEL2}$ on pins 25, 24, 23 of main processor U1.

U56 signal $\overline{IDPORT}$ signals the main processor U1 that the co-processor has loaded the dual port RAM chips U51, U52, which the co-processor U56 does at the conclusion of each Phase A AC cycle. In operation, the co-processor retrieves phase voltage and current information from the A to D converter 32 times per Phase A AC cycle. The co-processor computes running sums of a square current for that cycle, and a square voltage for that cycle, and the voltage times the current for that cycle for each of the phases. At the end of an AC cycle the results of these calculations for the 32 samples are then loaded into the dual port memory. Also, when the co-processor loads results into the dual port memory, it sets a ready semaphore by writing into the dual port RAM by writing it into a cell in the dual port memory. Also the co-processor writes that signal which generates an interrupt to the main processor. The interrupt signal is the $\overline{IDPORT}$ signal at pin 4 of U51. The $\overline{IDPORT}$ signal then goes as input to interrupt request generator U28 pin 13 FIG. 25-3. Interrupt request generator U28 then provides an interrupt request to the main processor U1.

LMU MENU CODE

Figure 28:
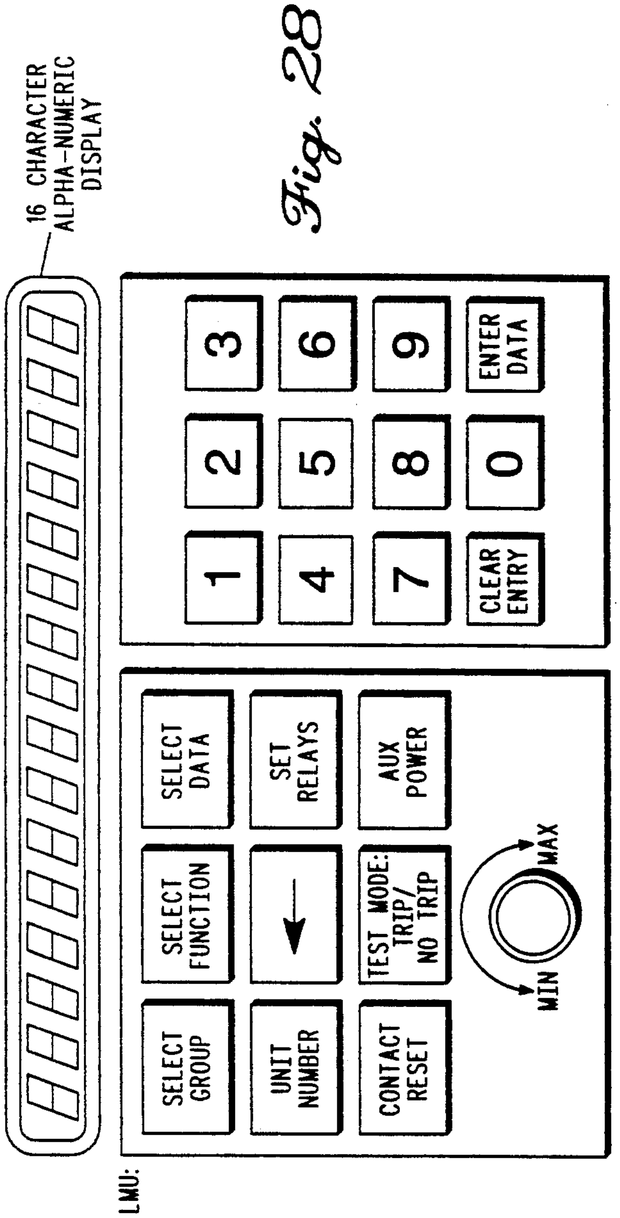
FIG. 28 is a drawing of a Local Management Unit control panel and display panel.
Figures 3B, 15:
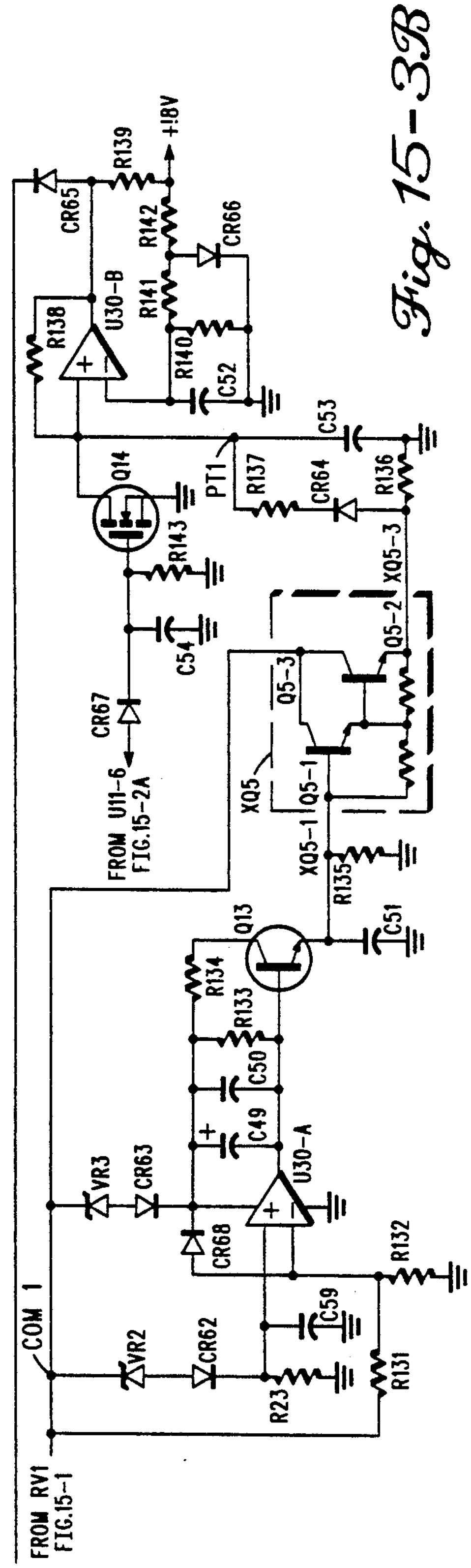
Figures 4A, 15:
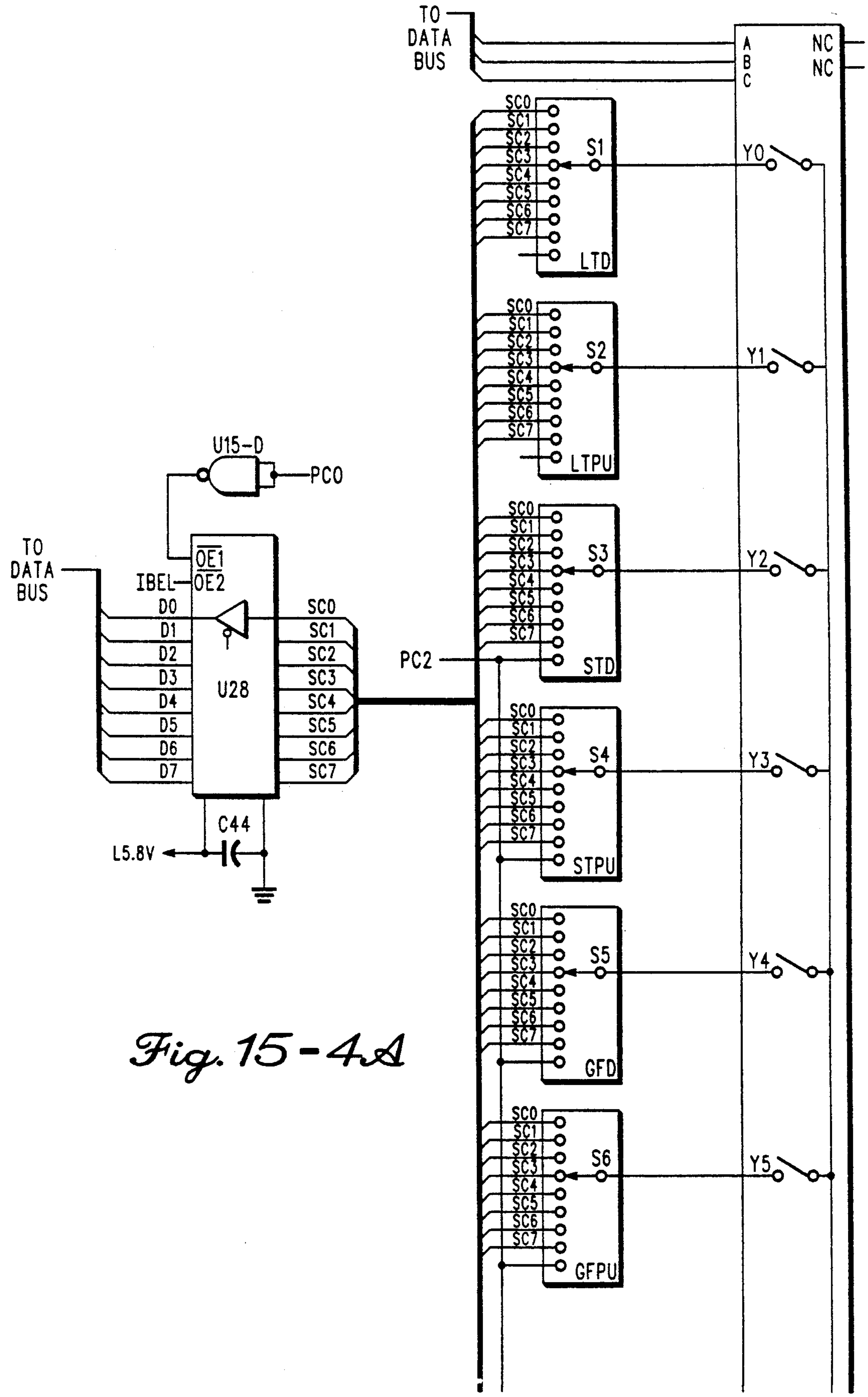
Figure 18A:
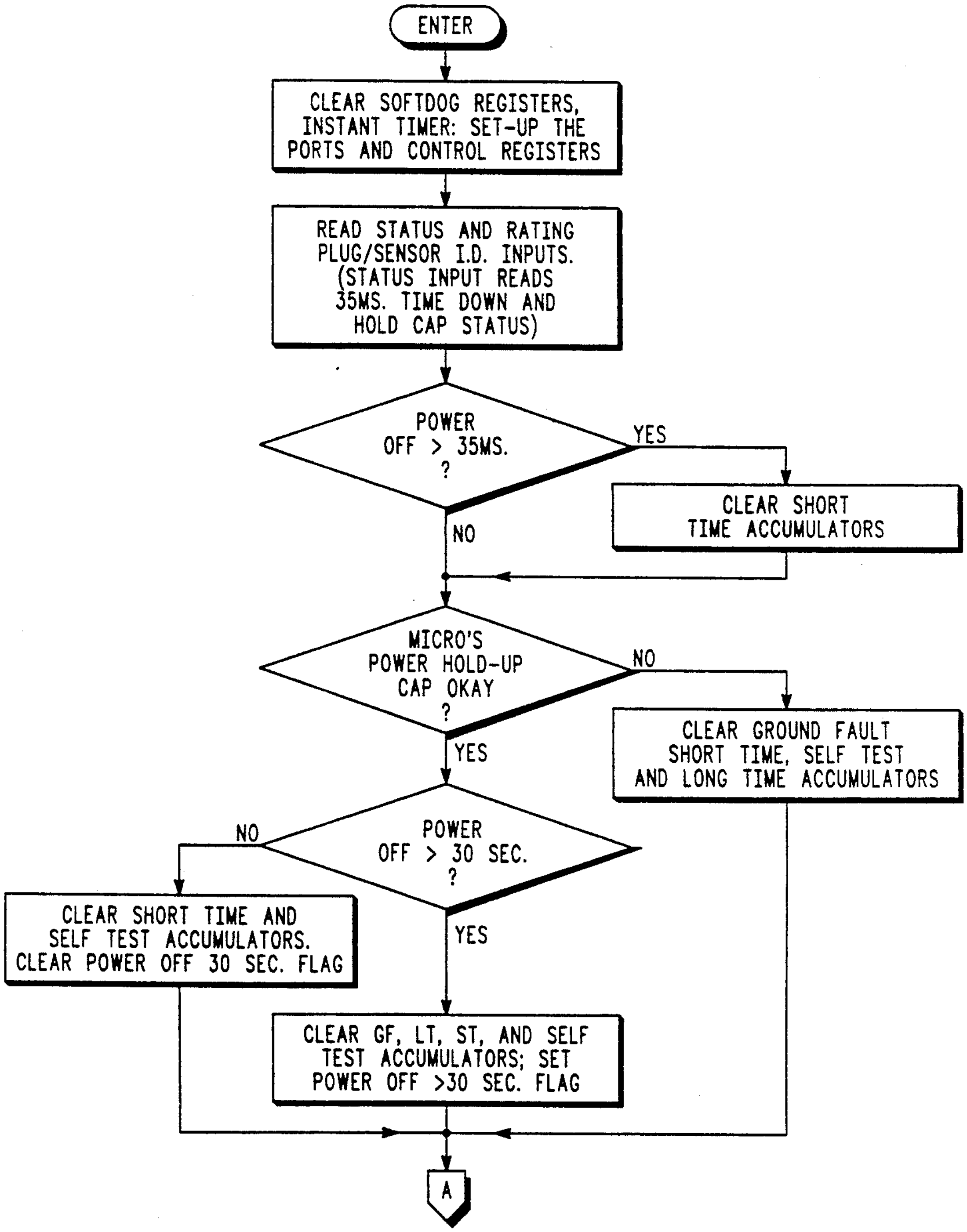
FIG. 18A is part of a flow chart for Trip Unit software.
Figure 18B:
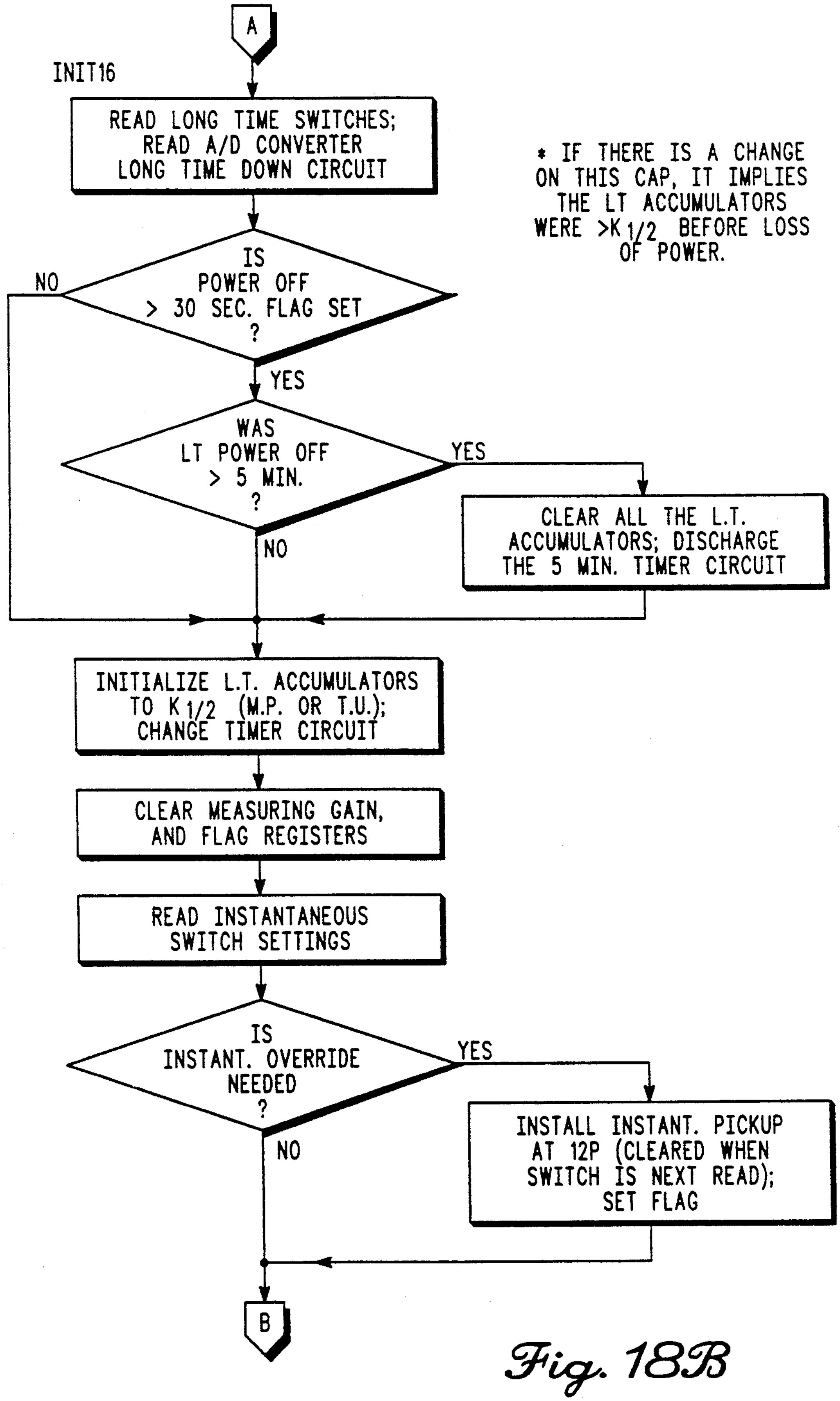
FIG. 18B is part of a flow chart for a Trip Unit software.
Figure 18C:
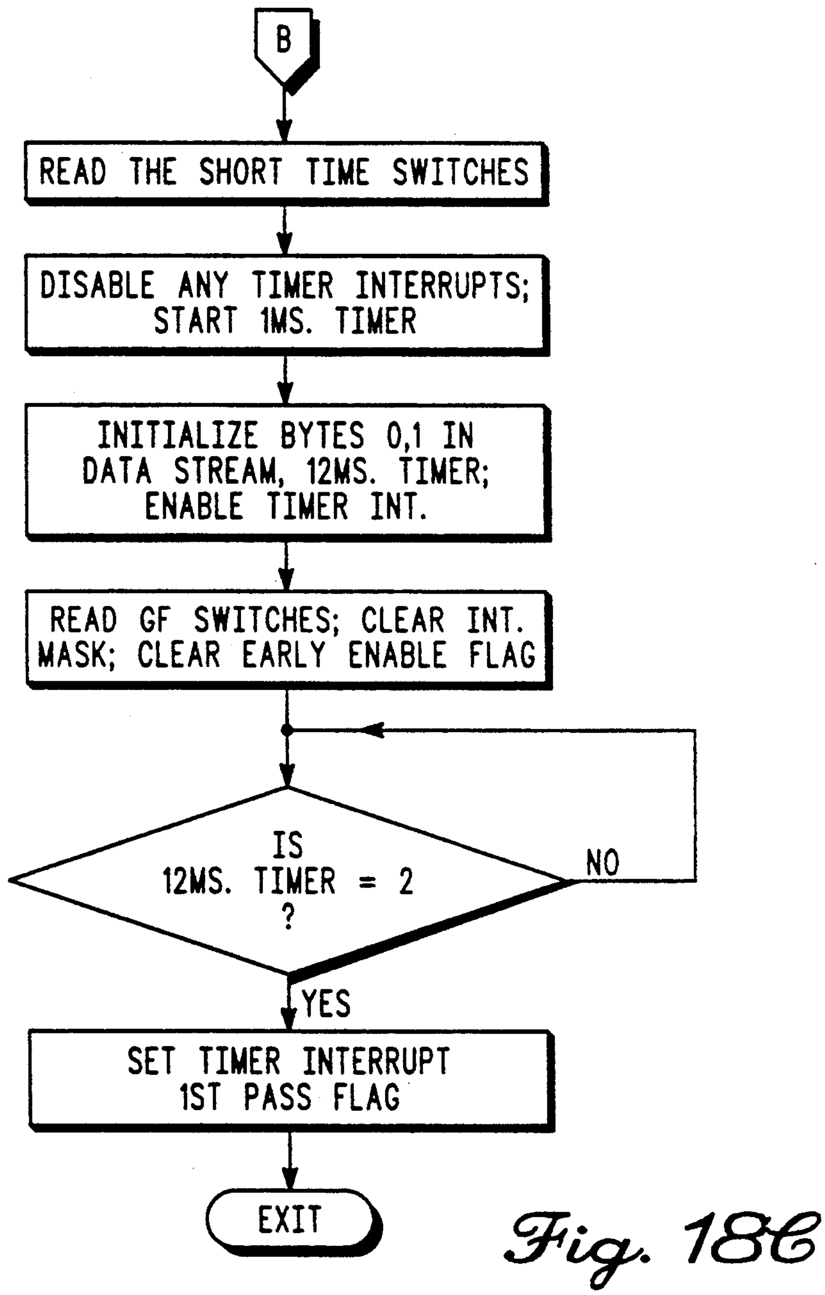
FIG. 18C is part of a flow chart for Trip Unit software.

FIG. 28 shows the LMU push button switches, and a 16 character alphanumeric readout. A first panel has a 9 switch keypad for selecting functions, and also a continuously adjustable potentiometer for applying a test voltage to the Trip Unit associated with the LMUs. A second keypad contains 12 or alternatively 16 push button switches containing the numerals 0 . . . 9, a "clear entry" and "data" push buttons.

FIG. 29 through FIG. 32 give the data read out of the LMU 16 character display. The various items available to the display are selected by pressing a proper combination of the control push buttons. The control push buttons step through a menu, and the menus are shown in FIG. 29 through FIG. 32.

Figure 30:
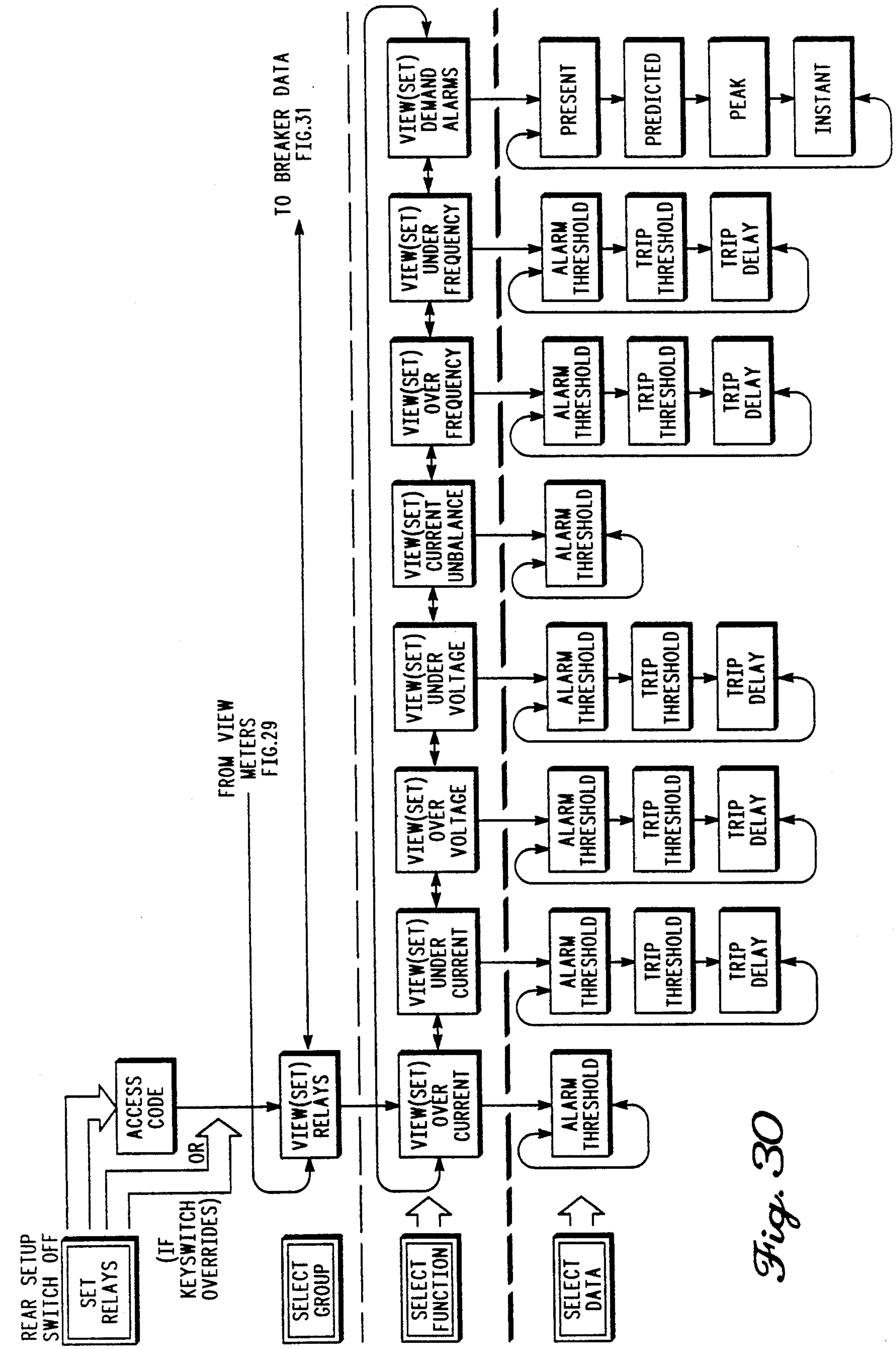
FIG. 30 is a diagram of a menu for an LMU, sheet 2 of 4.
Figure 31:
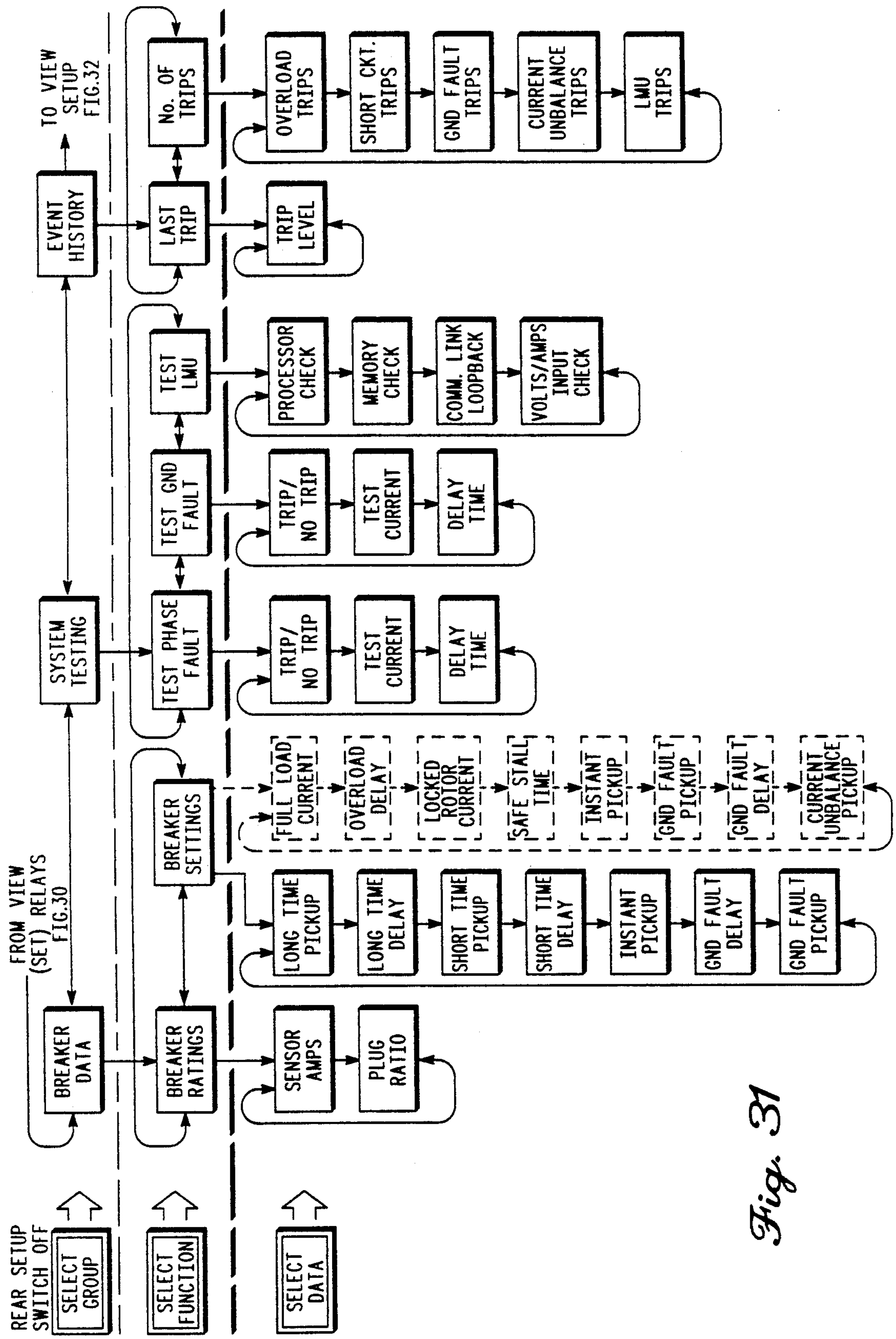
FIG. 31 is a diagram of a menu for an LMU, sheet 3 of 4.
Figure 32:
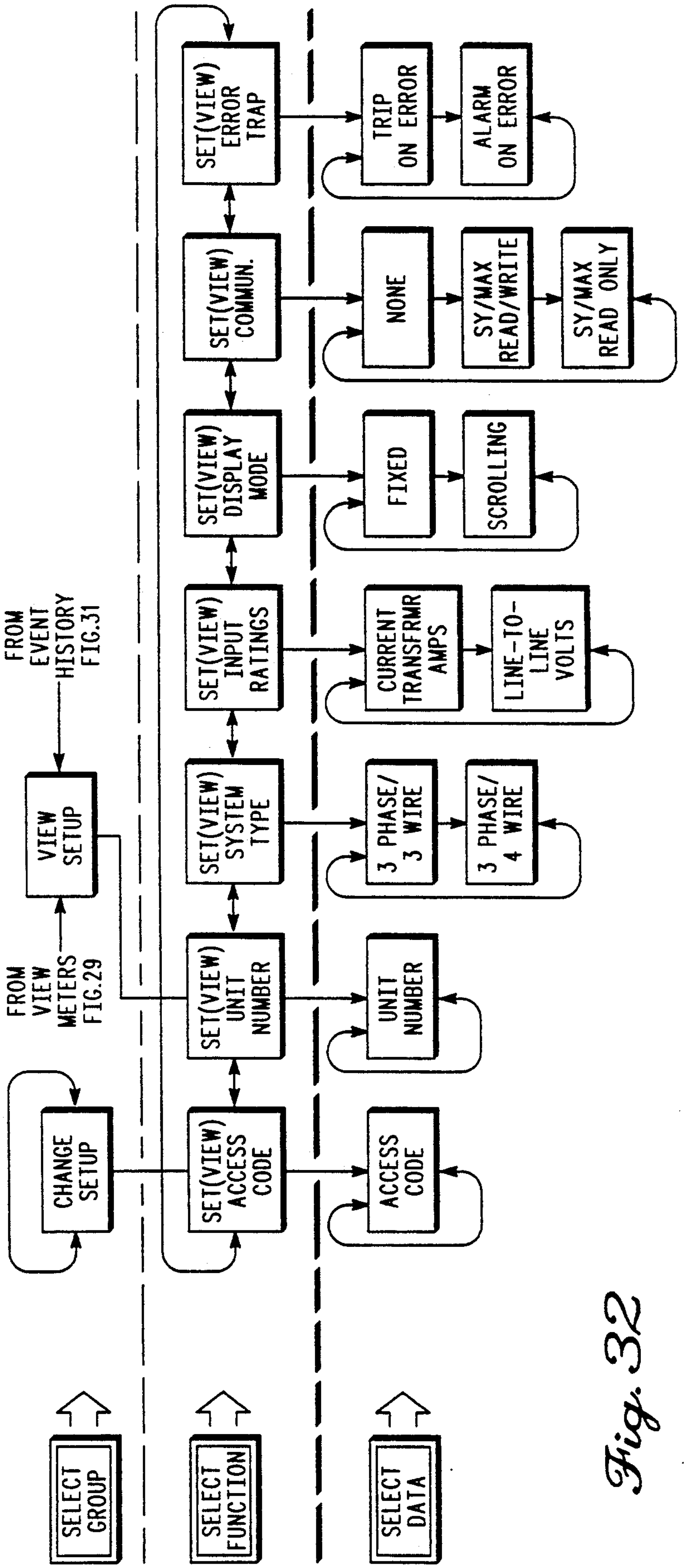
FIG. 32 is a diagram of a menu for an LMU, sheet 4 of 4.

The "select group" provides large scale selection of functions. The "select group" button has, for example, the following functions as exhibited in the accompanying figures, "meters" shown in FIG. 29; "view (or set) relays" as shown in FIG. 30; "view circuit breaker data" as shown in FIG. 31; "view system testing" as shown in FIG. 31; "view event history" as shown in FIG. 31; "change or view the setup" as shown in FIG. 32, and changing the set-up is accomplished in combination with turning "on" a rear "set up" switch.

Figure 33:
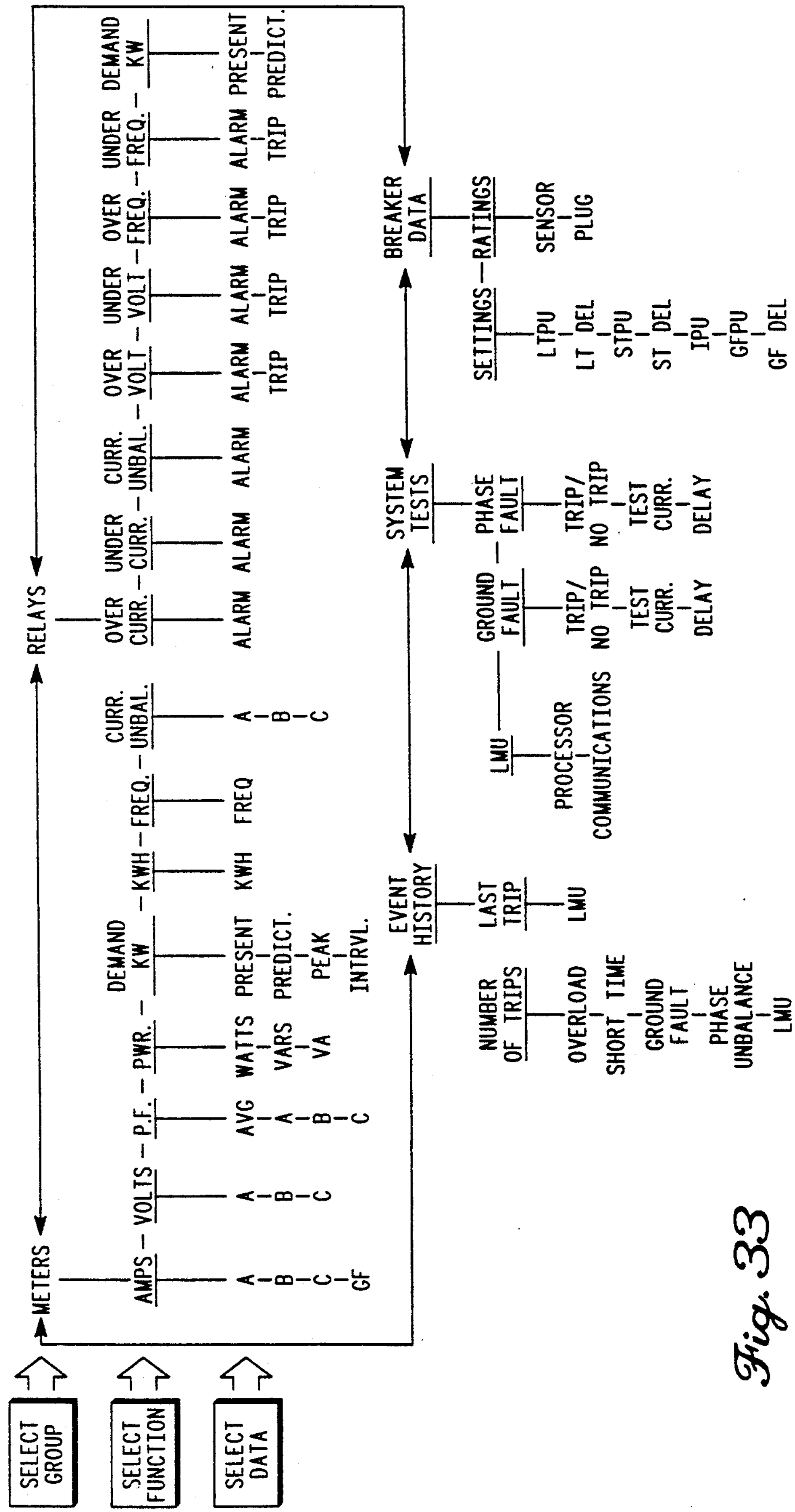
FIG. 33 is a diagram of an option tree for an LMU display.

An LMU display option tree is shown in FIG. 33. The LMU display option tree summarizes the operation of the various control buttons. Referring to FIG. 33, pressing the "select group" button once takes it to the "meters" option, pressing the select group button again takes it to the "relays" option, pressing the select group button again takes it to the "breaker data" option, pressing the select group button again takes it to the "system tests" option, pressing the select group button again takes it to the "event history" options, and pressing the select group button again takes it back to the "meters" option. Referring to FIG. 28, the left arrow button permits the group selected by the "select group" button to go in reverse order, as shown by the double ended arrows connecting the various options in FIG. 33.

Setting the "select group" button to the "meters" option, permits the "select function" button to select quantities to be read in the display. At the amps option, the select data button can be pressed to permit the operator to view current flow in either Phase A, Phase B, Phase C, or ground fault, as shown in both FIG. 27 and FIG. 33. Pressing the select function button once again permits volts to be displayed, and the "select data" button permits the voltage on Phase A, Phase B, or Phase C to be displayed. Pressing the select function button again to the power factor option permits the select data button to select display of either average power factor, Phase A, Phase B, or Phase C power factor, as shown in both FIG. 29 and FIG. 33.

Selecting the "PWR" option using the "select function" button permits the "select data" button to permit viewing average power, reactive power, or Volt Amperes, VA.

Setting the "select function" button to "demand" permits display of the present kilowatt hours demand, a predicted value entered into memory and available for viewing, and the peak value that has been observed.

Using the "select function" button to select the "KWH" option permits viewing total energy in kilowatt hours. Also, the frequency of the Phase A AC line cycle and the current unbalance in Phase A, Phase B, Phase C are viewable by selection using the "select function" button and the "select data" button.

Setting the select group button to "view (or set) relays" permits viewing of various alarm thresholds by a proper combination of pressing the select function and select data buttons. As shown in FIG. 30 and FIG. 33, the over-current alarm threshold may be viewed, and an alarm threshold, a trip threshold, and a trip delay time may be observed for settings for undercurrent, over-voltage, under-voltage, current unbalance, over-frequency, under-frequency, and demand alarms.

As shown in FIG. 31 and FIG. 33, the breaker data option on the "select group" button permits viewing circuit breaker data. The circuit breaker data is transmitted to the LMU through the Trip Unit serial communications link one BYTE each 12 milliseconds. The "select function" button permits selection for viewing circuit breaker ratings or breaker settings, where the settings are for either a circuit breaker or motor protector option. The breaker ratings option permits viewing of the sensor current ampere rating and the plug ratio P. The breaker settings option, selected by the "select function" button, permits viewing of the following in the circuit breaker option mode, long time pickup, long time delay, short time pickup, short time delay, instantaneous pickup, ground fault delay, and ground fault pickup. In the motor protection version the following may be viewed, full load current, overload delay, locked rotor current, safe stall time, instantaneous pickup, ground fault pickup, ground fault delay, and current unbalance pickup.

A "system test" option may be selected by the "select group" button as shown in FIG. 31 and FIG. 33. The system test option permits testing the circuit breaker Trip Unit by entering commands from the LMU push button panel. The "select function" button permits selecting one of the options "test phase fault", "test ground fault", or "test LMU". The "select data" push button, for both the phase fault and ground fault options permit testing "trip" or "no trip", applying a test current, and applying a delay time. The "test LMU" option permits checking the processor, the memory, the communication link loop back, and the volts or amps input to the analog to digital converter check.

The "event history" option selected by the "select group" push button, as shown in FIG. 30 and FIG. 33, permits readout of the event history data gathered by the circuit breaker Trip Unit. The level of the last trip may be viewed, or the number of trips since the last reset may be viewed for overload, short circuit, ground fault, current unbalance, or LMU trips.

A rear control switch on the LMU permits changing from a "view" mode to a "change set up" mode. FIG. 32 shows the selection tree for the "select group" push button in the event that the set up switch is in the "on" position. By use of the "select function" push button, it is possible to either set or view an access code, the LMU unit number, a system type indicator, an input current rating, a display mode parameter, communications parameters, and error trap responses. The "select data" push button permits viewing or setting various options as shown in FIG. 32.

The LMU may serve as a circuit breaker or motor protector by tripping its associated circuit breaker. Functions available to the LMU are shown in FIG. 31.

Figure 34:
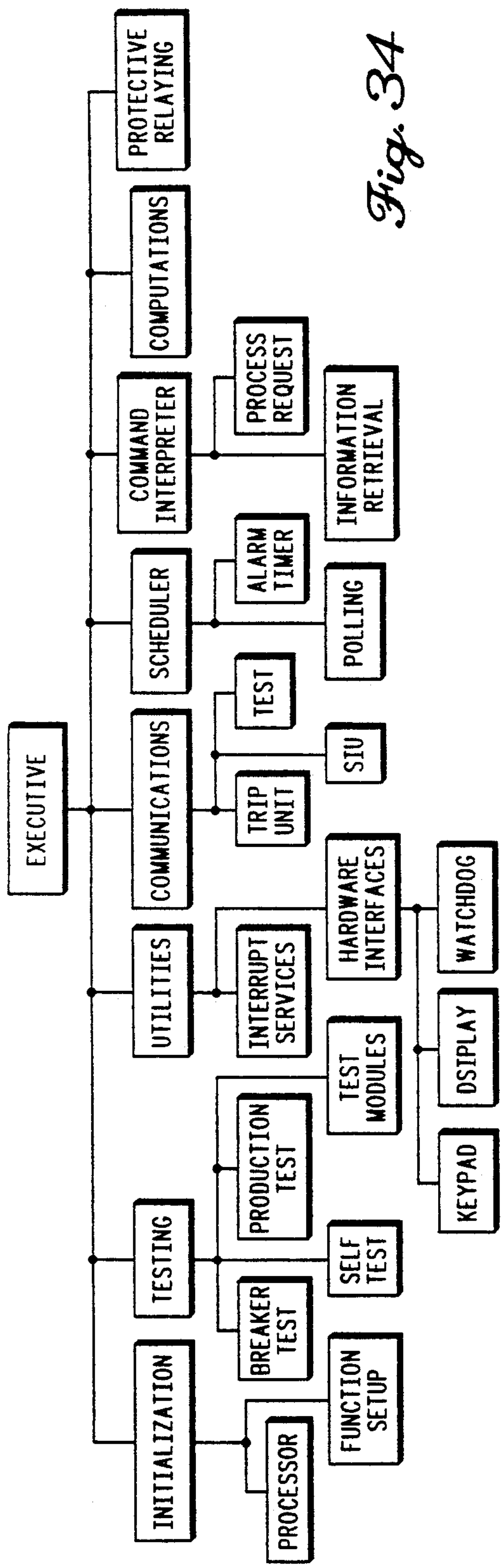
FIG. 34 is a block diagram of software for an LMU.

Software for controlling the LMU push buttons and the LMU display unit run in the main processor. FIG. 34 is a block diagram of the main processor software. An executive routine monitors operation of the main processor. The executive routine responds to interrupts from the co-processor signaled by updating the communications cell in the dual port RAM. The executive routine transfers data from the dual port RAM into the main processor RAM--dynamic data memory. Calculation of RMS current, voltage, power, reactive power, and other quantities is performed by the main processor. Also, the power factor and other scientific calculations are performed by the main processor.

The computation block calculates the information requested at the keypad and Display Unit. The command interpreter interprets the keypad commands and requests data calculated by the computations block, and then displayed.

The protective relaying block sets limits and compares the limits with computed values in order to provide an alarm signal. Any of the quantities measured by the LMU or transmitted by the Trip Unit (TU) to the LMU may be compared with limits by the "protective relay" block.

The "communications" block interprets incoming data from the Trip Unit on the Trip Unit serial communications link. Also, the communications block interprets the incoming BYTES from the Trip Unit, as the BYTES are described hereinabove under the Trip Unit communications section. Also, the communications block handles communications with the System Interface Unit (SIU). The SIU communications will be described in greater detail hereinbelow. A test function for the communications block permits testing for the various communications functions.

The utilities block includes interrupt service routines and hardware interfaces. Hardware interfaces are provided for the keypad, the display, and the watchdog.

In an alternative embodiment, the LMU watchdog may be similar to the Trip Unit watchdog, as described hereinabove. The LMU main processor then must discharge a capacitor at a regularly established cyclical time on the order of a few milliseconds in order to prevent the capacitor from charging above a set point voltage. In the event that the capacitor charges above the set point voltage, the LMU does a complete hardware and software initialization. The capacitor charges as a result of the failure of the watchdog circuit to discharge it, and thus a high voltage on the capacitor is indicative of failure of the main processor.

The testing block permits testing of the Trip Unit, testing the LMU through the self test, production testing, and testing of test modules.

The scheduler block permits polling of devices such as the keypad and Display Unit, and also generates alarms and timing cycles.

The initialization block provides standard functions to the main processor.

A Texas Instruments TMS32010 type processor has been found satisfactory for the co-processor. The device contains a hardware multiplier that performs a $16\times16$ bit multiplication with a 32 bit result in a single 285 nanosecond cycle. This speed is sufficient to permit sampling voltage and current waveshapes of each phase of the 60 cycle AC line frequency 32 times per cycle.

It has been satisfactory to use a Motorola type MC68000 processor for the main processor. A Motorola type MC68901 multifunction peripheral has been found useful to use in conjunction with the main processor. The multifunction peripheral provides both vectored and polled interrupt schemes, including its 16 interrupt sources. Additionally, handshake lines facilitate interfacing.

The dual port memory satisfactorily utilizes an Integrated Devices Technologies unit Nos. 7130 and 7140.

LMU COMMUNICATIONS TO SIU

The optical ring loop is a data communications bus. The System Interface Unit, SIU serves as a bus master. The LMU units serve as bus slaves. The SIU transmits a message to a selected LMU on the optical ring. There may be up to 64 different LMU units on the optical ring. The designated LMU responds to the message. Upon receipt of the message, the SIU acknowledges receipt to the LMU.

Types of messages transmitted by the LMU include:

A polling message to determine which LMU units are on the optical ring bus.

A second type of message from the SIU to a selected LMU is a request for information. The request contains the number of a register. The LMU contains 51 data registers. Upon receipt of a request for information contained in a particular register, the LMU transmits the contents of that register to the SIU. The SIU then acknowledges receipt of the message.

A third type of message transmitted by the SIU to a selected LMU is a write message. The LMU transmits a register number and the "new" contents of that register. The LMU receives the "new" register contents and writes them into the appropriate register.

The register structure is that each of the LMU units contains 51 data registers, registers 0-50. There are up to 64 independent LMU units. The SIU memory has a map of each of the registers of each of the LMU units. Thus the SIU has a map of $51\times64=3{,}264$ registers. There is a one-to-one correspondence between the register numbers and the contents of that register in an LMU and the mapping of that set of registers in the SIU. Thus, a register can be accessed either on the bus or in the SIU memory, and the addressing is by an LMU number and a register number.

A description of the registers, along with the register numbers, and the contents of the registers, follows:

SIU MEMORY LAYOUT

This section describes the actual memory layout of the System Interface Unit data.

A.1 Programmable Controller Area

| Register Address | Description |
|---|---|
| 1 | Programmable Controller Processor |
| 2 | Active LMU |
| 3 | Bit |
| 4 | Map |
| 5 | Area |
| 6 | Unused |

A.2 Basic Data Area

The basic data area is composed of four registers. These registers are located with two addresses—an LMU number and a register offset. Register offsets are given below.

| Offset | Register Description |
|---|---|
| 0 | Pick-up Trip |
| 1 | Alarm and Trip Contacts |
| 2 | LMU Status/LMU Outputs |

The complete LUM basic data area occupies registers 7 through 198. Layouts for the first two LMU data records are shown below with a formula following to calculate addresses for the remaining LMU data area.

| Register | Description |
|---|---|
| 7 | LMU 1 Pick-up Trip |
| 8 | Alarm & Trip |
| 9 | Status/Output |
| 10 | LMU 2 Pick-up Trip |
| 11 | Alarm & Trip |
| 12 | Status/Output |

Register Address = 3 * LMU + 4 + NOS
Where LMU = LMU number (1-64)
NOS = register offset given above (0-2)

A.3 Full Data Area

The full data area is composed of forty-nine registers for each LMU. As with the basic data area, individual registers are located with two numbers—an LMU number and a register offset. The offset numbers for the 49 registers are given below:

| Offset | Description |
|---|---|
| 0 | Over Freq. Alarm/Trip |
| 1 | Over Freq. Delay |

-continued

| Offset | Description | |
|---|---|---|
| 2 | Under Freq. Alarm/Trip | |
| 3 | Under Freq. Delay | |
| 4 | Over Volt Alarm | |
| 5 | Over Voltage Trip | |
| 6 | Over Voltage Delay | |
| 7 | Under Voltage Alarm | |
| 8 | Under Voltage Trip | |
| 9 | Under Voltage Delay | |
| 10 | Under Current Alarm | Phase A |
| 11 | | Phase B |
| 12 | | Phase C |
| 13 | Over Current Alarm | Phase A |
| 14 | | Phase B |
| 15 | | Phase C |
| 16 | Present Demand Alarm | |
| 17 | Instantaneous Demand Alarm | |
| 18 | Predicted Demand Alarm | |
| 19 | Demand Interval/Phase Unbalance Alarm | |
| 20 | Current Level | Phase A |
| 21 | | Phase B |
| 22 | | Phase C |
| 23 | Ground Fault Current | |
| 24 | Voltage Level A-B | |
| 25 | | B-C |
| 26 | | C-A |
| 27 | | A-N |
| 28 | | B-N |
| 29 | | C-N |
| 30 | Power Level | KW |
| 31 | | KVARS |
| 32 | | KVA |
| 33 | PF Phase A/PF Phase B | |
| 34 | PF Phase C/Unbal Phase A | |
| 35 | Unbal Phase B/Phase C | |
| 36 | Present Demand | KW |
| 37 | | KVARS |
| 38 | Instantaneous Demand | KW |
| 39 | " | KVARS |
| 40 | Predicted Demand | KW |
| 41 | " | KW KVARS |
| 42 | Peak Demand | KW |
| 43 | | KVARS |
| 44 | Accumulated KWH | |
| 45 | KWH/Frequency | |
| 46 | Sensor Rating Plug/Breaker Option | |
| 47 | Long Time/Short Time Switch Settings | |
| 48 | Ground Fault/Instantaneous/Phase | |
| 49 | Unbalance Switch Settings | |

ADDRESS = 49 * LMU + 152 + NOS
with LMU = LMU number (1-64)
NOS = register offset (0-49)

SYSTEM INTERFACE UNIT HARDWARE

Figure 35:
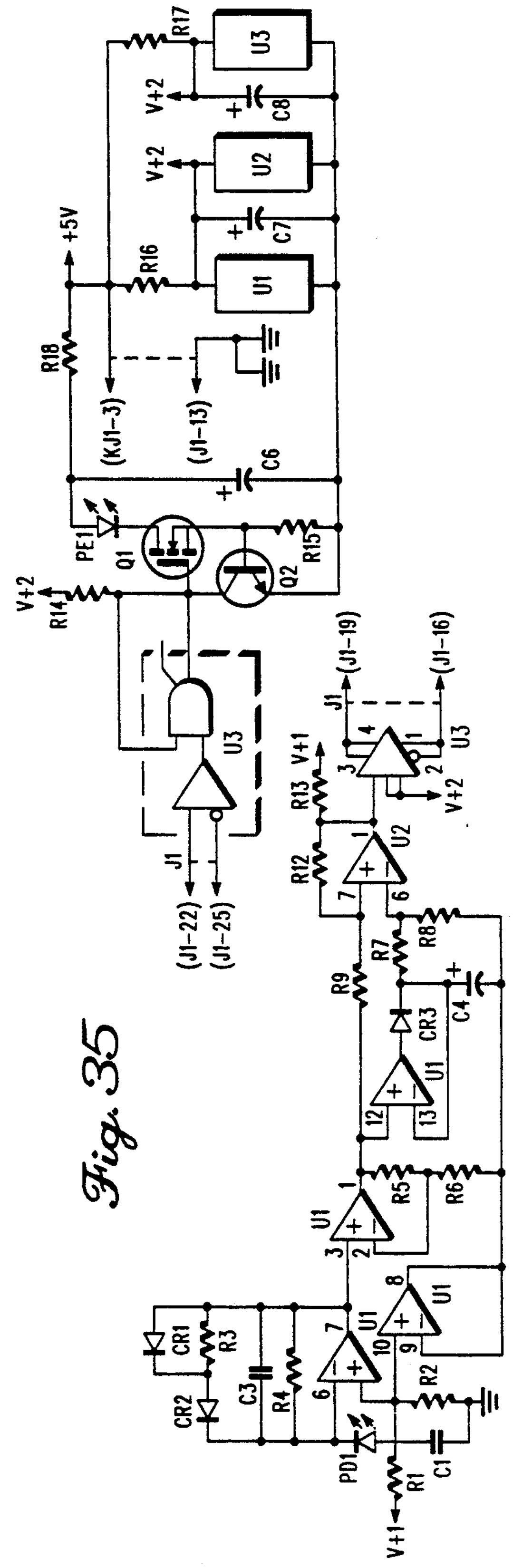
FIG. 35 is a schematic for a System Interface Unit, SIU.

FIG. 35 is a schematic diagram showing both the receiver and transmitter for the system interface unit fiber optic adapter. The electronics shown in FIG. 35 plug into a standard programmable controller register transfer card. For example, the Square D SYMAX register transfer module type CRM211 for a SYMAX system may conveniently support the electronics shown in FIG. 35.

Photodetector PD1 receives incoming light signals from the fiber optic ring. The signals are amplified by op-amp U1, at its input pin 6 and output pin 7. Further amplification is provided by op-amp U1 at its input pins 3, 2 and output pin 1. Op-amp amp U1 at its input pins 10, 9 and output pin 8 provides an active zero reference to the following stages. Op-amp amp U1 at is input pins 12, 13 and output pin 14 along with capacitor C4 provides an adaptive threshold for the signal discriminator. Comparator U2 at its input pins 7, 6 and output pin 1 functions as a signal discriminator, and provides a signal to buffer U3. Buffer U3 drives a standard serial communications port in the programmable controller (not shown in FIG. 35).

The transmitter for the SIU fiber optic adapter is driven by signals provided by the host programmable controller through jack J1 pins J1-22 and J1-25. Op-amp U3 provides an interface to the standard serial communication port in the programmable controller (not shown in FIG. 35). Transistor Q2 provides a current limiting function. Transistor Q1 is driven into conduction and out of conduction by the incoming signals. When conducting, transistor Q1 drives current through light emitting diode PE1, causing light to be thereby emitted. When transistor Q1 is driven out of conduction by the incoming signals then no light is emitted by light emitting diode PE1. Optical signals into the fiber optic ring are coupled optically from light emitting diode PE1. Thus, digital signals arriving at jack J1 pins 22, 25 drive transistor Q1 into conduction, thereby providing equivalent light signals into the fiber optic ring by emission from light emitting diode PE1.

U1, U2 and U3 shown as rectangular blocks, give the power connections to the respective chips. A filtered power supply V+1 is filtered by capacitor C7, and a filtered power supply V+2 is filtered by capacitor C8.

Software in the programmable controller reads the incoming signals provided by the receiver at jack J1 pins 19, 16. Also, software within the programmable controller generates the outgoing signals applied to the transmitter at jack J1 pins 22, 25.

PD1 is a MFOD71 Motorola pin diode.

PE1 is a Motorola MFOE76 visible red LED.

In U3, output pins 3 and 4 are a non-inverting output, and pins 1, 2 are an inverting output. The output to jack J1 pins 19, 16 is taken between the non-inverting and the inverting outputs. U3 may conveniently be a type SN75116N chip made by Texas Instruments Corp.

SIU-LMU COMMUNICATIONS PROTOCOL GENERAL

The System Interface Unit communicates with up to 64 Local Management Units via a ring-connected fiber-optic link. Data transmission is asynchronous, bit-serial, Simplex at 31.25 kilobytes/second. Byte format is one start bit, eight data bits, one odd parity bit, and one stop bit.

1.0 Communications Interface

The System Interface Unit resides on the Programmable Controller bus and communicates with up to 64 Local Management Units via a single loop optical communication channel. The SIU operates at 31.25 kilobytes per second. A simple packet structure is adopted for the SIU/LMU communications.

1.1 SIU/LMU Message Packet Format

All communications between the SIU and LMUs are controlled or initiated by the SIU. The messages take the form of an interrogation message addressed to a particular LMU. The addressed LMU, in turn, sends a response to this interrogation. To complete the sequence, the SIU acknowledges receipt of the response. Additionally, each interrogation and response message is framed by "start of message" and "end of message" character sequences.

1.1.1.1 Polling Message

A Polling Message sequence is used to identify those LMUs which are present in the network. The format of a polling message is:

DLE SOH ID DLE ETX CHK

The format of the response to a polling message is:

DLE STX ID DLE ETX CHK

In these messages, all characters are the standard ASCII definitions, except ID and CHK, which are defined below. For convenience, the bit patterns for the standard ASCII characters used in these messages are:

1.1.1.1 ASCII CHARACTER CODES

Hexadecimal codes for control characters are listed below:

| | |
|---|---|
| DLE | 10H |
| SOH | 01H |
| STX | 02H |
| ETX | 03H |
| ENQ | 05H |
| ACK | 06H |
| NAK | 15H |

1.1.1.2 ID Character

In the polling message above, the ID byte is defined as:

b7 b6 b5 . . . b0

1 LMU #

The LMU # is a number ranging from 0 to 63 and is the address of the LMU being polled.

1.1.1.3 CHK Character

In the polling messages above, the CHK byte is the 2's complement of the 8-bit sum of all characters from the opening DLE through the closing ETX, inclusive. In other words, the sum of all characters in a packet, ignoring carries, will be zero after the check sum is received.

1.1.2 READ LMU DATA

The Read LMU Data message is used to accomplish two functions: update LMU outputs and to request data from one of the LMU registers. The format of a Read LMU data message is:

DLE SOH ID POINTER OUTS DLE ETX CHK

The response to a Read LMU data message is:

DLE STX ID PU INS ALARM/TRIP STATUS DATA DLE ETX CHK

In both messages, the CHK byte is as defined in paragraph 1.1.1.3 above. Similarly, the definitions of DLE, SOH, STX, and ETX are simply the ASCII equivalents shown above. Additional bytes of this message and response are defined below.

1.1.2.1 ID

In the read data message, the ID byte is defined as:

b7 b6 b5 . . . b0

0 0 LMU #

The LMU # is a 6-bit binary number ranging in value from 0 to 63 and is the address of the LMU from which data is requested.

1.1.2.2 POINTER

The pointer byte is an 8-bit binary number identifying the register in the addressed LMU for which data is requested. This number will range from 0 to 50.

1.1.2.3 OUTS

The output byte contains information which will appear at the addressed LMU's output port. This byte represents, on a one-for-one basis, the information to be reflected in the LMU output.

1.1.2.4 PU

The PU byte contains information from the addressed LMUs pick-up/trip byte. This byte is simply transferred from the addressed LMU to the SIU's register space.

1.2.5 INS

The INS byte contains information from the addressed LMUs input port. This byte is transferred and represents on a one-for-one-basis the information appearing at the LMUs input port.

1.1.2.6 ALARM/TRIP

Two bytes are transferred and represent the contents of the addressed LMUs Alarm-Trip register. This data is transferred low order byte first followed by the high order byte.

1.1.2.7 STATUS

One byte is transferred and represents the contents of the addressed LMUs Status byte.

1.1.2.8 DATA

Two bytes are transferred and represent the contents of the register pointed to by the POINTER byte in the interrogation message. As with the Alarm register, the information is transmitted low order byte first, followed by the high order byte.

1.1.3 WRITE LMU DATA

The Write LMU Data message is used to update a specific register in an LMU. The format of a Write LMU Data message is:

DLE SOH ID POINTER OUTS REGL REGH DLE ETX CHK

The response to a Write LMU Data message is:

DLE STX ID PU INS ALARM/TRIP STATUS DLE ETX CHK

In both messages, the CHK byte is as defined in paragraph 1.1.1. above. Similarly, the definitions of DLE, SOH, STX, and ETX are simply the ASCII equivalents as shown above. Additional bytes of this message and response are defined below.

1.1.3.1 ID

In the Write LMU data message, the ID byte is defined as:

b7 b6 b5 . . . b0

0 1 LMU #

The LMU # is a six-bit binary number ranging in value from 0 to 63 and is the address of the LMU to which data is directed.

1.1.3.2 POINTER

The Pointer byte is an eight-bit binary number identifying the register in the addressed LMU to which the data is directed. This number will range from 0 to 50.

1.1.3.3 OUTS

The definition of the OUTS byte in a Write LMU data message is identical to the definition of paragraph 1.1.2.3 regarding the OUTS byte in the Read LMU data message.

1.1.3.4 REGL & REGH

The REGL and REGH bytes contain the information to be written into the register addressed by the pointer byte. REGL represents the low order byte of information and is transmitted first, followed by the high order information byte REGH.

1.1.3.5 PU

In the LMU's response, the PU byte represents the Pick-up Trip byte from the addressed LMU.

1.1.3.6 INS

In the LMUs response, the INS byte represents data present at the eight-bit input port.

1.1.4 ACKNOWLEDGMENT

The SIU acknowledges an LMU response. A complete message cycle proceeds as follows:

SIU>LMU Interrogation
LMU>SIU Response
SIU>LMU Acknowledgment

The acknowledgment takes one of two forms based upon the result of the check sum calculation.

1.1.4.1 VALID MESSAGE

In the case of the SIU receiving a good response from the LMU, a positive acknowledgment is sent to the LMU. This acknowledgment has the form:

DLE ACK ID

ACK is an ASCII character defined above, ID is an echo of the Interrogation message ID byte as previously defined.

1.1.4.2 INVALID MESSAGE

In the case of the SIU receiving a bad response from the LMU, a negative acknowledgment is sent to the LMU. This message takes the form of:

DLE NAK ID

NAK is an ASCII character defined above, ID is an echo of the Interrogation Message ID byte as previously defined.

1.1.5 CHARACTER FORMAT

All characters are transmitted in an eleven bit asynchronous format. Each eight-bit data byte is preceded by a start bit and followed by an odd parity bit and one stop bit. Data is transmitted least significant bit first.

Start d0 d1 . . . d7 Par Stop 1.1.7 RESPONSE TIME

In any message sequence, the SIU waits approximately 25 milliseconds for a response from an LMU to begin. Any delay in response of greater than approximately 25 milliseconds is interpreted as a nonexistent LMU.

1.1.8 UPDATE TIME

Update time is defined as the maximum time required to effect a change at an LMU from a SIU, or vice versa. This time is dependent upon a number of factors, two of which are the number of LMU's connected and number of messages in error. Typical values of update time using the following assumptions,—no errors in transmission occur and the network is fully populated, are;

(1) At 31.25 kilobytes/sec, the network is interrogated within 0.54 seconds; (2) the full 50 registers at a node are updated after 47 polling cycles or 25.4 seconds.

1.1.9 RETRIES

In the case of the SIU sending a Negative Acknowledgment, the responding LMU re-transmits its last message. Only one retry is attempted.

1.2 FIBER OPTIC LINK

The physical link between an SIU and a network of LMU's is a single fiber optic cable. The modulation scheme is on-off keying. A space bit or data "zero" is defined as the driver LED "on" while a mark bit or data "one" is defined as the driver LED "off".

It is to be understood that the above described embodiments are simply illustrative of the principles of the invention. Various other modifications and changes may be made by those skilled in the art which will embody the principles of the invention and fall within the spirit and scope thereof.

We claim:

1. An improved circuit breaker system having a circuit breaker for interrupting electric current flow through at least one conductor from a source of electric energy to a load, the system comprising:

means for measuring current flow in said at least one conductor;

microprocessor means, responsive to said means for measuring current flow, for calculating at least one quantity from said measured current flow, and said microprocessor means including means for comparing said at least one quantity with at least one predetermined limit value, and including means for disconnecting said load from said source by tripping the circuit breaker in the event that said at least one quantity differs from said at least one predetermined limit value by at least a predetermined difference rating plug means for establishing tripping characteristics of said circuit breaker system;

means for said microprocessor means to digitally rad said rating plug means in order to determine said tripping characteristics of said circuit breaker system; and an optionally connectable keypad/display unit having coupling means for electrically coupling the keypad/display unit to the microprocessor means, and having at least one key which is manually engaged by an operator and having means, responsive to said at least one key, for displaying at least one of the tripping characteristics of the circuit breaker system.

2. An improved circuit breaker system, as in claim 1, wherein said rating plug means provides a digital output signal and said microprocessor means digitally reads said digital output signal in order to set said tripping characteristics.

3. An improved circuit breaker system, as in claim 1, wherein the circuit breaker system includes a housing having a recess for receiving the keypad/display unit.

4. An improved circuit breaker system, as in claim 1, wherein the circuit breaker system includes a housing having a recess for receiving the keypad/display unit and having a connector for mating with a connector connected to the keypad/display unit.

5. An improved circuit breaker system, as in claim 1, wherein said at least one key selects data associated with a tripping characteristic.

6. An improved circuit breaker system, as in claim 1, wherein said optionally connectable keypad/display unit includes a circuit which provides testing for faults in the system, including for at least one of the following: phase fault and ground fault.

7. An improved circuit breaker system, as in claim 1, wherein said at least one key includes a first key which is manually engaged by an operator to select a trip unit function, and a second key which is manually engaged to select data associated with the selected trip unit function in accordance with a menu selection method.

8. An improved circuit breaker system, as in claim 1, wherein the rating plug means includes a resistor circuit for setting a plurality of signal levels which are read by said microprocessor means.

9. An improved circuit breaker system, as in claim 1, wherein said at least one key selects a trip unit function.

10. An improved circuit breaker system, as in claim 9, wherein said at least one key is one of a plurality of manually engageable keys, and another one of said plurality of manually engageable keys, is manually engaged to select data associated with the selected trip unit function.

11. An improved circuit breaker system, as in claim 1, wherein said at least one key includes a key which is manually engaged to designate a trip unit test mode.

12. An improved circuit breaker system, as in claim 11, wherein the designation of the trip unit test mode includes commanding whether or not the system should trip during the test.

13. An improved circuit breaker system, including a circuit breaker, the system comprising:

a trip unit commanding the circuit breaker to interrupt electric current flow through at least one conductor from a source of electric energy to a load;

means for measuring current flow in said at least one conductor;

microprocessor means, responsive to said means for measuring current flow, for calculating at least one quantity from said measured current flow, and said microprocessor means including means for comparing said at least one quantity with at least one predetermined limit value, and including means for engaging the trip unit in the event that said at least one quantity differs from said at least one predetermined limit value by at least a predetermined difference;

rating plug means for establishing tripping characteristics of said circuit breaker system;

means for said microprocessor means to digitally read said rating plug means in order to set said tripping characteristics of said circuit breaker system; and an optionally connectable test unit having a keypad, a display and coupling means for electrically coupling the keypad/display unit to the microprocessor means, having at least one key which is manually engaged by an operator and having means, responsive to said at least one key, for displaying at least one trip unit function.

14. An improved circuit breaker system, according to claim 13, wherein said coupling means includes a microprocessor.

15. An improved circuit breaker system, according to claim 13, wherein the rating plug means includes a resistor circuit for setting a plurality of signal levels which are read by said microprocessor means.

16. An improved circuit breaker system, according to claim 13, wherein said at least one trip unit function includes at least one of the following trip unit functions: ammeter level, current unbalance indicator, breaker ratings, breaker settings, tests phase fault, test ground fault, last trip, number of trips, number of overload trips, number of short circuit trips, number of ground fault trips, and number of current unbalance trips.

17. An improved circuit breaker system, according to claim 16, wherein a plurality of said trip unit functions listed in claim 16 are sequentially displayed, in response to at least one key on the keypad/display unit, according to a menu selection method.

18. An improved circuit breaker system including a circuit breaker for interrupting electric current flow through at least one conductor from a source of electric energy to a load, the system comprising:

a trip unit which commands the circuit breaker to disconnect said load from said source in the event that the current flow exceeds a predetermined threshold; and an optionally connectable keypad/display unit having a keypad, a display and coupling means for electrically coupling the keypad/display unit to said trip unit, and having a display driver circuit which is controlled by a stream of serial data in response to at least one key on the keypad being manually engaged by an operator so that the display provides an operator a remote indication of at least one trip unit function wherein the keypad is used to implement a menu selection method so as to limit the number of keys required on the keypad.

19. An improved circuit breaker system, according to claim 18, wherein the number of keys required is not greater than about four.

20. An improved circuit breaker system including a circuit breaker for interrupting electric current flow through at least one conductor from a source of electric energy to a load, the system comprising:

a trip unit which commands the circuit breaker to disconnect said load from said source in the event that the current flow exceeds a predetermined threshold; and an optionally connectable keypad/display unit having a keypad, a display and coupling means for electrically coupling the keypad/display unit to said trip unit, and having a display driver circuit which is controlled by a stream of serial data in response to at least one key on the keypad being manually engaged by an operator so that the display provides an operator a remote indication of at least one trip unit function.

21. An improved circuit breaker system, according to claim 20, wherein said optionally connectable keypad/display unit includes means for controlling power provided to said trip unit.

22. An improved circuit breaker system, according to claim 20, wherein said trip unit responds to the optionally connectable keypad/display unit in response to an operator pressing said at least one key on the keypad.

23. An improved circuit breaker system, according to claim 20, wherein said trip unit responds to the optionally connectable keypad/display unit in response to an operator pressing said at least one key on the keypad by sending trip data to the display for viewing on the display and for allowing the operator to communicate with the system using the display and the keypad.

24. An improved circuit breaker system having a circuit breaker, the system comprising:

a trip unit which commands the circuit breaker to interrupt electric current flow through at least one conductor from a source of electric energy to a load;

means for measuring current flow in said at least one conductor;

microprocessor means, responsive to said means for measuring current flow, for calculating at least one quantity form said measured current flow, and said microprocessor means including means for comparing said at least one quantity with at least one predetermined limit value and controlling said trip unit in response thereto; and an optionally connectable test unit having a keypad, a display and coupling means for electrically coupling the keypad/display unit to the microprocessor means, wherein the keypad includes at least one key which is manually engaged by an operator according to a predetermined sequence to display data associated with at least one trip unit function.

25. An improved circuit breaker system having a circuit breaker, the system comprising:

a trip unit which commands the circuit breaker to interrupt electric current flow through at least one conductor from a source of electric energy to a load;

means for measuring current flow in said at least one conductor;

microprocessor means, responsive to said means for measuring current flow, for calculating at least one quantity from said measured current flow, and said microprocessor means including means for comparing said at least one quantity with at least one predetermined limit value and controlling said trip unit in response thereto, such that said trip unit interrupts electric current flow in the event that said at least one quantity differs from said at least one predetermined limit value by at least a predetermined difference;

rating plug means for establishing tripping characteristics of said circuit breaker system;

means for said microprocessor means to digitally read said rating plug means in order to set said tripping characteristics of said circuit breaker system; and an optionally connectable keypad/display unit having a keypad, a display and coupling means for electrically coupling the keypad/display unit to the microprocessor means, and having a display driver circuit which is controlled by a stream of serial data in response to at least one key on the keypad being manually engaged by an operator so that the display provides an operator a remote indication of at least one trip unit function.

26. An improved circuit breaker system, as in claim 25, wherein said rating plug means provides a digital output signal and said microprocessor means digitally reads said digital output signal in order to set said tripping characteristics.

27. An improved circuit breaker system, as in claim 25, wherein said optionally connectable keypad/display unit includes a circuit which provides testing for faults in the system, including for at least one of the following: phase fault and ground fault.

28. An improved circuit breaker system, as in claim 25, wherein said at least one key includes a first key which is manually engaged by an operator to select a trip unit function, and a second key which is manually engaged to select data associated with the selected trip unit function in accordance with a menu selection method.

29. An improved circuit breaker system, as in claim 25, further including a selecting means coupled to said microprocessor means for selectively adjusting said at least one predetermined limit value.

30. An improved circuit breaker system, as in claim 29, wherein said at least one trip unit function includes said at least one predetermined limit value.

31. An improved circuit breaker system, as in claim 30, wherein said at least one trip unit function includes said at least one quantity that caused said circuit breaker to be tripped.

32. An improved circuit breaker system, as in claim 31, wherein said display includes an alphanumeric display element capable of displaying a magnitude value and a unit of measurement of said at least one quantity such that said operator is provided with an identification and measurement of said at least one quantity that caused said circuit breaker to be tripped.

33. An improved circuit breaker system, as in claim 25, wherein said at least one key selects data associated with said trip unit.

34. An improved circuit breaker system, as in claim 33, wherein said at least one key selects a trip unit function.

35. An improved circuit breaker system, as in claim 34, wherein said at least one key includes a key which is manually engaged to select data associated with the selected trip unit function.

36. An improved circuit breaker system, as in claim 35, wherein said at least one key includes a key which is manually engaged to designate a trip unit test mode.

37. An improved circuit breaker system, as in claim 36, wherein the designation of the trip unit test mode includes commanding whether or not the system should trip during the test.

38. An improved circuit breaker system having a circuit breaker, the system comprising:

a trip which commands the circuit breaker to interrupt electric current flow through at least one conductor from a source of electric energy to load;

means for measuring current flow in said at least one conductor;

microprocessor means, responsive to said means for measuring current flow, for calculating at least one quantity from said measured current flow, and said microprocessor means including means for comparing said at least one quantity with at least one predetermined limit value and controlling said trip unit in response thereto, such that said trip unit interrupts electric current flow in the event that said at least one quantity differs from said at least one predetermined limit value by at least a predetermined difference, and wherein said microprocessor means digitally reads said digital output signal in order to set said tripping characteristics;

rating plug means for establishing tripping characteristics of said circuit breaker system, said rating plug means providing a digital output signal;

means for said microprocessor means to digitally read said rating plug means in order to set said tripping characteristics of said circuit breaker system; and an optionally connectable keypad/display unit having a keypad, a display and coupling means for electrically coupling the keypad/display unit to the microprocessor means, and having a display driver circuit which is controlled by a stream of serial data in response to at least one key on the keypad being manually engaged by an operator so that the display provides an operator a remote indication of at least one trip unit function, wherein said at least one key includes a first key which is manually engaged by an operator to select a trip unit function, and a second key which is manually engaged to select data associated with the selected trip unit function in accordance with a menu selection method.

* * * * *